United States Patent
Zhou et al.

(10) Patent No.: US 11,490,334 B2
(45) Date of Patent: Nov. 1, 2022

(54) POWER SAVING IN A WIRELESS COMMUNICATION SYSTEM

(71) Applicants: Hua Zhou, Herndon, VA (US); Esmael Dinan, McLean, VA (US); Hyoungsuk Jeon, Centreville, VA (US); Ali Cirik, Herndon, VA (US); Alireza Babaei, Fairfax, VA (US); Kyungmin Park, Herndon, VA (US); Kai Xu, Herndon, VA (US)

(72) Inventors: Hua Zhou, Herndon, VA (US); Esmael Dinan, McLean, VA (US); Hyoungsuk Jeon, Centreville, VA (US); Ali Cirik, Herndon, VA (US); Alireza Babaei, Fairfax, VA (US); Kyungmin Park, Herndon, VA (US); Kai Xu, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 163 days.

(21) Appl. No.: 16/575,611

(22) Filed: Sep. 19, 2019

(65) Prior Publication Data
US 2020/0092814 A1    Mar. 19, 2020

Related U.S. Application Data

(60) Provisional application No. 62/734,536, filed on Sep. 21, 2018, provisional application No. 62/733,303, filed on Sep. 19, 2018.

(51) Int. Cl.
*H04W 52/02*    (2009.01)
*H04L 1/16*    (2006.01)
(Continued)

(52) U.S. Cl.
CPC ....... *H04W 52/0235* (2013.01); *H04L 1/1614* (2013.01); *H04W 24/08* (2013.01);
(Continued)

(58) Field of Classification Search
CPC . H04W 52/0235; H04W 76/28; H04W 24/08; H04W 52/0229; H04W 72/042; H04W 80/02; H04L 1/1614
See application file for complete search history.

(56) References Cited

U.S. PATENT DOCUMENTS

| 10,383,102 B2 | 8/2019 | Yi et al. | |
| 2013/0012186 A1* | 1/2013 | Kim | H04L 5/003 455/418 |

(Continued)

OTHER PUBLICATIONS

R1-1612068_UE_Power_Evaluation_for_DRX_with_Wake-Up_Signaling; 3GPP TSG-RAN WG1 #87 ; Nov. 14-18, 2016; Reno, USA; ; Agenda item:7.1.4.1; Source: Qualcomm Incorporated.

(Continued)

*Primary Examiner* — Faruk Hamza
*Assistant Examiner* — Alan L Lindenbaum
(74) *Attorney, Agent, or Firm* — Willis H. Chang; Kavon Nasabzadeh; Jacob L. Mangan

(57) ABSTRACT

A wireless device receives one or more radio resource control message comprising configuration parameters of a plurality of cells. An activation command indicating activation of a plurality of secondary cells (SCells) of the plurality of cells is received. A first downlink control information (DCI), comprising a power saving indication bitmap, is received. Each bit of the power saving indication bitmap indicates whether to monitor a downlink control channel on a corresponding activated SCell of the plurality of SCells. The wireless device starts monitoring a downlink control channel of an activated SCell of the activated SCells, in response to a bit, of the power saving indication bitmap, corresponding to the activated SCell, indicating monitoring the downlink control channel. A second DCI is received via the downlink control channel.

17 Claims, 48 Drawing Sheets

(51) Int. Cl.
    *H04W 76/28*     (2018.01)
    *H04W 24/08*     (2009.01)
    *H04W 80/02*     (2009.01)
    *H04W 72/04*     (2009.01)

(52) U.S. Cl.
    CPc ..... *H04W 52/0229* (2013.01); *H04W 72/042* (2013.01); *H04W 76/28* (2018.02); *H04W 80/02* (2013.01)

(56) References Cited

U.S. PATENT DOCUMENTS

| | | | |
|---|---|---|---|
| 2016/0021558 A1* | 1/2016 | Kim | H04W 24/08 455/67.11 |
| 2016/0308653 A1* | 10/2016 | Dinan | H04L 5/0094 |
| 2017/0202025 A1* | 7/2017 | Ouchi | H04W 52/346 |
| 2019/0133556 A1 | 5/2019 | Koptenko | |
| 2019/0254110 A1 | 8/2019 | He et al. | |

OTHER PUBLICATIONS

R1-1703139—wake up radio; 3GPP TSG RAN WG1#88; Athens, Greece, Feb. 13-17, 2017; Agenda Item:8.1.3.1.5; Source: Sony; Title:Wake Up Radio for NR; Document for:Discussion / Decision.

R1-1704282; 3GPP TSG RAN WG1 Meeting #88bis ; Spokane, USA, Apr. 3-7, 2017; ; Agenda Item:7.2.6.2; Source:Huawei, HiSilicon; Title:Considerations on 'wake-up signal' for eFeMTC.

R1-1704290; 3GPP TSG RAN WG1 Meeting #88bis; Spokane, USA, Apr. 3-7, 2017; ; Agenda Item:7.2.7.1.1; Source:Huawei, HiSilicon; Title:On 'wake-up signal' for paging and connected-mode DRX.

R1-1704531_feMTC_wakeup; 3GPP TSG RAN WG1 Meeting #88bis; Spokane, WA, USA Apr. 3-7, 2017; ; ; ;Agenda item:7.2.6.2.

R1-1704532_eNB-IoT_wakeup; 3GPP TSG RAN WG1 Meeting #88bis; Spokane, WA, USA Apr. 3-7, 2017; ; ; ; Agenda item:7.2.7.1.

R1-1704693; 3GPP TSG RAN WG1 Meeting #88bis ; Spokane, USA Apr. 3-7, 2017; ; Source:Intel Corporation; Title:DL Power Consumption Reduction for efeMTC ; Agenda Item:7.2.6.2.

R1-1704698; 3GPP TSG RAN WG1 Meeting #88bis ; Spokane, USA Apr. 3-7, 2017; ; Source:Intel Corporation; Title:DL Power Consumption Reduction for feNB-IoT ; Agenda Item:7.2.7.1.1.

R1-1704845; 3GPP TSG RAN WG1 Meeting #88bis; Spokane, USA, Apr. 3-7, 2017; ; Agenda Item:7.2.6.2; Source: LG Electronics; Title: UE power consumption reduction by new physical channel in MTC.

R1-1704847; 3GPP TSG RAN WG1 Meeting #88bis; Spokane, USA, Apr. 3-7, 2017; ; Agenda Item:7.2.7.1.1; Source: LG Electronics; Title: UE power consumption reduction by new physical channel in NB-IoT.

R1-1705012 Efficient monitoring of DL control channels; 3GPP TSG RAN WG1 Meeting #88bis; Spokane, Washington, USA, Apr. 3-7, 2017; ; Agenda item:7.2.6.2; Source: Qualcomm Incorporated; Title: Efficient monitoring of DL control channels.

R1-1705017 Efficient monitoring of DL control channels; 3GPP TSG RAN WG1 Meeting #88bis; Spokane, Washington, USA, Apr. 3-7, 2017; ; Agenda item:7.2.7.1.1; Source: Qualcomm Incorporated; Title: Efficient monitoring of DL control channels.

R1-1705038; 3GPP TSG RAN WG1 Meeting #88bis; Spokane, USA, Apr. 3-7, 2017; ; Agenda item:7.2.6.2; Source: Nokia, Alcatel-Lucent Shanghai Bell; Title: Signalling for efficient decoding of physical channels.

R1-1705043; 3GPP TSG RAN WG1 Meeting #88bis; Spokane, USA, Apr. 3-7, 2017; ; Agenda item:7.2.7.1.1; Source: Nokia, Alcatel-Lucent Shanghai Bell; Title: Signalling for efficient decoding of physical channels.

R1-1705182—Power consumption reduction for paging and connected-mode DRX; 3GPP TSG-RAN1#88bis; Apr. 3-7, 2017; Spokane, Washington, USA; ; Agenda Item:7.2.7.1.1; Source: Ericsson.

R1-1705192—Downlink channel power efficiency for MTC; 3GPP TSG-RAN1#88bis; Apr. 3-7, 2017; Spokane, Washington, USA; ; Agenda Item:7.2.6.2; Source: Ericsson.

R1-1705203; 3GPP TSG RAN WG1 Meeting #88bis; Spokane, USA Apr. 3-7, 2017; Agenda Item:7.2.7.1.1; Source: Sony; Title:NB-IoT UE Power Consumption Reduction in Idle Mode Paging ; Document for:Discussion / Decision.

R1-1705204; 3GPP TSG RAN WG1 Meeting #88bis; Spokane, USA Apr. 3-7, 2017; Agenda Item:7.2.6.2; Source: Sony; Title:MTC UE Power Consumption Reduction in Idle Mode Paging ; Document for:Discussion / Decision.

R1-1705305; 3GPP TSG RAN WG1 #88bis ; Spokane, USA, Apr. 3-7, 2017; Agenda item:7.2.6.2; Source: Samsung ; Title: Power consumption reduction for paging and connected-mode DRX for eMTC; Document for:Discussion and Decision.

R1-1705309; 3GPP TSG RAN WG1 #88bis ; Spokane, USA, Apr. 3-7, 2017; Agenda item:7.2.7.1.1; Source: Samsung ; Title: Power consumption reduction for paging and connected-mode DRX for NB-IOT; Document for:Discussion and Decision.

R1-1705494; 3GPP TSG RAN WG1 Meeting #88bis; Spokane, USA Apr. 3-7, 2017; Source: ZTE, ZTE Microelectronics; Title: Power consumption reduction for physical channels for MTC; Agenda item:7.2.6.2; Document for:Discussion and Decision.

R1-1705495; 3GPP TSG RAN WG1 Meeting #88bis; Spokane, USA Apr. 3-7, 2017; Source: ZTE, ZTE Microelectronics; Title: Power consumption reduction for physical channels for NB-IoT; Agenda item:7.2.7.1.1; Document for:Discussion and Decision.

R1-1706882 Downlink channel power efficiency for MTC; 3GPP TSG-RAN WG1 #89; Hangzhou, P.R. China May 15-19, 2017; ; Agenda Item:6.2.6.2; Source:Ericsson; Title:Downlink channel power efficiency for MTC.

R1-1707018; 3GPP TSG RAN WG1 Meeting #89 ; Hangzhou, China, May 15-19, 2017; ; Agenda Item:6.2.6.2; Source:Huawei, HiSilicon; Title:On 'wake-up signal' for eFeMTC.

R1-1707101 power consumption for MTC 0505; 3GPP TSG-RAN WG1 Meeting #89 ; Hangzhou, China, May 15-19, 2017; Source: ZTE ; Title:Power consumption reduction for physical channels for MTC; Agenda item:6.2.6.2; Document for:Discussion and Decision.

R1-1707315; 3GPP TSG RAN WG1 Meeting #89; Hangzhou, P.R. China May 15-19, 2017; ; Source:Intel Corporation; Title:Analysis of impact of Wake-up signaling on power consumption and resource efficiency for efeMTC ; Agenda Item:6.2.6.2.

R1-1707455_feMTC_wakeup; 3GPP TSG RAN WG1 Meeting #89; Hangzhou, China,May 15-19, 2017; ; ; ; Agenda item:6.2.6.2.

R1-1707568; 3GPP TSG RAN WG1 Meeting #89 ; Hangzhou, P.R. China May 15-19, 2017; ; Agenda Item:6.2.6.2; Source: LG Electronics; Title: UE power consumption reduction by new physical signal/channel in MTC.

R1-1707862; 3GPP TSG RAN WG1 Meeting #89; Hangzhou, P.R. China, May 15-19, 2017; ; Agenda item:6.2.6.2; Source:Nokia, Alcatel-Lucent Shanghai Bell; Title:Signalling for efficient decoding of physical channels.

R1-1708311 Idle Mode V2; 3GPP TSG RAN WG1 Meeting #89 ; Hangzhou, P.R. China May 15-19, 2017; ; ; Agenda item:6.2.6.2 Downlink channel power efficiency; Source: Sierra Wireless.

R1-1708796 Efficient monitoring of DL control channels; 3GPP TSG RAN WG1 Meeting #89 ; Hangzhou, China, May 15-19, 2017; ; Agenda item:6.2.6.2; Source: Qualcomm Incorporated; Title:Efficient monitoring of DL control channels.

R1-1712106; 3GPP TSG RAN WG1 Meeting #90; Prague, Czech Republic, Aug. 21-25, 2017; ; Agenda Item:5.2.6.2; Source:Huawei, HiSilicon; Title:On power-saving signal for eFeMTC.

R1-1720694 Open Issues on CA; 3GPP TSG RAN WG1 Meeting #91; Reno, NV, USA, Nov. 27-Dec. 1, 2017; ; Agenda item:7.3.4.2; Source: Qualcomm Incorporated; Title: Open Issues on CA.

R1-1808272_On_downlink_transmission_detection_in_NR-U; 3GPP TSG RAN WG1 Meeting #94; Gothenburg, Sweden, Aug. 20-24, 2018 ; Agenda item:7.2.2.3.1; Title:On downlink transmission detection in NR-U ; Source MediaTek Inc.; Document for:Discussion.

R1-1808319 Considerations on DL reference signals and channels design for NR-U_final; 3GPP TSG RAN WG1 Meeting #94;

(56) References Cited

OTHER PUBLICATIONS

Gothenburg, Sweden, Aug. 20-24, 2018; ; Title: Considerations on DL reference signals and channels design for NR-U; Source: ZTE; Agenda Item:7.2.2.3.1.

R1-1808612 On DL signals and channels for NR-U; 3GPP TSG RAN WG1 Meeting #94 ; Gothenburg, Sweden, Aug. 20-24, 2018; ; Agenda Item:7.2.2.3.1; Source:Apple Inc.; Title:On DL Signals and Channels for NR-U.

R1-1808683_AI7.2.2.3.1 drs; 3GPP TSG RAN WG1 Meeting #94; Gothenburg, Sweden, Aug. 20-24, 2018 ; ; Agenda Item:7.2.2.3.1; Source: Intel Corporation; Title: Enhancements to NR DL signals and channels for unlicensed operation.

R1-1809477 7.2.2.3.1 DL signals and channels for NR-U; 3GPP TSG RAN WG1 Meeting #94; Gothenburg, Sweden; Aug. 20-Aug. 24, 2018 ; ; Agenda item:7.2.2.3.1.

RP-181463_NR_Power_Saving_SID_final; 3GPP TSG RAN Meetings #80RP-181463 La Jolla, USA, Jun. 11-14, 2018; ; WI template Dec. 2016 (RAN #75 adaptation3); Source:CATT, CMCC, vivo, CATR, Qualcomm, MediaTek; Title:New SID: Study on UE Power Saving in NR.

* cited by examiner

User Plane Protocol Stack

Control Plane Protocol Stack

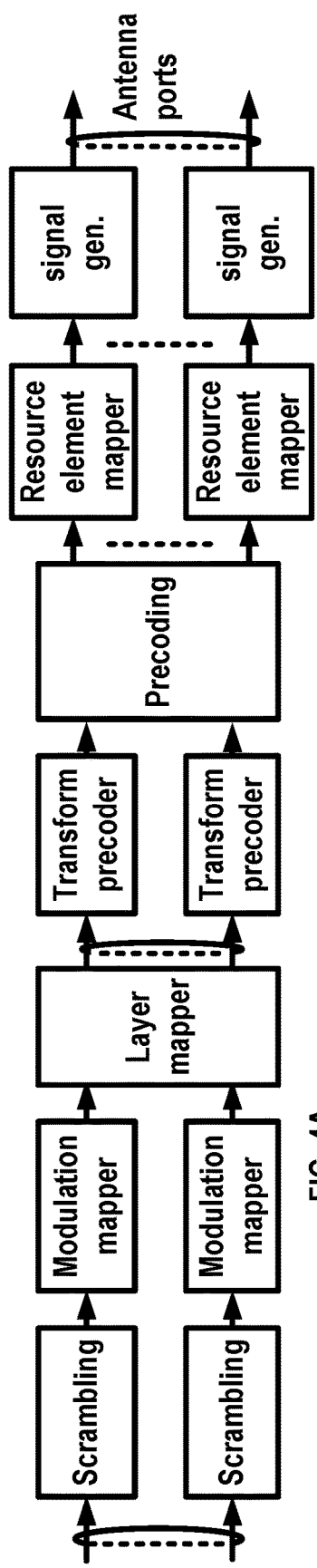
FIG. 4A
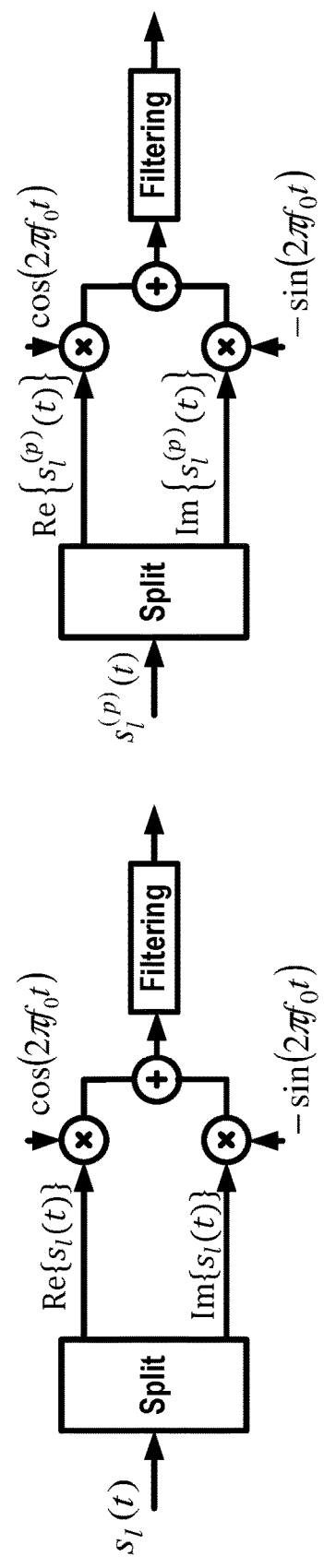
FIG. 4B
FIG. 4D
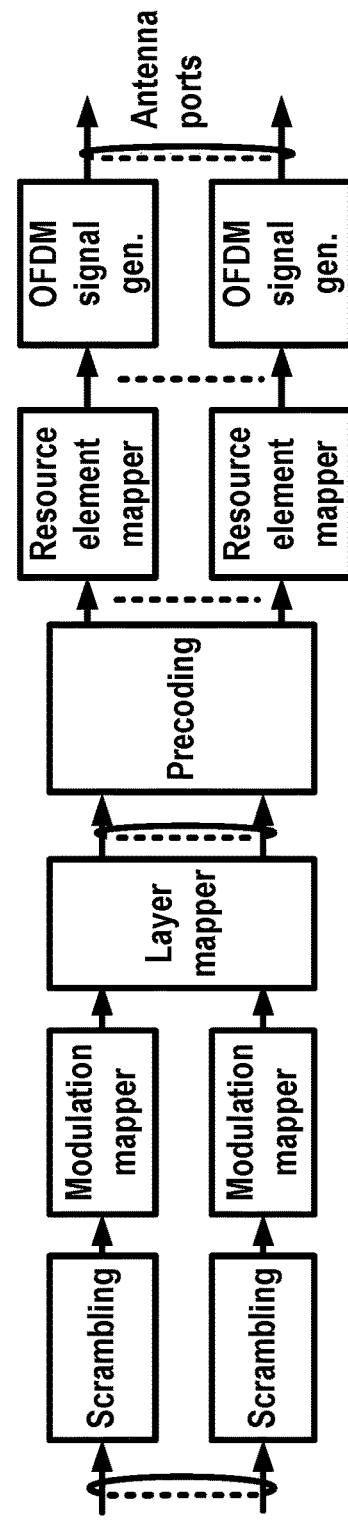
FIG. 4C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 20

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 21

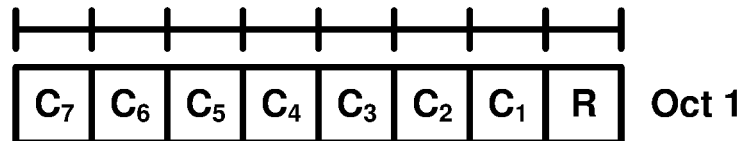
FIG. 23A
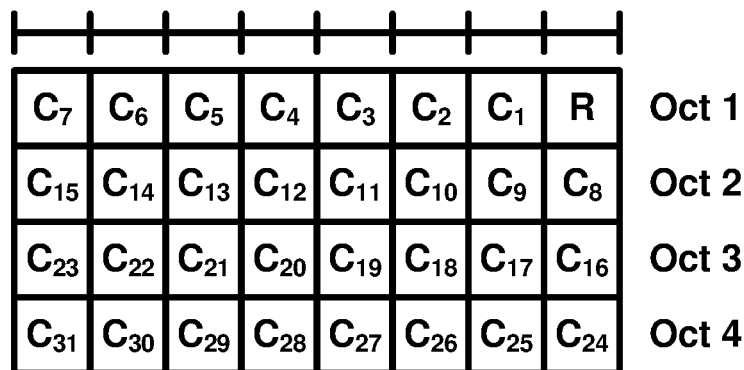
FIG. 23B
| Hibernation MAC CE $C_i$ | Activation/ Deactivation MAC CE $C_i$ | SCell may be |
|---|---|---|
| 0 | 0 | Deactivated |
| 0 | 1 | Activated |
| 1 | 0 | Reserved MAC CE combination |
| 1 | 1 | Dormant |
FIG. 23C

POWER SAVING IN A WIRELESS COMMUNICATION SYSTEM

CROSS-REFERENCE TO RELATED APPLICATIONS

This application claims the benefit of U.S. Provisional Application No. 62/733,303, filed Sep. 19, 2018, and U.S. Provisional Application No. 62/734,536, filed Sep. 21, 2018, which are hereby incorporated by reference in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 20 is an example of LCIDs for DL-SCH as per an aspect of an embodiment of the present disclosure.

FIG. 21 is an example of LCIDs for UL-SCH as per an aspect of an embodiment of the present disclosure.

FIG. 23A is an example of an SCell hibernation MAC CE of one octet as per an aspect of an embodiment of the present disclosure.

FIG. 23B is an example of an SCell hibernation MAC CE of four octets as per an aspect of an embodiment of the present disclosure.

FIG. 23C is an example of MAC control elements for an SCell state transitions as per an aspect of an embodiment of the present disclosure.

DETAILED DESCRIPTION OF EMBODIMENTS

Figure 1:
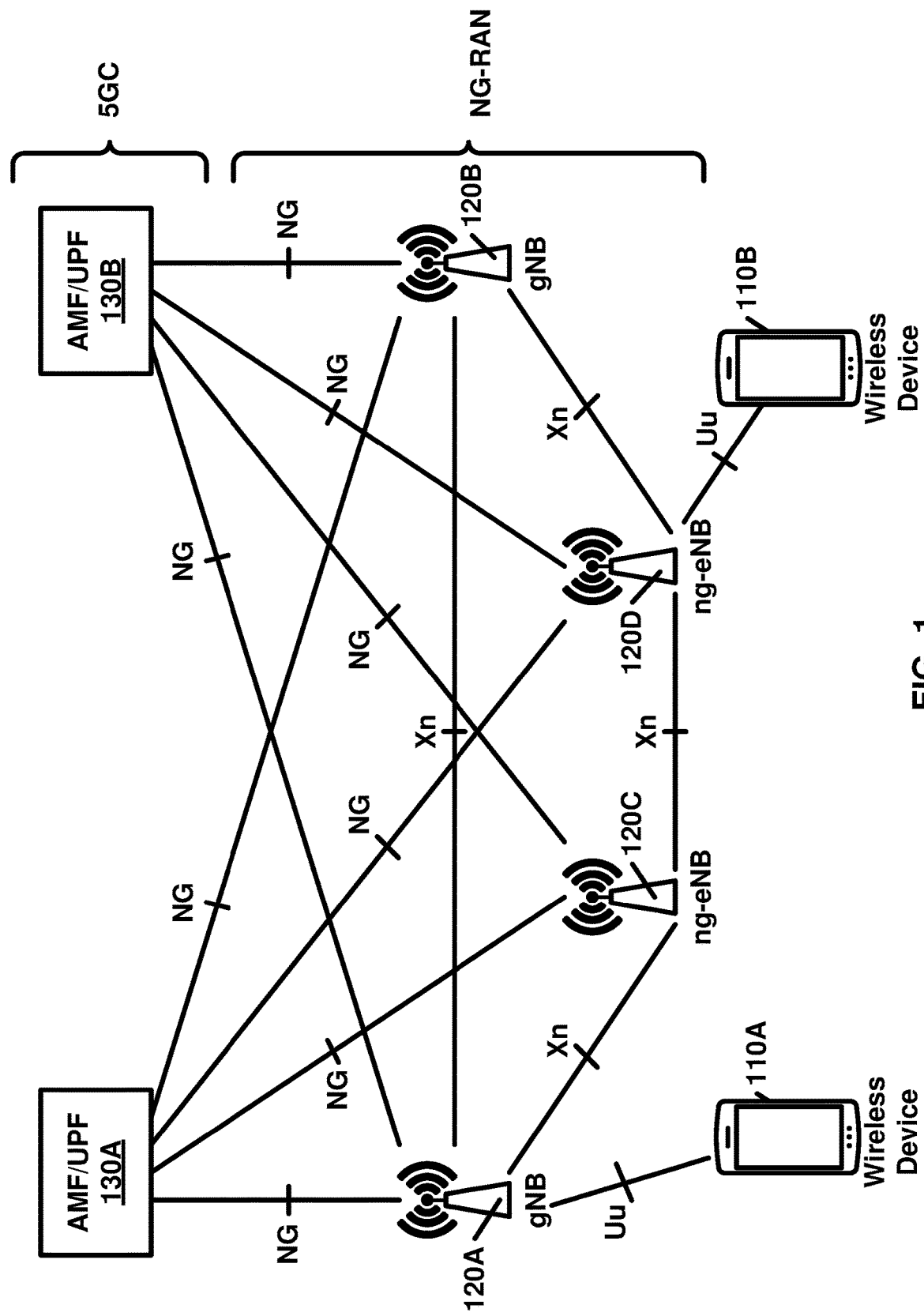
FIG. 1 is a diagram of an example RAN architecture as per an aspect of an embodiment of the present disclosure.

Example embodiments of the present disclosure enable wake-up procedure and power saving operations of a wireless device and/or a base station. Embodiments of the technology disclosed herein may be employed in the technical field of multicarrier communication systems. More particularly, the embodiments of the technology disclosed herein may relate to a wireless device and/or a base station in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DAI Downlink Assignment Index
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PB CH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TCI Transmission Configuration Indication
TC-RNTI Temporary Cell-Radio Network Temporary Identifier
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
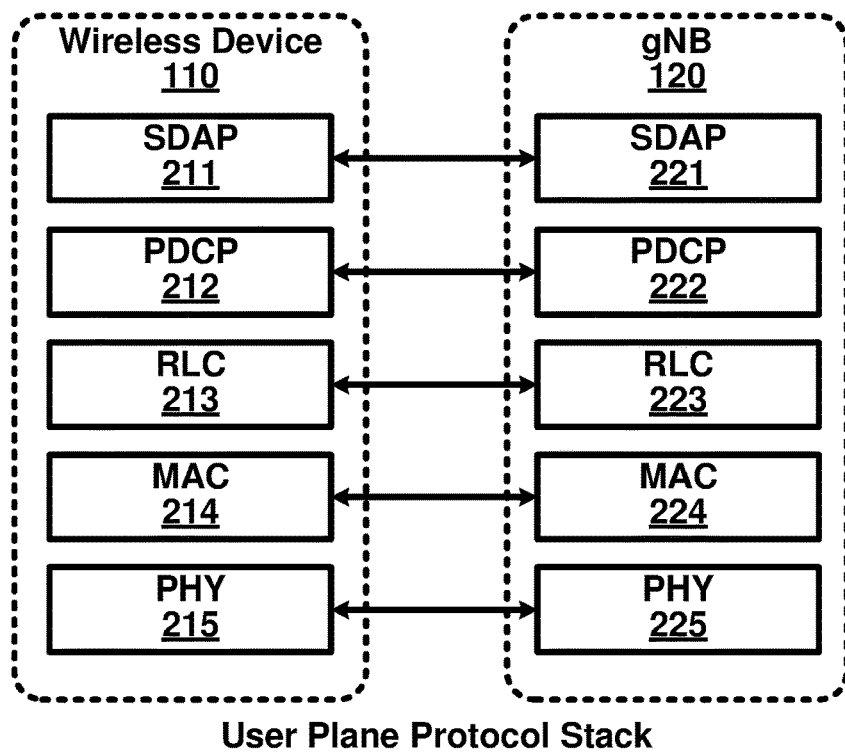
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TB s) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
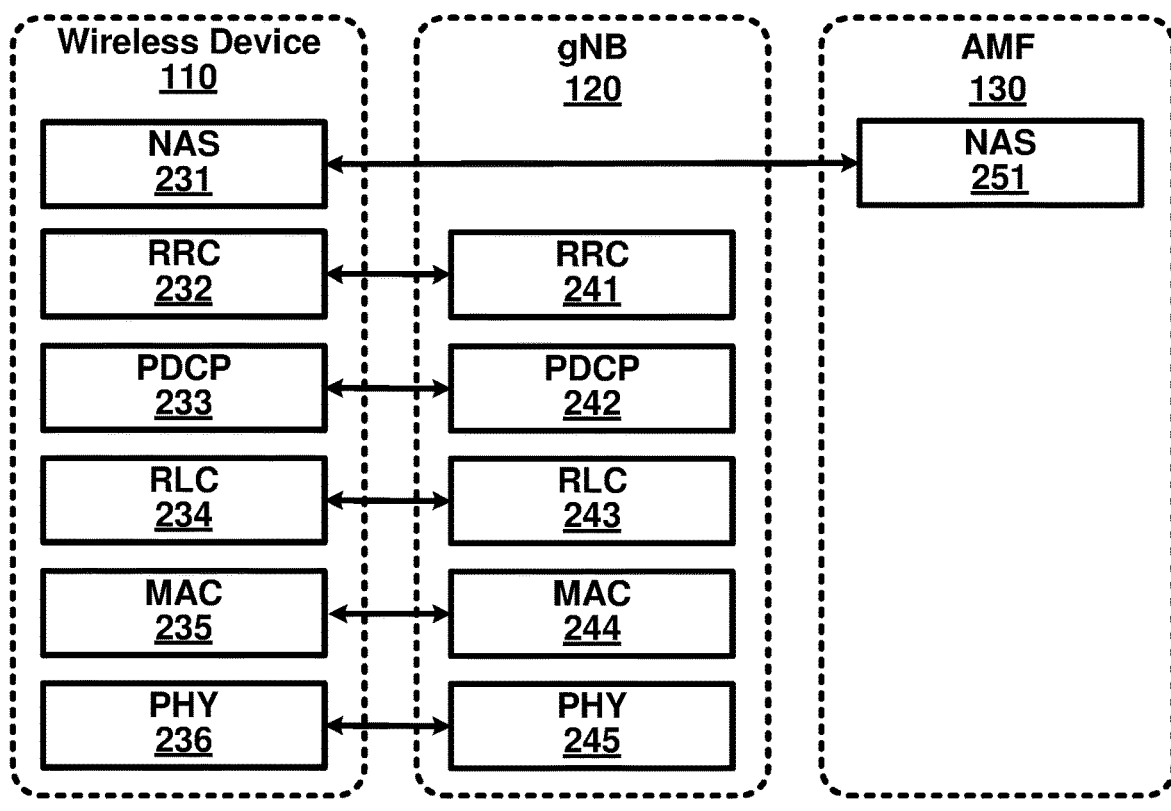
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
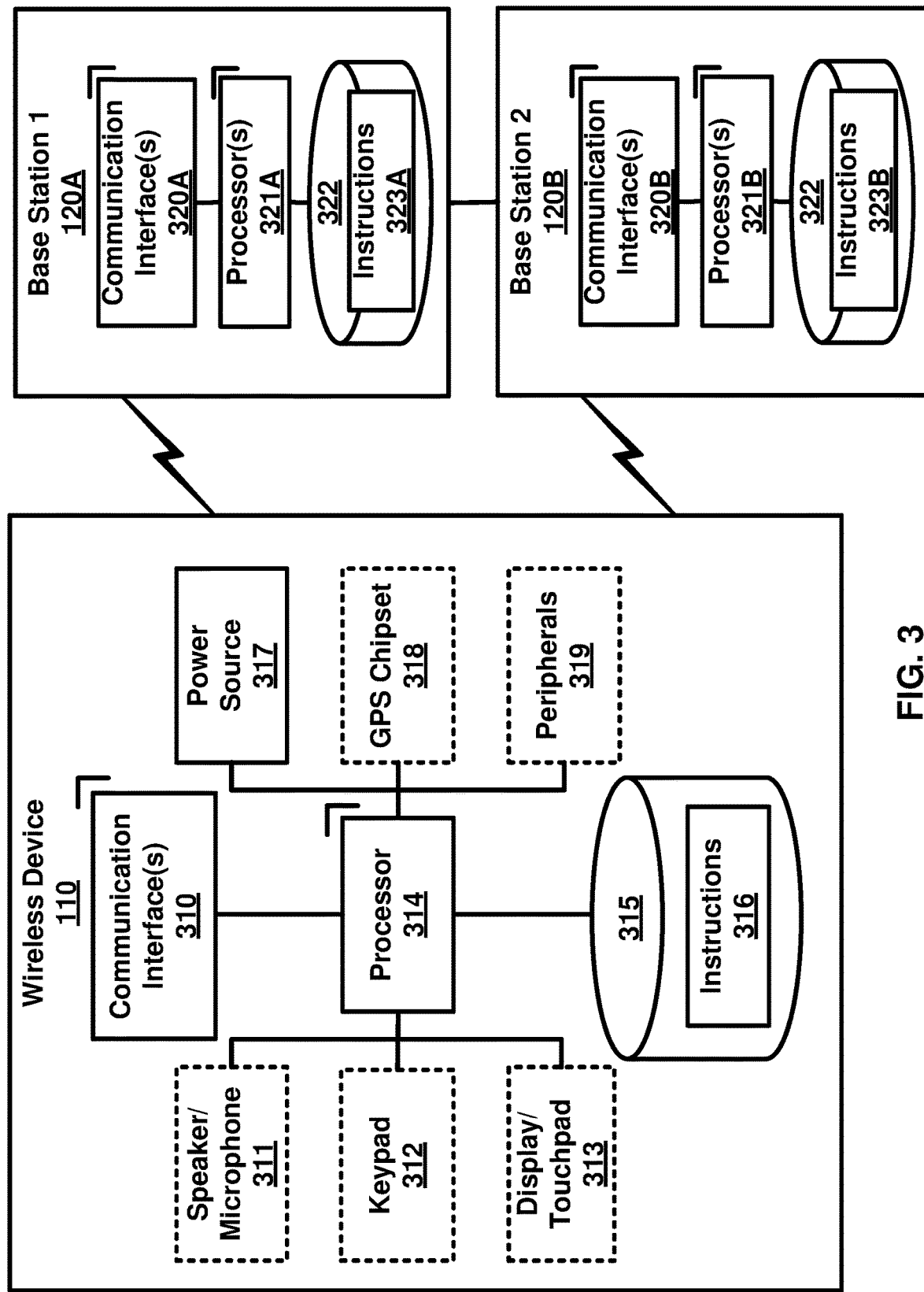
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection;

monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to reestablish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
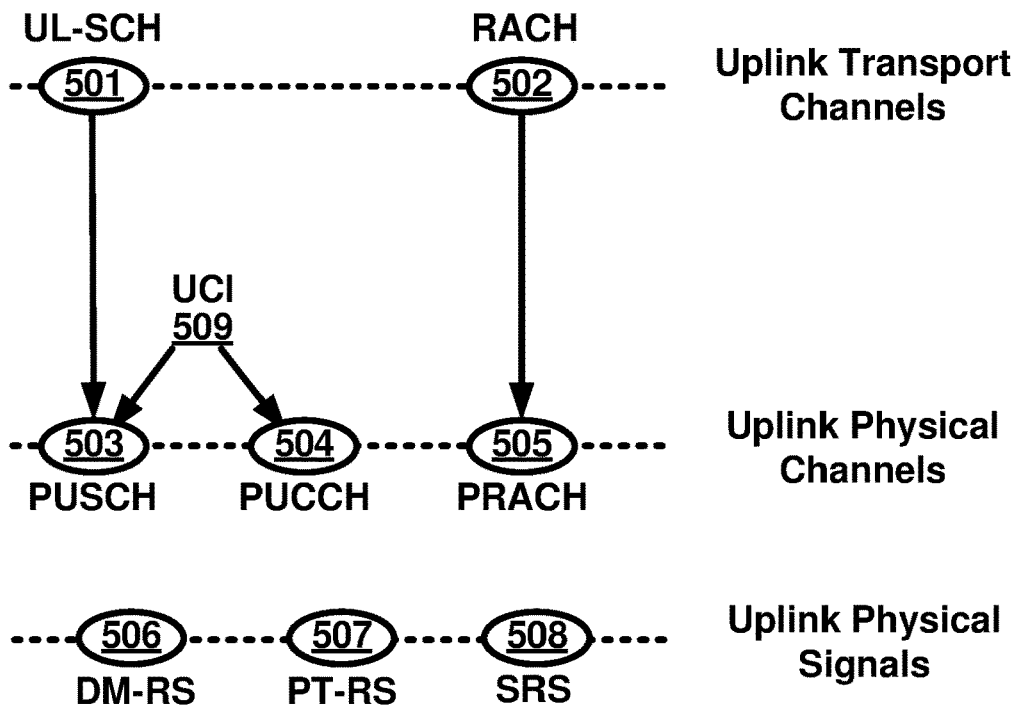
FIG. 5A is a diagram of an example uplink channel mapping and example uplink physical signals as per an aspect of an embodiment of the present disclosure.
Figure 5B:
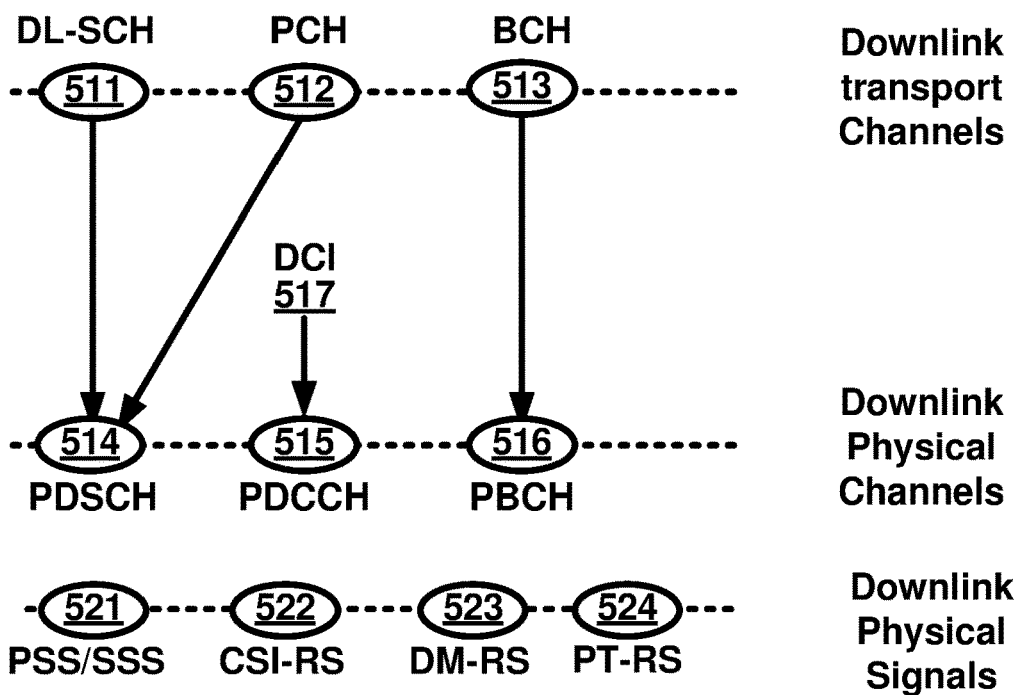
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (minislot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
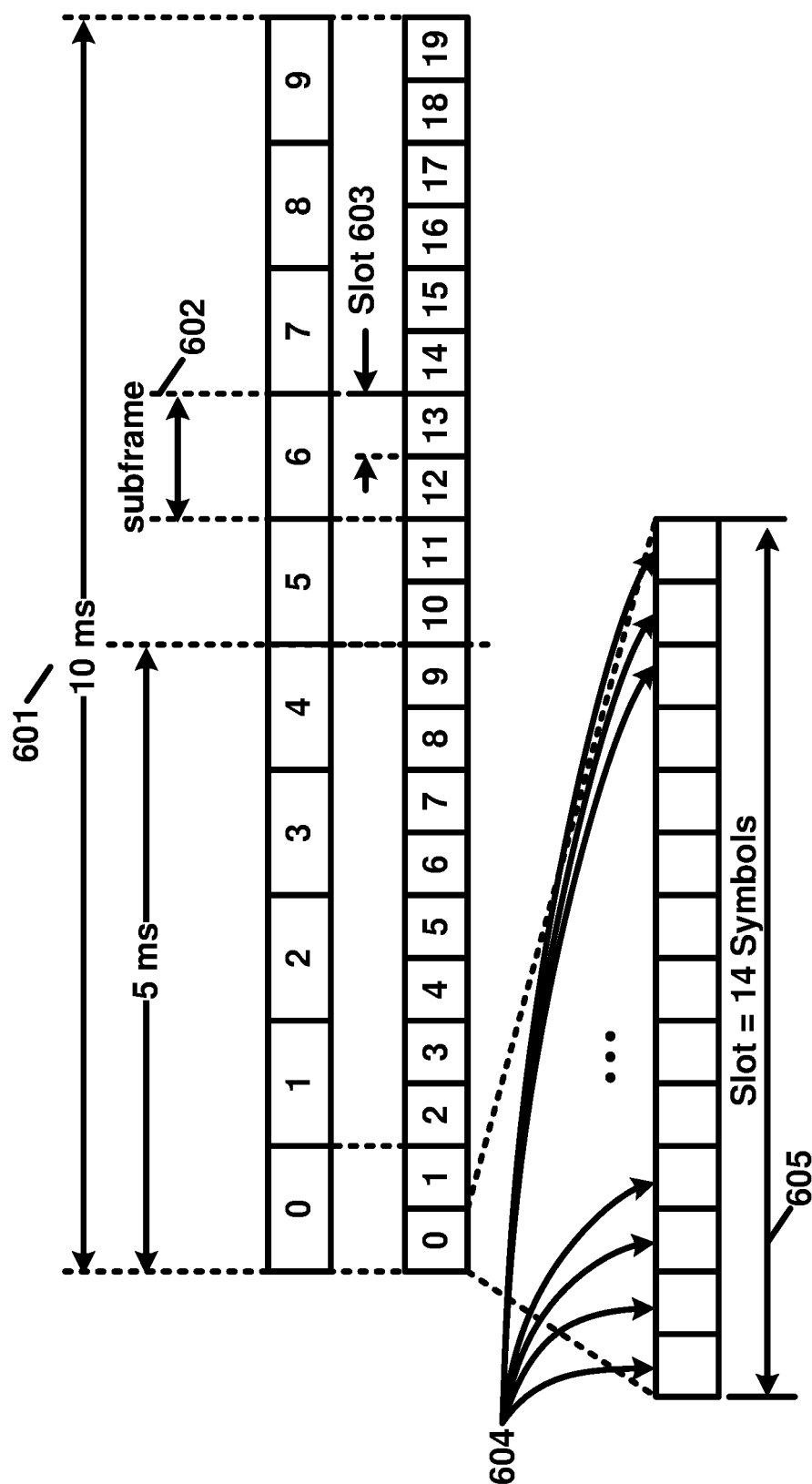
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe (s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
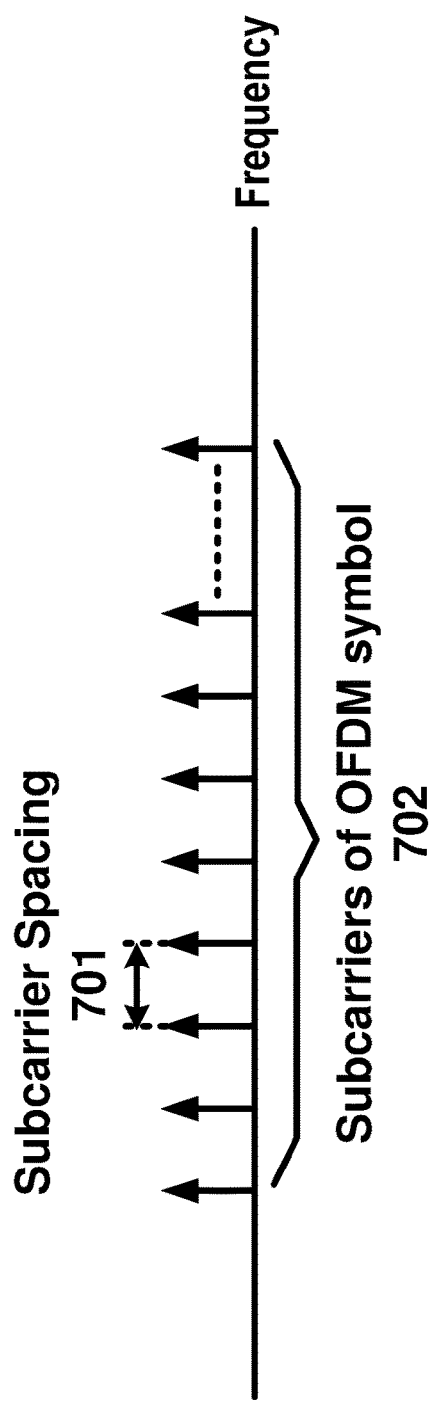
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
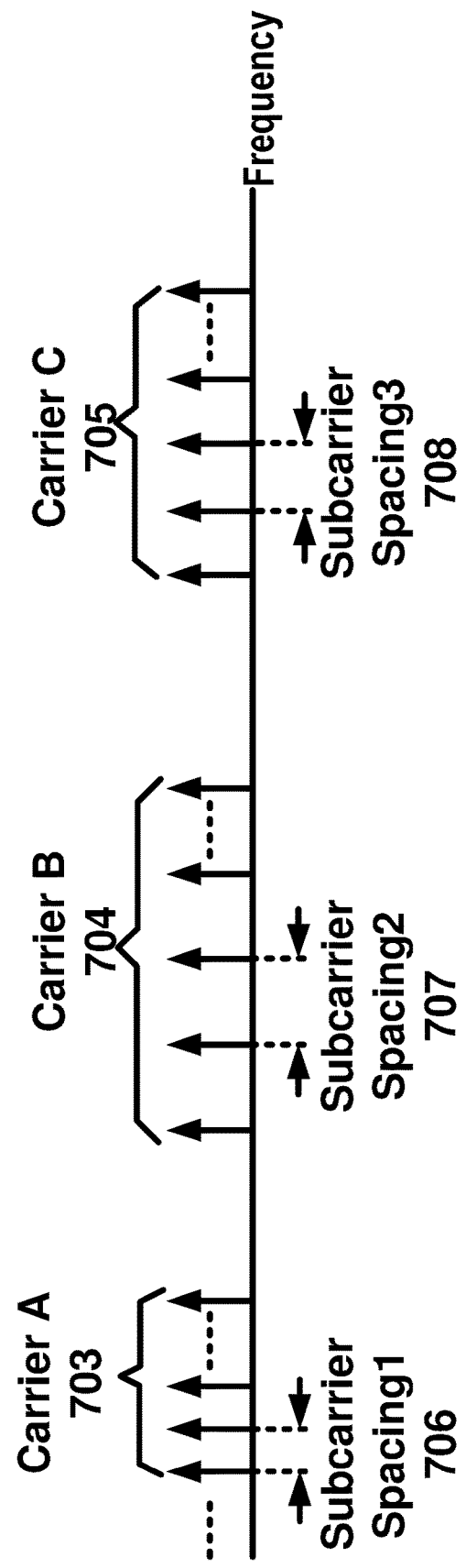

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
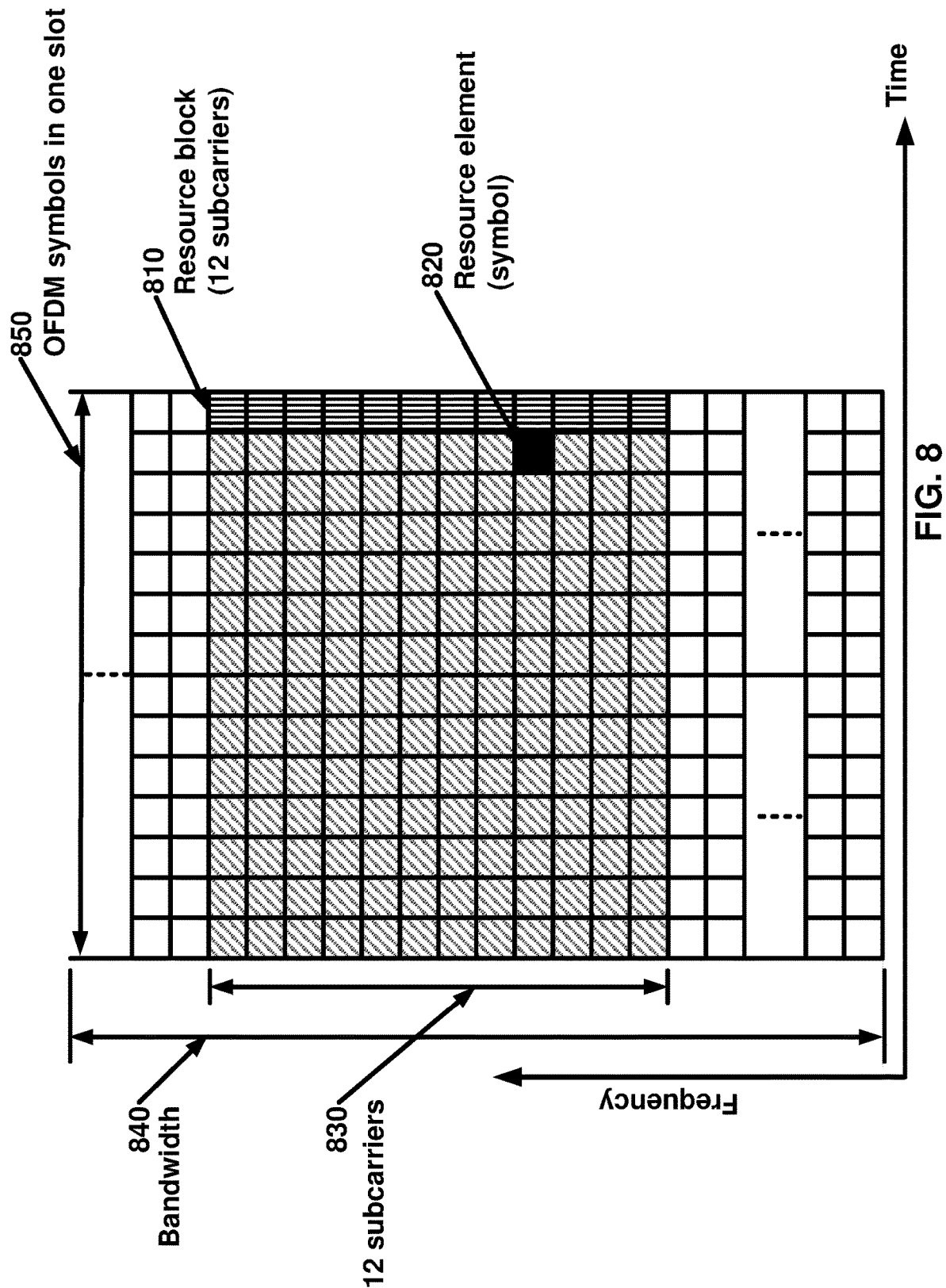
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message (s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
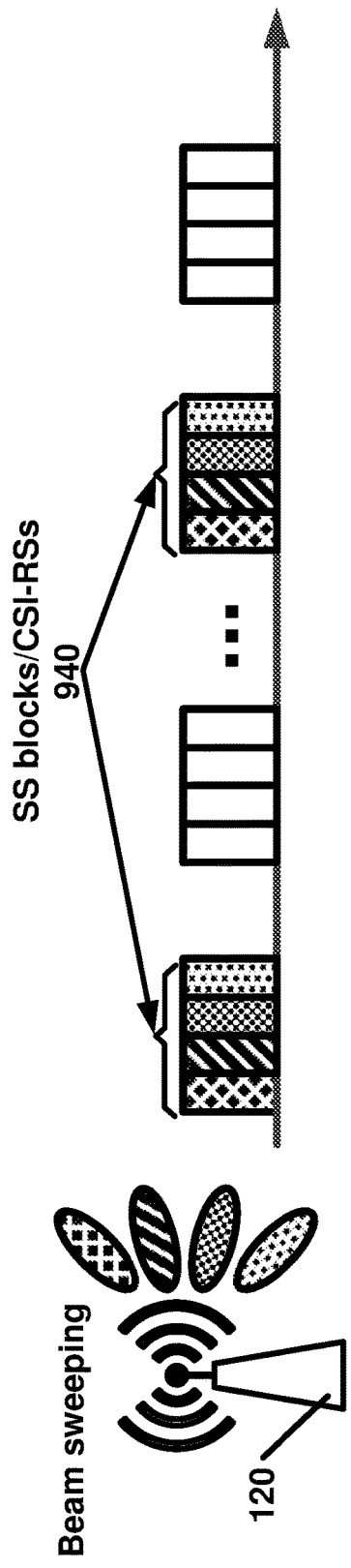
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
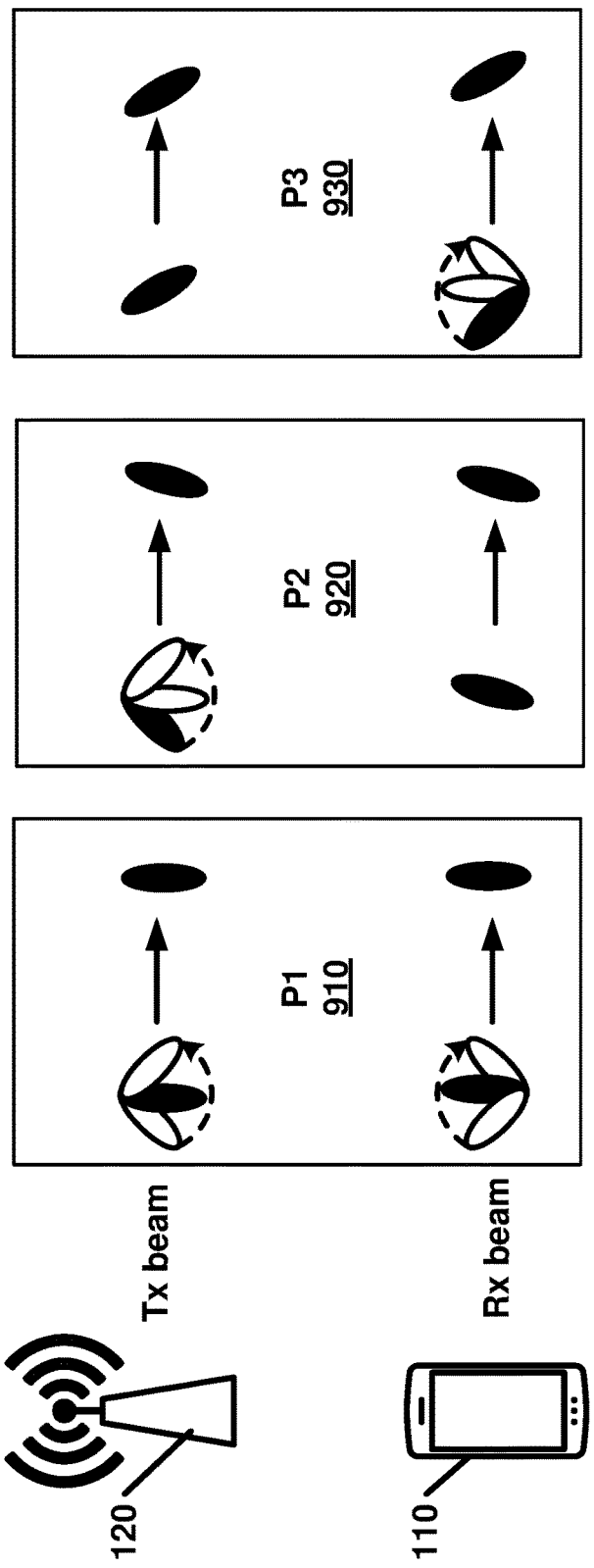
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
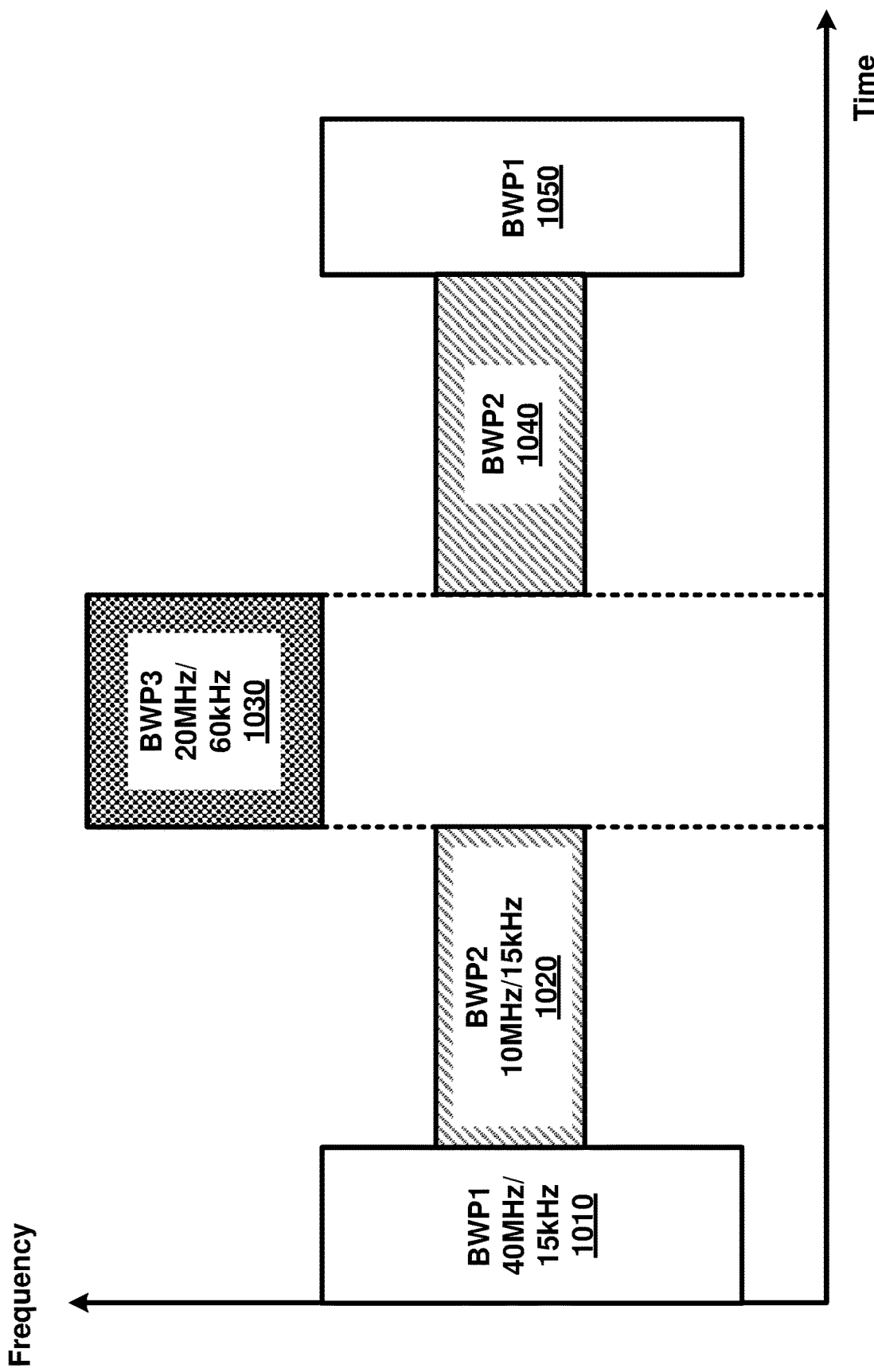
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
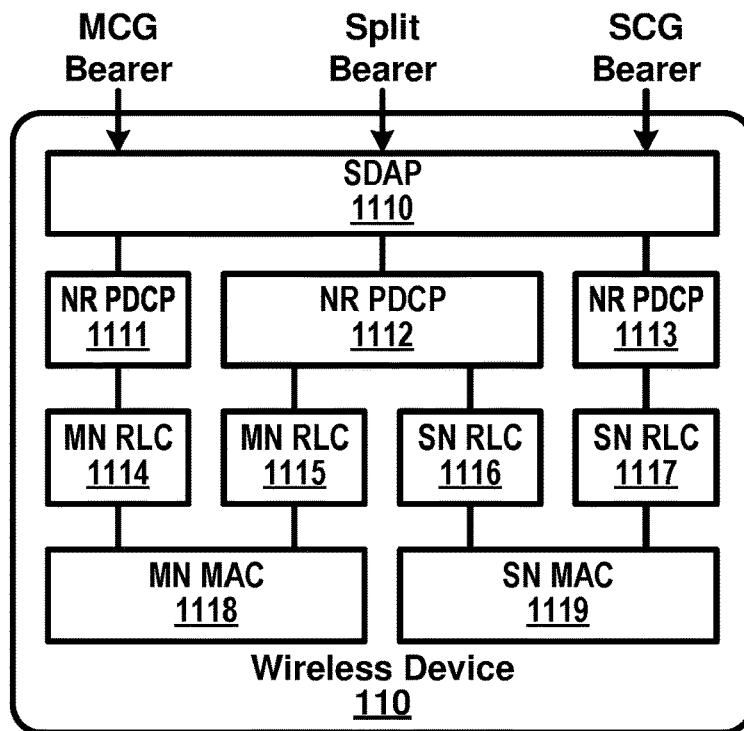
FIG. 11A, and FIG. 11B are diagrams of an example multi connectivity as per an aspect of an embodiment of the present disclosure.
Figure 11B:
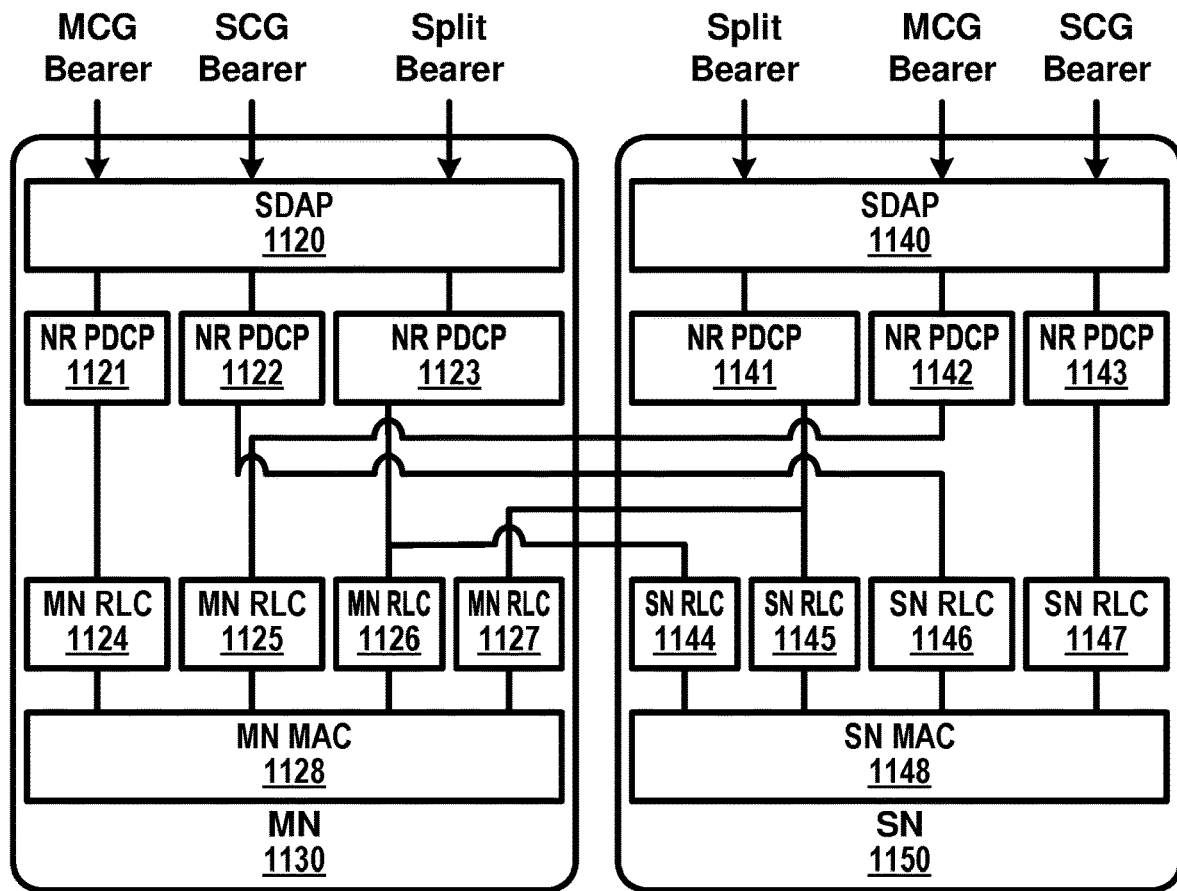

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain Radio Resource Management (RRM) measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
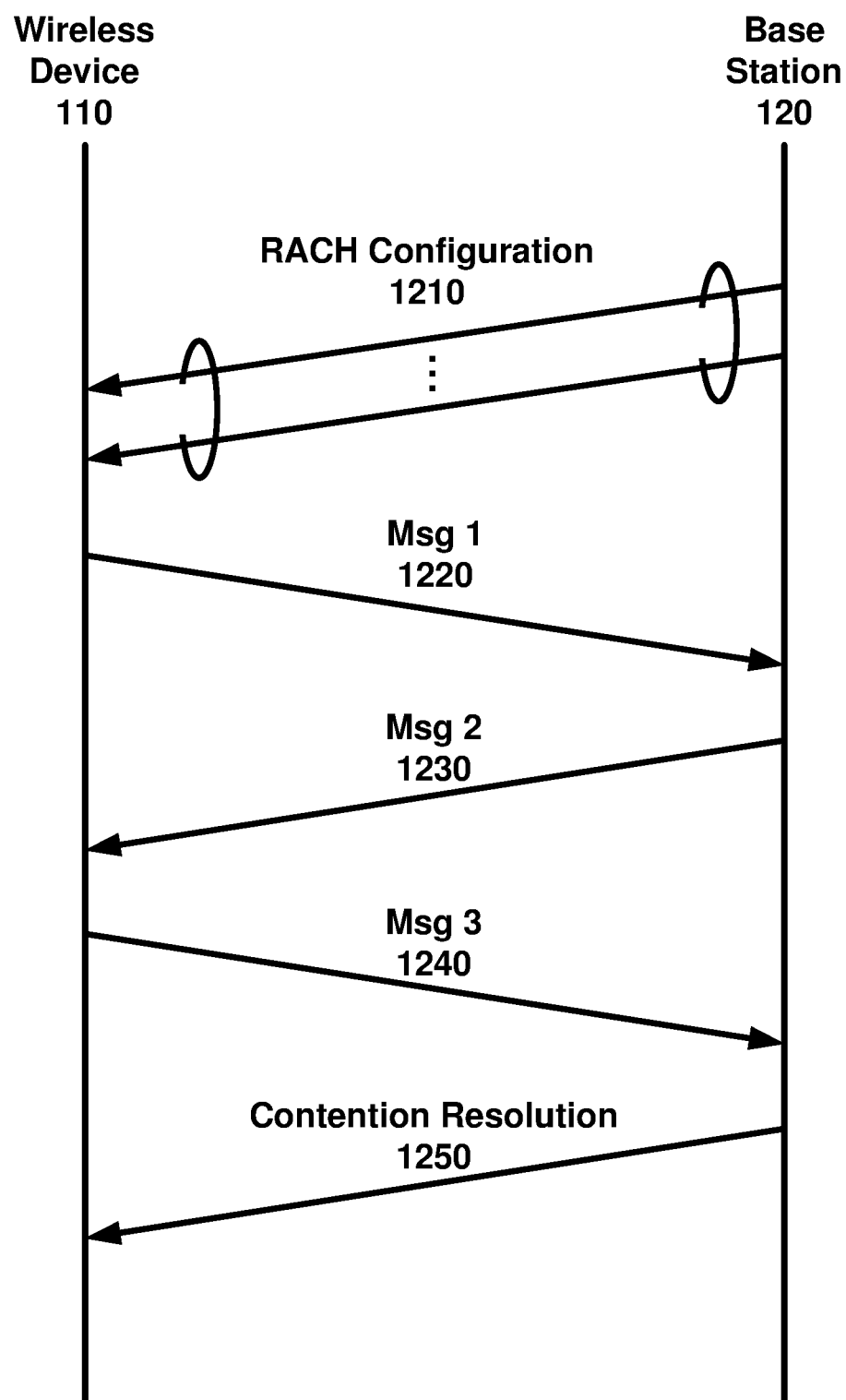
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response (s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
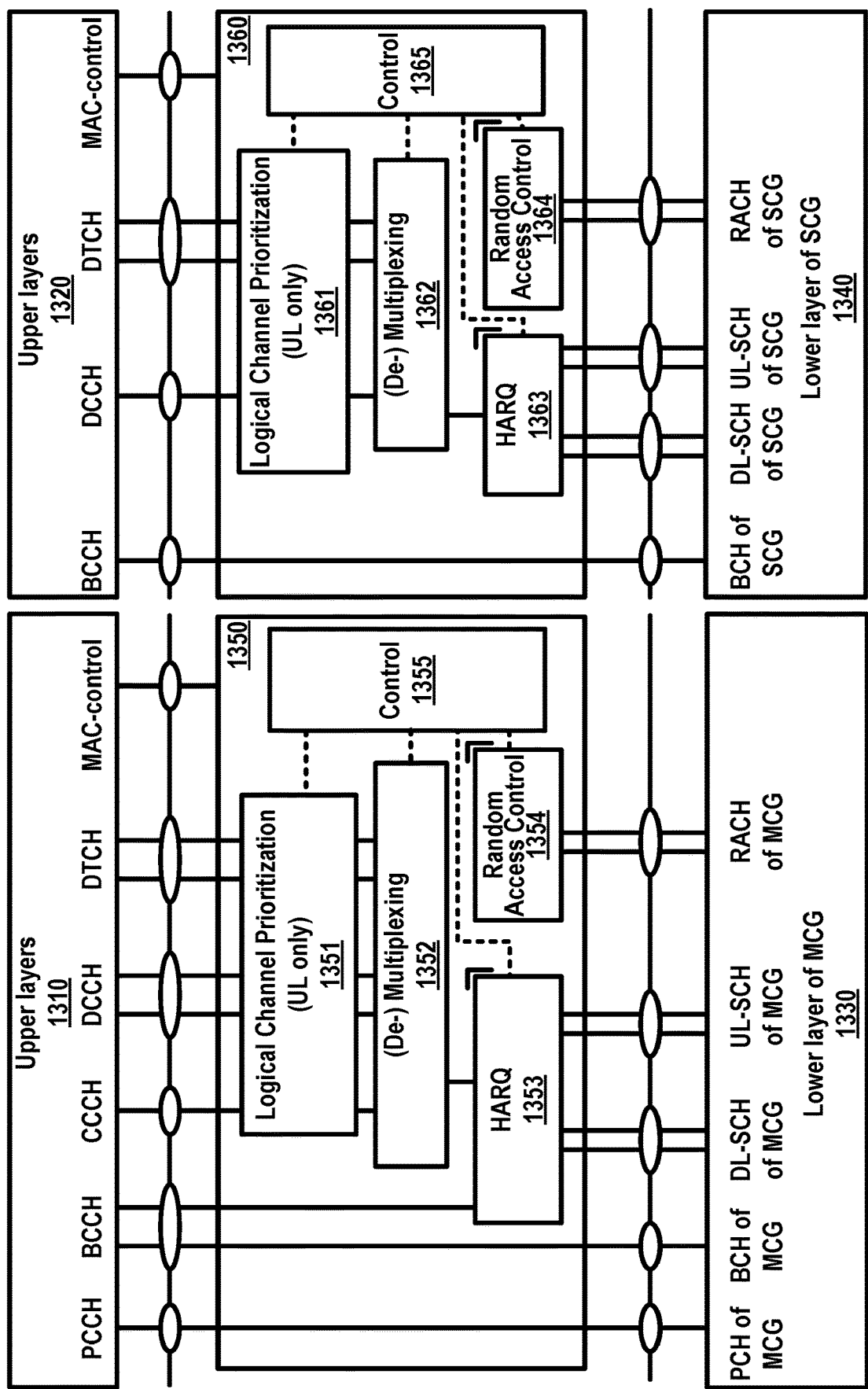
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
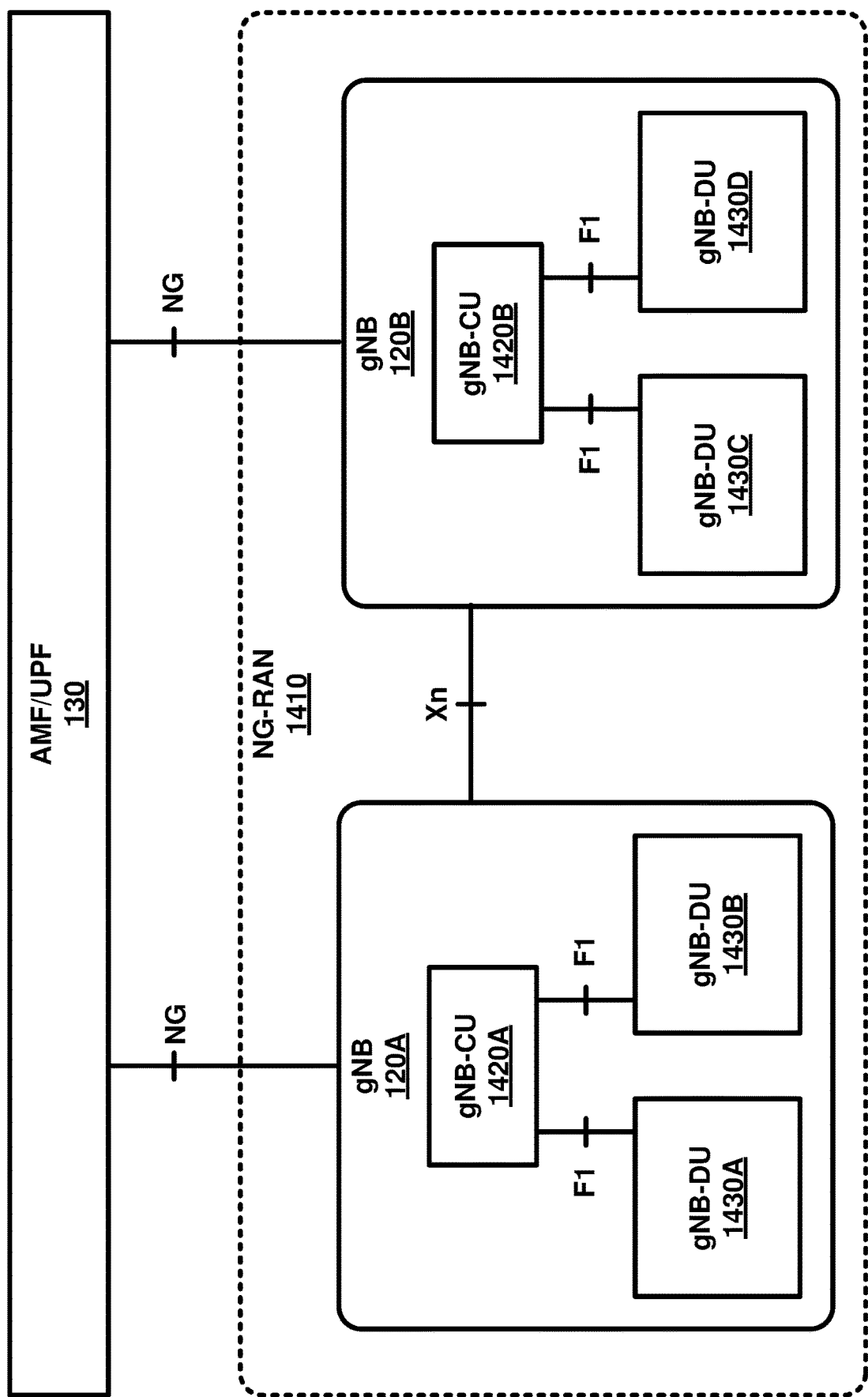
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
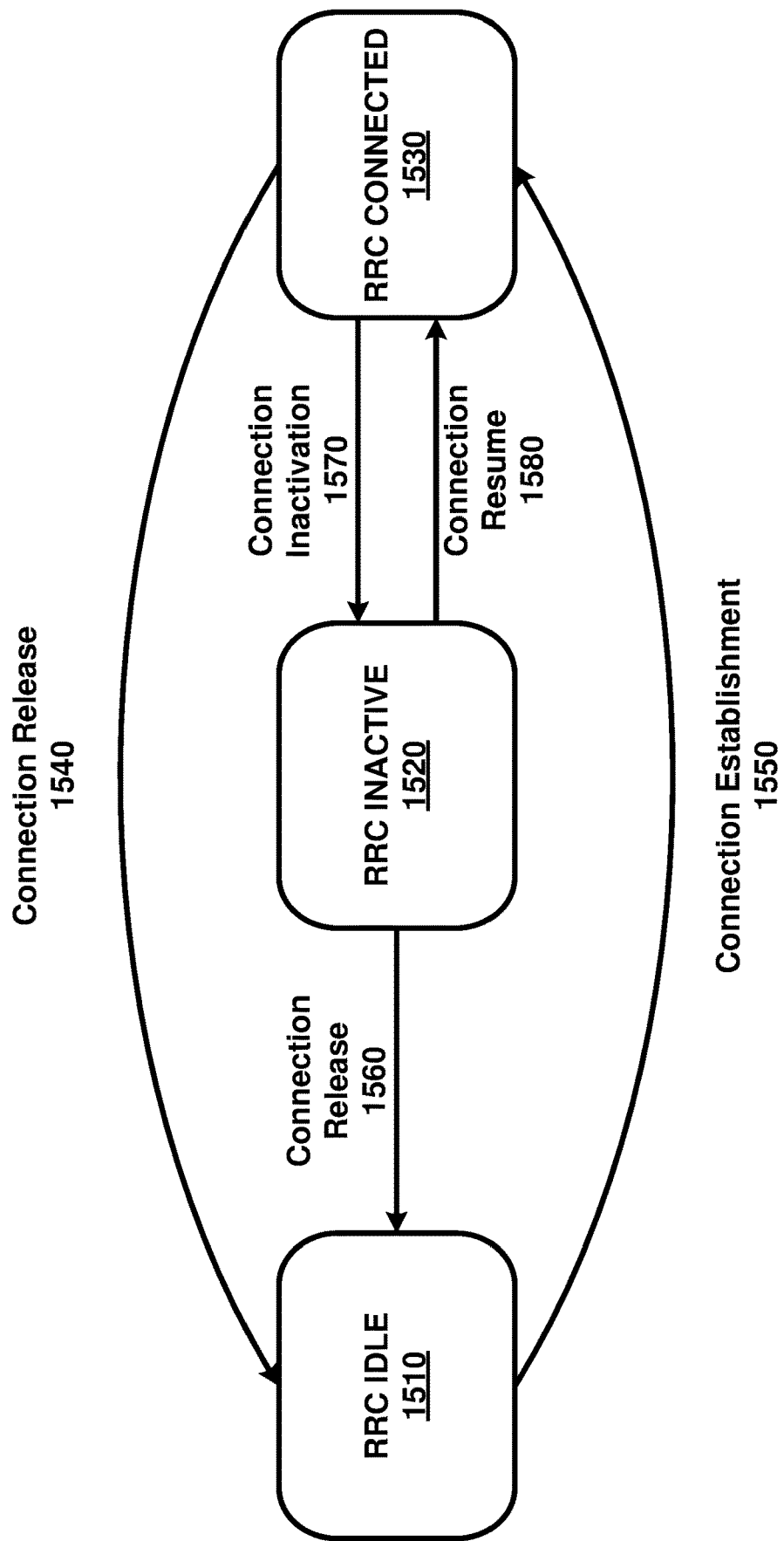
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A New Radio (NR) system may support both single beam and multi-beam operations. In a multi-beam system, a base station (e.g., gNB) may perform a downlink beam sweeping to provide coverage for downlink Synchronization Signals (SSs) and common control channels. A User Equipment (UE) may perform an uplink beam sweeping for uplink direction to access a cell. In a single beam scenario, a gNB may configure time-repetition transmission for one SS block, which may comprise at least Primary Synchronization Signal (PSS), Secondary Synchronization Signal (SSS), and Physical Broadcast Channel (PBCH), with a wide beam. In a multi-beam scenario, a gNB may configure at least some of these signals and physical channels in multiple beams. A UE may identify at least OFDM symbol index, slot index in a radio frame and radio frame number from an SS block.

Figure 16:
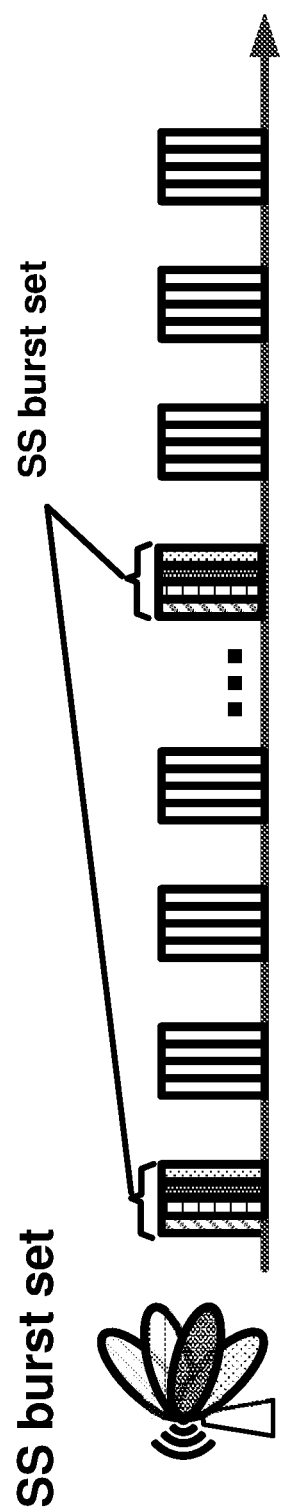
FIG. 16 is an example of SSB configuration in a NR system.

In an example, in an RRC_INACTIVE state or RRC_IDLE state, a UE may assume that SS blocks form an SS burst, and an SS burst set. An SS burst set may have a given periodicity. In multi-beam scenarios, SS blocks may be transmitted in multiple beams, together forming an SS burst. One or more SS blocks may be transmitted on one beam. A beam has a steering direction. If multiple SS bursts are transmitted with beams, these SS bursts together may form an SS burst set as shown in FIG. 16. A base station (e.g., a gNB in NR) may transmit SS bursts. A plurality of these SS bursts may comprise an SS burst set. An SS burst set may comprise any number of a plurality of SS bursts. Each SS burst within an SS burst set may transmitted at a fixed or variable periodicity.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A wireless device may identify, e.g., from an SS block, an OFDM symbol index, a slot index in a radio frame, and a radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burst set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For UEs in RRC-CONNECTED and/or RRC-IDLE state, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, a UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, a UE may assume a signal corresponding to a specific subcarrier spacing of NR-PSS/SSS in a given frequency band given by a NR specification. For NR-PSS, a Zadoff-Chu (ZC) sequence or a M sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not be required for a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

A UE may use CSI-RS in a multi-beam system for estimating the beam quality of the links between the UE and a gNB. For example, a UE may, based on measurement of CSI-RS, report Channel State Information (CSI) for downlink channel adaption. A CSI parameter may comprise at least one of: a Precoding Matrix Index (PMI); a Channel Quality Index (CQI) value; and/or a Rank Indicator (RI). A UE may, based on a Reference Signal Received Power (RSRP) measurement on CSI-RS, report a beam index, as indicated in a CSI Resource Indication (CRI) for downlink beam selection, and associated with the RSRP value of the beam.

A CSI-RS may be transmitted on a CSI-RS resource including one or more antenna ports, one or more time or frequency radio resources. A beam may be associated with a CSI-RS. A CSI-RS resource may be configured in a cell-specific way by common RRC signaling, or in a UE-specific way by dedicated RRC signaling, and/or L1/L2 signaling. Multiple UEs covered by a cell may measure a cell-specific CSI-RS resource. A dedicated subset of UEs covered by a cell may measure a UE-specific CSI-RS resource.

A CSI-RS resource may be transmitted periodically, or using aperiodic transmission, or using a multi-shot or semi-persistent transmission. In a periodic transmission, the configured CSI-RS resource may be transmitted using a configured periodicity in time domain. In an aperiodic transmission, the configured CSI-RS resource may be transmitted in a dedicated time slot. In a multi-shot or semi-persistent transmission, the configured CSI-RS resource may be transmitted within a configured period.

A gNB may configure different CSI-RS resources in terms of cell-specific or UE-specific, periodic or aperiodic or multi-shot, for different purposes (for example, beam management, CQI reporting, etc.). CSI-RSs may be periodically transmitted for a beam. A beam may be transmitted in a predefined order in time domain. Beams used for CSI-RS transmission may have different beam width with the ones used for SS-blocks transmission.

Figure 17:
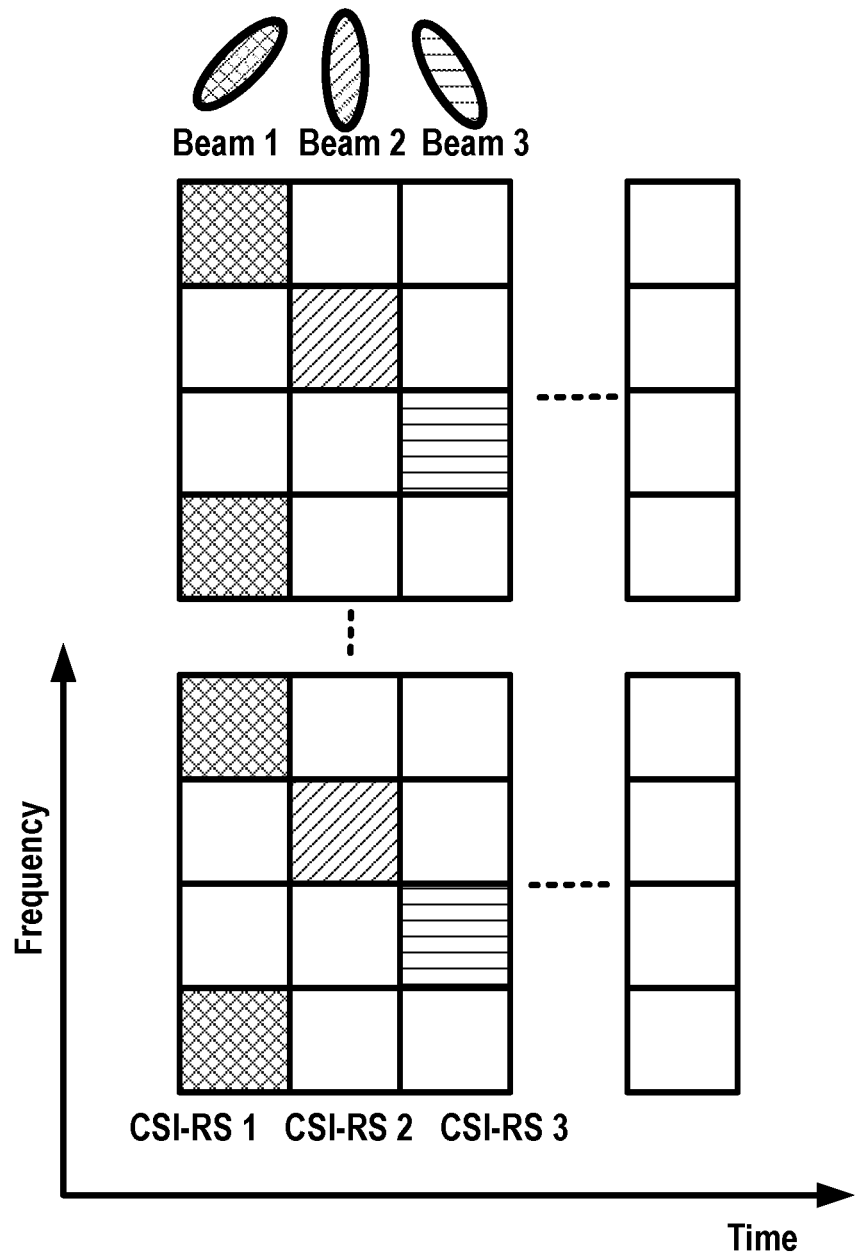
FIG. 17 is an example of CSI-RS configuration in a NR system.

FIG. 17 shows an example of a CSI-RS that may be mapped in time and frequency domains. Each square shown in FIG. 17 may represent a resource block within a bandwidth of a cell. Each resource block may comprise a number of subcarriers. A cell may have a bandwidth comprising a number of resource blocks. A base station (e.g., a gNB in NR) may transmit one or more Radio Resource Control (RRC) messages comprising CSI-RS resource configuration parameters for one or more CSI-RS. One or more of the following parameters may be configured by higher layer signaling for each CSI-RS resource configuration: CSI-RS resource configuration identity, number of CSI-RS ports, CSI-RS configuration (e.g., symbol and RE locations in a subframe), CSI-RS subframe configuration (e.g., subframe location, offset, and periodicity in a radio frame), CSI-RS power parameter, CSI-RS sequence parameter, CDM type parameter, frequency density, transmission comb, QCL parameters, and/or other radio resource parameters.

FIG. 17 shows three beams that may be configured for a wireless device, e.g., in a wireless device-specific configuration. Any number of additional beams (e.g., represented by the column of blank squares) or fewer beams may be included. Beam 1 may be allocated with CSI-RS 1 that may be transmitted in some subcarriers in a resource block (RB) of a first symbol. Beam 2 may be allocated with CSI-RS 2 that may be transmitted in some subcarriers in a RB of a second symbol. Beam 3 may be allocated with CSI-RS 3 that may be transmitted in some subcarriers in a RB of a third symbol. All subcarriers in a RB may not necessarily be used for transmitting a particular CSI-RS (e.g., CSI-RS 1) on an associated beam (e.g., beam 1) for that CSI-RS. By using frequency division multiplexing (FDM), other subcarriers, not used for beam 1 for the wireless device in the same RB, may be used for other CSI-RS transmissions associated with a different beam for other wireless devices. Additionally or alternatively, by using time domain multiplexing (TDM), beams used for a wireless device may be configured such that different beams (e.g., beam 1, beam 2, and beam 3) for the wireless device may be transmitted using some symbols different from beams of other wireless devices. For some type of MIMO technologies, CSI-RS resources may be activated or deactivated by a MAC signaling, over the CSI-RS resources configured by a RRC signaling. The network may activate and deactivate the configured CSI-RS resources of a serving cell by sending the Activation/Deactivation of CSI-RS resources MAC control element. The configured CSI-RS resources are initially deactivated upon configuration and after a handover.

In an example, a gNB may transmit a DCI via a PDCCH for at least one of: a scheduling assignment/grant; a slot format notification; a pre-emption indication; and/or a power-control command(s). More specifically, the DCI may comprise at least one of: an identifier of a DCI format; a downlink scheduling assignment(s); an uplink scheduling grant(s); a slot format indicator; a pre-emption indication; a power-control for PUCCH/PUSCH; and/or a power-control for SRS.

In an example, a downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH.

In an example, an uplink scheduling grant DCI may comprise parameters indicating at least one of: an identifier of a DCI format; a PUSCH resource indication; a transport format; HARQ related information; and/or a power control command of the PUSCH.

In an example, different types of control information may correspond to different DCI message sizes. For example, supporting multiple beams and/or spatial multiplexing in the spatial domain and noncontiguous allocation of RBs in the frequency domain may require a larger scheduling message in comparison with an uplink grant allowing for frequency-contiguous allocation. DCI may be categorized into different DCI formats, where a format corresponds to a certain message size and/or usage.

In an example, a wireless device may monitor one or more PDCCHs for detecting one or more DCI with one or more DCI formats in a common search space or a wireless device-specific search space. In an example, a wireless device may monitor a PDCCH with a limited set of DCI formats to save power consumption. In general, the wireless device consumes more power for each additional DCI format the wireless device is to detect.

In an example, the information in a DCI with a DCI format used for downlink scheduling may comprise at least one of: an identifier of a DCI format; a carrier indicator; frequency domain resource assignment; time domain resource assignment; a bandwidth part indicator; a HARQ process number; one or more MCSs; one or more NDIs; one or more RVs; MIMO related information; a Downlink Assignment Index (DAI); a PUCCH resource indicator; a PDSCH-to-HARQ_feedback timing indicator; a TPC for PUCCH; an SRS request; and padding if necessary. In an example, the MIMO related information may comprise at least one of: a PMI; precoding information; a transport block swap flag; a power offset between PDSCH and a reference signal; a reference-signal scrambling sequence; a number of layers; and/or antenna ports for downlink transmissions; and/or a Transmission Configuration Indication (TCI).

In an example, the information in a DCI with a DCI format used for uplink scheduling may comprise at least one of: an identifier of a DCI format; a carrier indicator; a bandwidth part indication; a resource allocation type; a frequency domain resource assignment; a time domain resource assignment; an MCS; an NDI; a phase rotation of the uplink DMRS; precoding information; a CSI request; an SRS request; an uplink index/DAI; a TPC for PUSCH; and/or padding if necessary.

In an example, a gNB may perform CRC scrambling for a DCI before transmitting the DCI via a PDCCH. The gNB may perform CRC scrambling by binary addition of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, or TPC-SRS-RNTI) and the CRC bits of the DCI. The wireless device may check the CRC bits of the DCI when detecting the DCI. The wireless device may receive the DCI when the CRC is scrambled by a sequence of bits that is the same as the at least one wireless device identifier.

In an example, in order to support wide bandwidth operation, a gNB may transmit one or more PDCCHs in different control resource sets ("coresets"). In an example, a gNB may transmit one or more RRC messages comprising configuration parameters of one or more coresets. A coreset of the one or more coresets may comprise at least one of: a first OFDM symbol; a number of consecutive OFDM symbols; a set of resource blocks; and/or a CCE-to-REG mapping. In an example, a gNB may transmit a PDCCH in a dedicated coreset for a particular purpose, including, for example, beam failure recovery confirmation.

In an example, a wireless device may monitor PDCCH for detecting DCI in one or more configured coresets, to reduce the power consumption.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward.

In an example, a MAC CE may be a bit string that is byte aligned (e.g., a multiple of eight bits) in length.

In an example, a MAC subheader may be a bit string that is byte aligned (e.g., a multiple of eight bits) in length. In an example, a MAC subheader may be placed immediately in front of a corresponding MAC SDU, MAC CE, or padding.

In an example, a MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 18A:
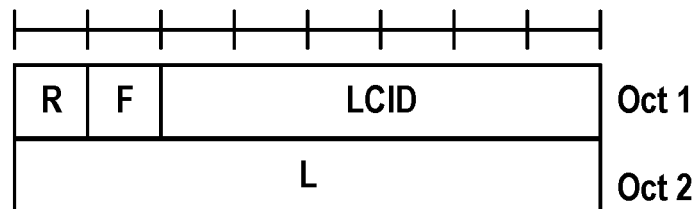
FIG. 18A, FIG. 18B and FIG. 18C are examples of MAC subheaders as per an aspect of an embodiment of the present disclosure.
Figure 18B:
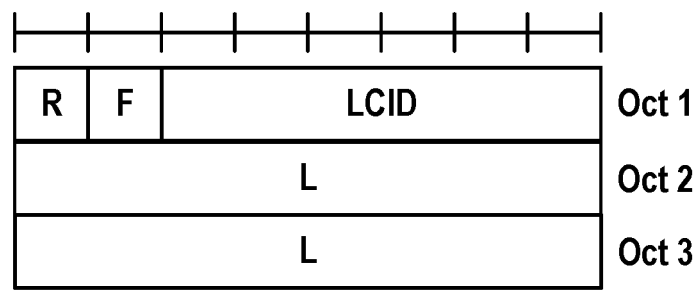

FIG. 18A shows an example of a MAC subheader with an R field, an F field, an LCID field, and an L field. In the example MAC subheader of FIG. 18A, the LCID field may be six bits in length, and the L field may be eight bits in length. FIG. 18B shows example of a MAC subheader with an R field, a F field, an LCID field, and an L field. In the example MAC subheader of FIG. 18B, the LCID field may be six bits in length, and the L field may be sixteen bits in length.

Figure 18C:
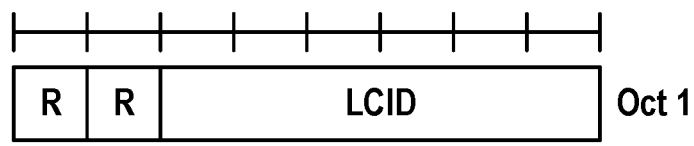

In an example, when a MAC subheader corresponds to a fixed sized MAC CE or padding, the MAC subheader may comprise: an R field with a two bit length and an LCID field with a multi-bit length. FIG. 18C shows an example of a MAC subheader with an R field and an LCID field. In the example MAC subheader of FIG. 16C, the LCID field may be six bits in length, and the R field may be two bits in length.

Figure 19A:
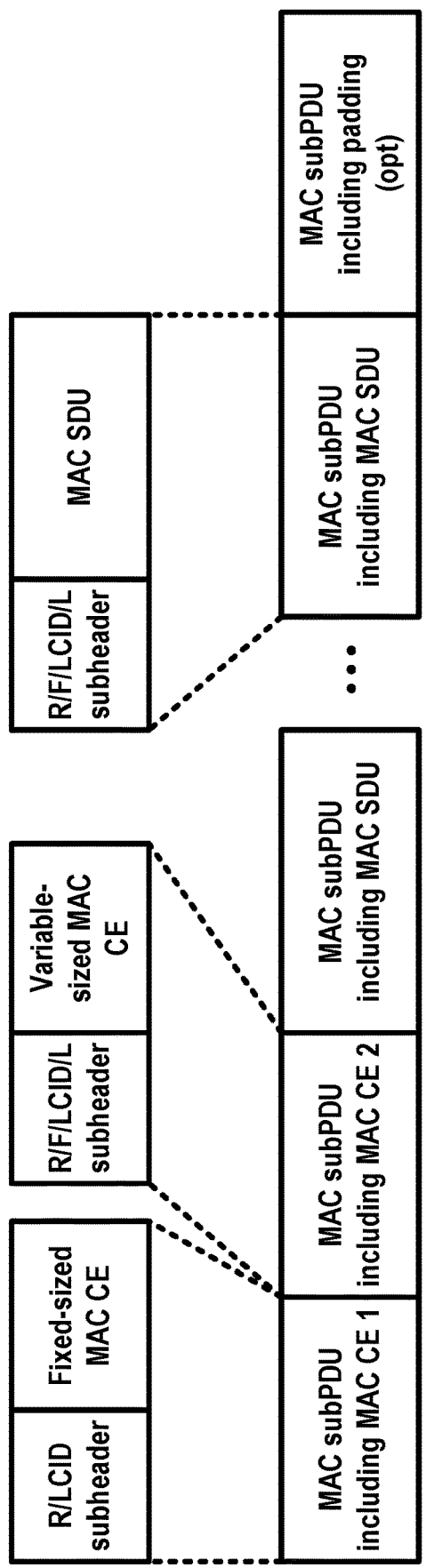
FIG. 19A and FIG. 19B are examples of MAC PDUs as per an aspect of an embodiment of the present disclosure.

FIG. 19A shows an example of a DL MAC PDU. In the example of FIG. 19A, multiple MAC CEs, such as MAC CE 1 and 2, may be placed together. A MAC subPDU comprising a MAC CE may be placed before any MAC subPDU comprising a MAC SDU or a MAC subPDU comprising padding.

Figure 19B:
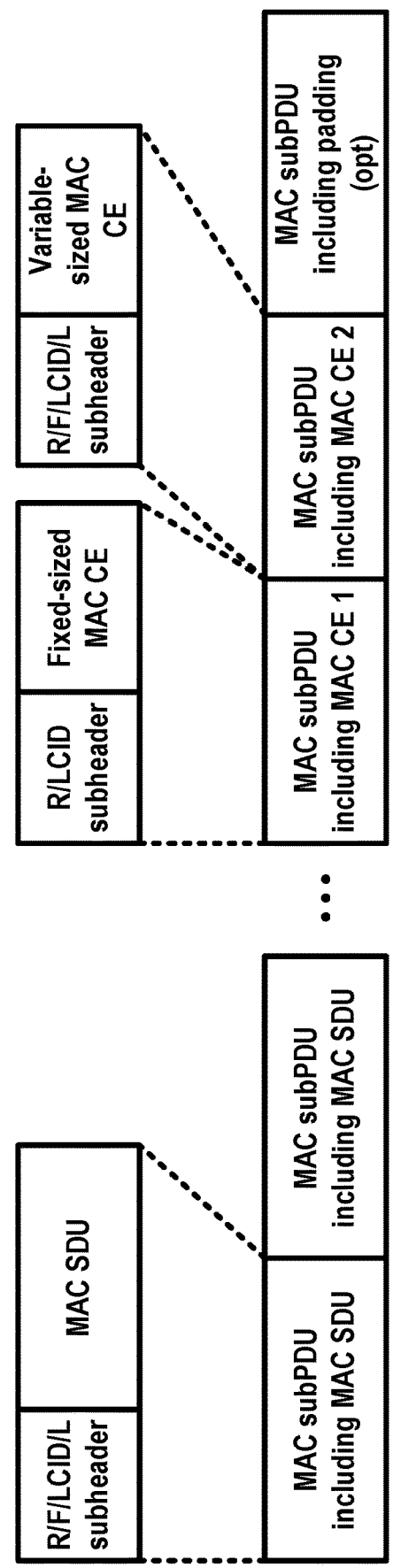

FIG. 19B shows an example of a UL MAC PDU. In the example of FIG. 19B, multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 20 shows an example of multiple LCIDs that may be associated with the one or more MAC CEs. In the example of FIG. 20, the one or more MAC CEs comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; an SCell activation/deactivation MAC CE (1 Octet); an SCell activation/deactivation MAC CE (4 Octet); and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 21 shows an example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising: SRS transmissions on the SCell; CQI/PMI/RI/CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 22A:
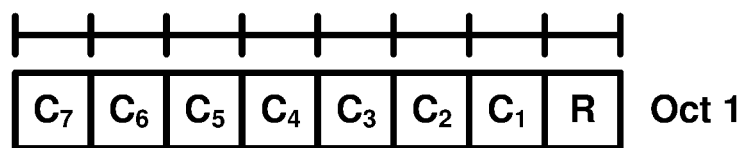
FIG. 22A is an example of an SCell Activation/Deactivation MAC CE of one octet as per an aspect of an embodiment of the present disclosure.

FIG. 22A shows an example of an SCell Activation/Deactivation MAC CE of one octet. A first MAC PDU subheader with a first LCID (e.g., '111010' as shown in FIG. 20) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 22B:
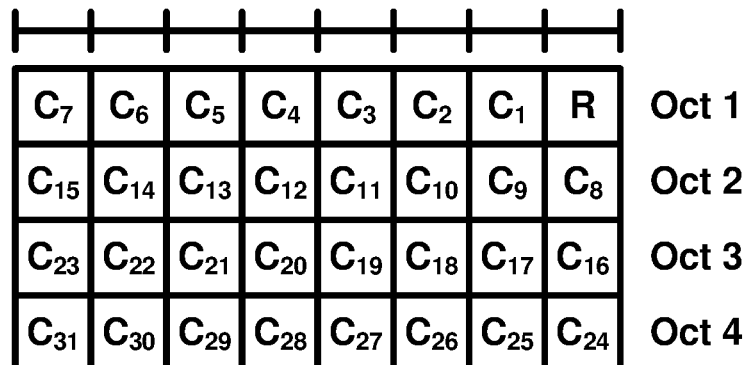
FIG. 22B is an example of an SCell Activation/Deactivation MAC CE of four octets as per an aspect of an embodiment of the present disclosure.

FIG. 22B shows an example of an SCell Activation/Deactivation MAC CE of four octets. A second MAC PDU subheader with a second LCID (e.g., '111001' as shown in FIG. 20) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 22A and/or FIG. 22B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 22A and FIG. 22B, an R field may indicate a reserved bit. The R field may be set to zero.

When configured with CA, a base station and/or a wireless device may employ a hibernation mechanism for an SCell to improve battery or power consumption of the wireless device and/or to improve latency of SCell activation/addition. When the wireless device hibernates the SCell, the SCell may be transitioned into a dormant state. In response to the SCell being transitioned into a dormant state, the wireless device may: stop transmitting SRS on the SCell; report CQI/PMI/RI/PTI/CRI for the SCell according to a periodicity configured for the SCell in a dormant state; not transmit on UL-SCH on the SCell; not transmit on RACH on the SCell; not monitor the PDCCH on the SCell; not monitor the PDCCH for the SCell; and/or not transmit PUCCH on the SCell. In an example, reporting CSI for an SCell and not monitoring the PDCCH on/for the SCell, when the SCell is in a dormant state, may provide the base station an always-updated CSI for the SCell. With the always-updated CSI, the base station may employ a quick and/or accurate channel adaptive scheduling on the SCell once the SCell is transitioned back into active state, thereby speeding up the activation procedure of the SCell. In an example, reporting CSI for the SCell and not monitoring the PDCCH on/for the SCell, when the SCell is in dormant state, may improve battery or power consumption of the wireless device, while still providing the base station timely and/or accurate channel information feedback. In an example, a PCell/PSCell and/or a PUCCH secondary cell may not be configured or transitioned into dormant state.

When configured with one or more SCells, a gNB may activate, hibernate, or deactivate at least one of the one or more SCells. In an example, a gNB may transmit one or more RRC messages comprising parameters indicating at least one SCell being set to an active state, a dormant state, or an inactive state, to a wireless device.

In an example, when an SCell is in an active state, the wireless device may perform: SRS transmissions on the SCell; CQI/PMI/RI/CRI reporting for the SCell; PDCCH monitoring on the SCell; PDCCH monitoring for the SCell; and/or PUCCH/SPUCCH transmissions on the SCell.

In an example, when an SCell is in an inactive state, the wireless device may: not transmit SRS on the SCell; not report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

In an example, when an SCell is in a dormant state, the wireless device may: not transmit SRS on the SCell; report CQI/PMI/RI/CRI for the SCell; not transmit on UL-SCH on the SCell; not transmit on RACH on the SCell; not monitor PDCCH on the SCell; not monitor PDCCH for the SCell; and/or not transmit PUCCH/SPUCCH on the SCell.

When configured with one or more SCells, a gNB may activate, hibernate, or deactivate at least one of the one or more SCells. In an example, a gNB may transmit one or more MAC control elements comprising parameters indicating activation, deactivation, or hibernation of at least one SCell to a wireless device.

In an example, a gNB may transmit a first MAC CE (e.g., activation/deactivation MAC CE, as shown in FIG. 22A or FIG. 22B) indicating activation or deactivation of at least one SCell to a wireless device. In FIG. 22A and/or FIG. 22B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 22A and FIG. 22B, an R field may indicate a reserved bit. In an example, the R field may be set to zero.

In an example, a gNB may transmit a second MAC CE (e.g., hibernation MAC CE) indicating activation or hibernation of at least one SCell to a wireless device. In an example, the second MAC CE may be associated with a second LCID different from a first LCID of the first MAC CE (e.g., activation/deactivation MAC CE). In an example, the second MAC CE may have a fixed size. In an example, the second MAC CE may consist of a single octet containing seven C-fields and one R-field. FIG. 23A shows an example of the second MAC CE with a single octet. In another example, the second MAC CE may consist of four octets containing 31 C-fields and one R-field. FIG. 23B shows an example of the second MAC CE with four octets. In an example, the second MAC CE with four octets may be associated with a third LCID different from the second LCID for the second MAC CE with a single octet, and/or the first LCID for activation/deactivation MAC CE. In an example, when there is no SCell with a serving cell index greater than 7, the second MAC CE of one octet may be applied, otherwise the second MAC CE of four octets may be applied.

In an example, when the second MAC CE is received, and the first MAC CE is not received, $C_i$ may indicate a dormant/activated status of an SCell with SCell index i if there is an SCell configured with SCell index i, otherwise the MAC entity may ignore the $C_i$ field. In an example, when $C_i$ is set to "1", the wireless device may transition an SCell associated with SCell index i into a dormant state. In an example, when $C_i$ is set to "0", the wireless device may activate an SCell associated with SCell index i. In an example, when $C_i$ is set to "0" and the SCell with SCell index i is in a dormant state, the wireless device may activate the SCell with SCell index i. In an example, when $C_i$ is set to "0" and the SCell with SCell index i is not in a dormant state, the wireless device may ignore the $C_i$ field.

Figure 24:
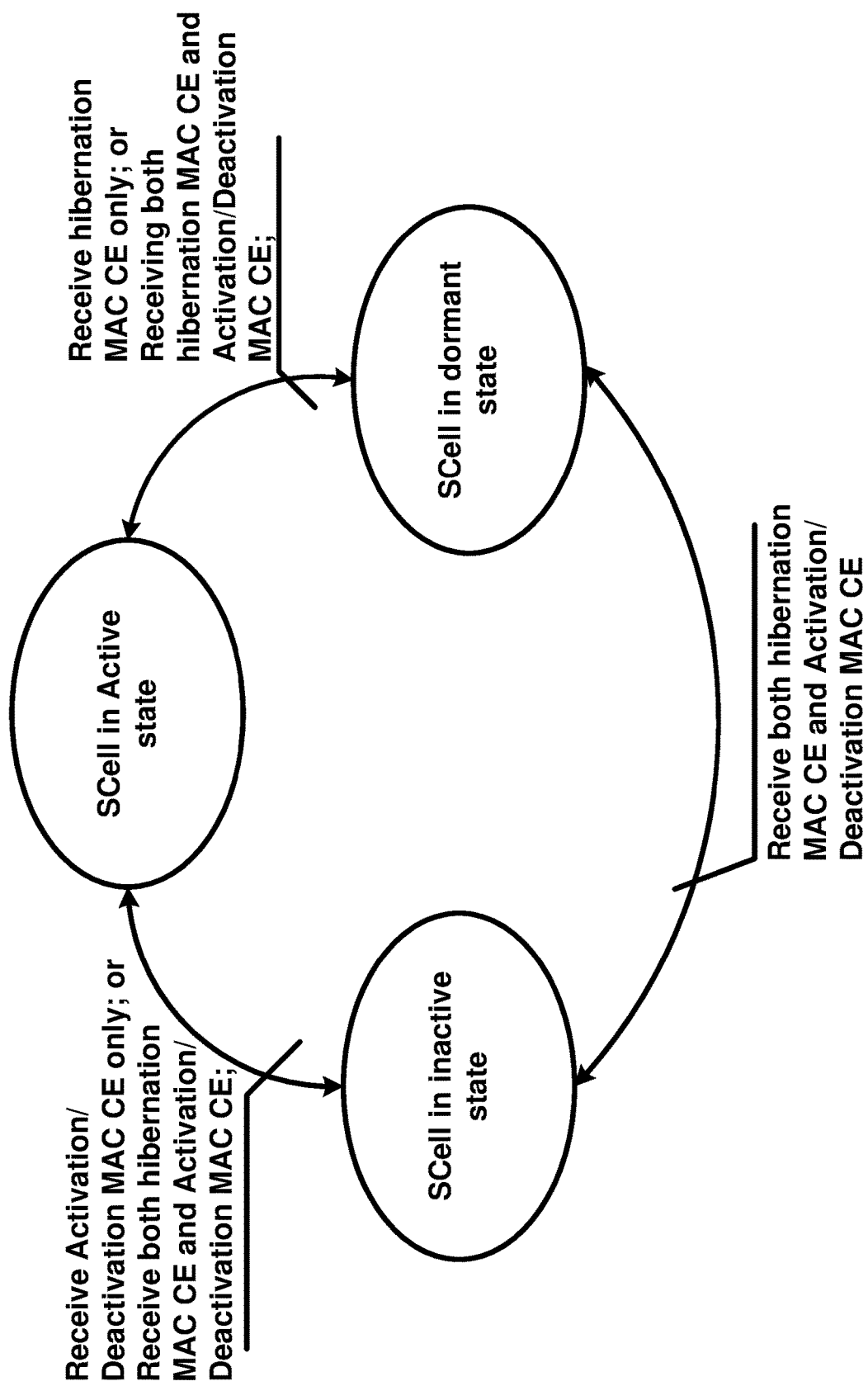
FIG. 24 is an example of a signaling-based SCell state transition as per an aspect of an embodiment of the present disclosure.

In an example, when both the first MAC CE (activation/deactivation MAC CE) and the second MAC CE (hibernation MAC CE) are received, two $C_i$ fields of the two MAC CEs may indicate possible state transitions of the SCell with SCell index i if there is an SCell configured with SCell index i, otherwise the MAC entity may ignore the $C_i$ fields. In an example, the $C_i$ fields of the two MAC CEs may be interpreted according to FIG. 23C. FIG. 24 shows an example of SCell state transitions based on activation/deactivation MAC CE and/or hibernation MAC CE.

When configured with one or more SCells, a gNB may activate, hibernate, or deactivate at least one of the one or more SCells. In an example, a MAC entity of a gNB and/or a wireless device may maintain an SCell deactivation timer (e.g., sCellDeactivationTimer) per configured SCell (except the SCell configured with PUCCH/SPUCCH, if any) and deactivate the associated SCell upon its expiry.

In an example, a MAC entity of a gNB and/or a wireless device may maintain an SCell hibernation timer (e.g., sCell-HibernationTimer) per configured SCell (except the SCell configured with PUCCH/SPUCCH, if any) and hibernate the associated SCell upon the SCell hibernation timer expiry if the SCell is in active state. In an example, when both the SCell deactivation timer and the SCell hibernation timer are configured, the SCell hibernation timer may take priority over the SCell deactivation timer. In an example, when both the SCell deactivation timer and the SCell hibernation timer are configured, a gNB and/or a wireless device may ignore the SCell deactivation timer regardless of the SCell deactivation timer expiry.

In an example, a MAC entity of a gNB and/or a wireless device may maintain a dormant SCell deactivation timer (e.g., dormantSCellDeactivationTimer) per configured SCell (except the SCell configured with PUCCH/SPUCCH, if any), and deactivate the associated SCell upon the dormant SCell deactivation timer expiry if the SCell is in dormant state.

Figure 25:
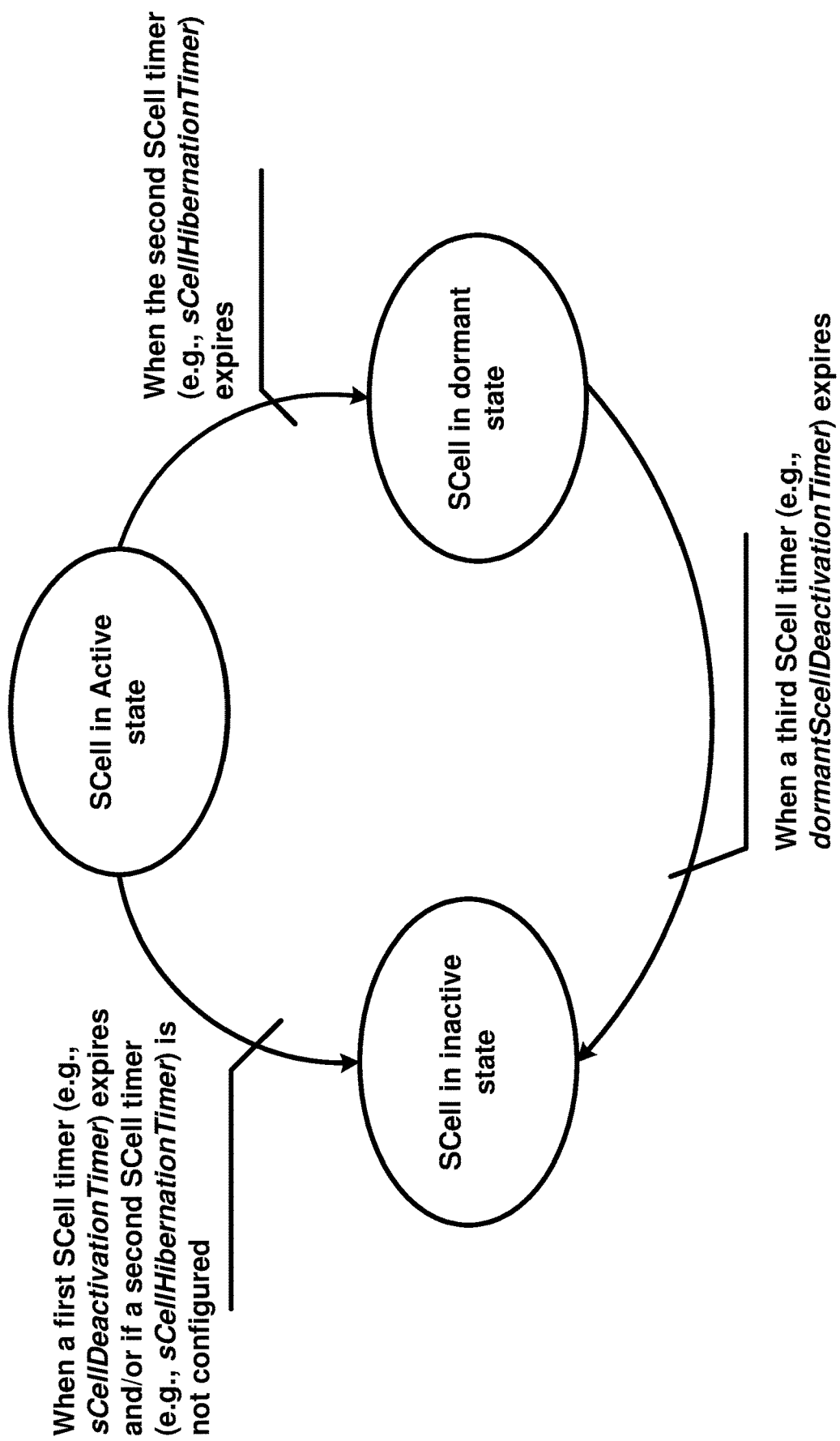
FIG. 25 is an example of a timer-based SCell state transition as per an aspect of an embodiment of the present disclosure.

FIG. 25 shows an example of SCell state transitions based on a first SCell timer (e.g., an SCell deactivation timer or sCellDeactivationTimer), a second SCell timer (e.g., an SCell hibernation timer or sCellHibernationTimer), and/or a third SCell timer (e.g., a dormant SCell deactivation timer or dormantSCellDeactivationTimer).

In an example, when a MAC entity of a wireless device is configured with an activated SCell upon SCell configuration, the MAC entity may activate the SCell. In an example, when a MAC entity of a wireless device receives a MAC CE(s) activating an SCell, the MAC entity may activate the SCell. In an example, the MAC entity may start or restart the SCell deactivation timer associated with the SCell in response to activating the SCell. In an example, the MAC entity may start or restart the SCell hibernation timer (if configured) associated with the SCell in response to activating the SCell. In an example, the MAC entity may trigger PHR procedure in response to activating the SCell.

In an example, when a MAC entity of a wireless device receives a MAC CE(s) indicating deactivating an SCell, the MAC entity may deactivate the SCell. In an example, in response to receiving the MAC CE(s), the MAC entity may: deactivate the SCell; stop an SCell deactivation timer associated with the SCell; and/or flush all HARQ buffers associated with the SCell.

In an example, when an SCell deactivation timer associated with an activated SCell expires and an SCell hibernation timer is not configured, the MAC entity may: deactivate the SCell; stop the SCell deactivation timer associated with the SCell; and/or flush all HARQ buffers associated with the SCell.

In an example, when a first PDCCH on an activated SCell indicates an uplink grant or downlink assignment, or a second PDCCH on a serving cell scheduling an activated SCell indicates an uplink grant or a downlink assignment for the activated SCell, or a MAC PDU is transmitted in a configured uplink grant or received in a configured downlink assignment, the MAC entity may: restart the SCell deactivation timer associated with the SCell; and/or restart the SCell hibernation timer associated with the SCell if configured. In an example, when an SCell is deactivated, an ongoing random access procedure on the SCell may be aborted.

In an example, when a MAC entity is configured with an SCell associated with an SCell state set to dormant state upon the SCell configuration, or when the MAC entity receives MAC CE(s) indicating transitioning the SCell into a dormant state, the MAC entity may: transition the SCell into a dormant state; transmit one or more CSI reports for the SCell; stop an SCell deactivation timer associated with the SCell; stop an SCell hibernation timer associated with the SCell if configured; start or restart a dormant SCell deactivation timer associated with the SCell; and/or flush all HARQ buffers associated with the SCell. In an example, when the SCell hibernation timer associated with the activated SCell expires, the MAC entity may: hibernate the SCell; stop the SCell deactivation timer associated with the SCell; stop the SCell hibernation timer associated with the SCell; and/or flush all HARQ buffers associated with the SCell. In an example, when a dormant SCell deactivation timer associated with a dormant SCell expires, the MAC entity may: deactivate the SCell; and/or stop the dormant SCell deactivation timer associated with the SCell. In an example, when an SCell is in dormant state, ongoing random access procedure on the SCell may be aborted.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

Figure 26:
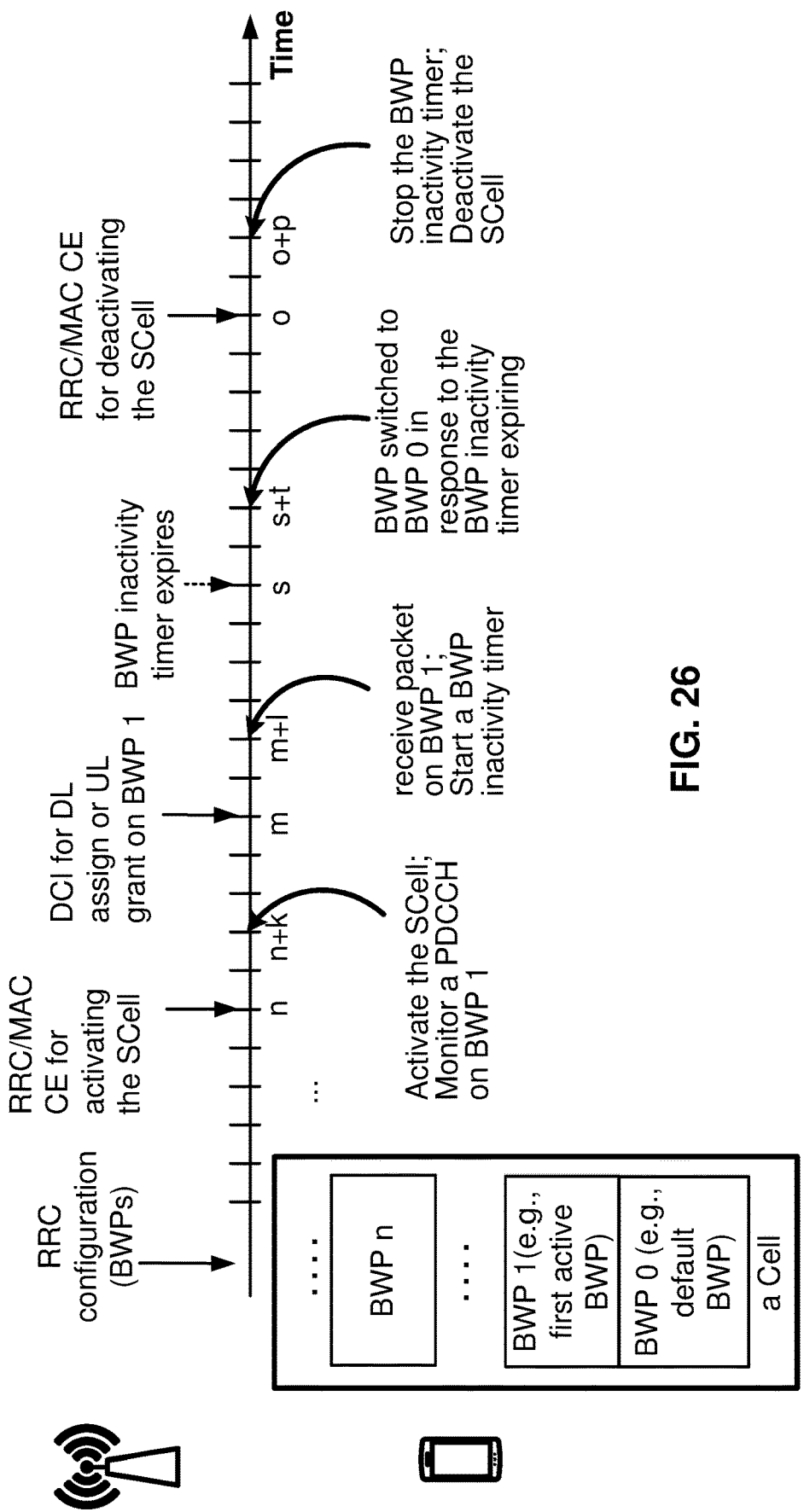
FIG. 26 is an example of BWP switching on an SCell as per an aspect of an embodiment of the present disclosure.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-Inactivity-Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL. FIG. 26 shows an example of BWP switching on an SCell.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 0_1, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, DRX operation may be used by a wireless device (UE) to improve UE battery lifetime. In an example, in DRX, UE may discontinuously monitor downlink control channel, e.g., PDCCH or EPDCCH. In an example, the base station may configure DRX operation with a set of DRX parameters, e.g., using RRC configuration. The set of DRX parameters may be selected based on the application type such that the wireless device may reduce power and resource consumption. In an example, in response to DRX being configured/activated, a UE may receive data packets with an extended delay, since the UE may be in DRX Sleep/Off state at the time of data arrival at the UE and the base station may wait until the UE transitions to the DRX ON state. The base station may select the DRX parameters for a tradeoff between the packet delay and power saving.

Figure 27:
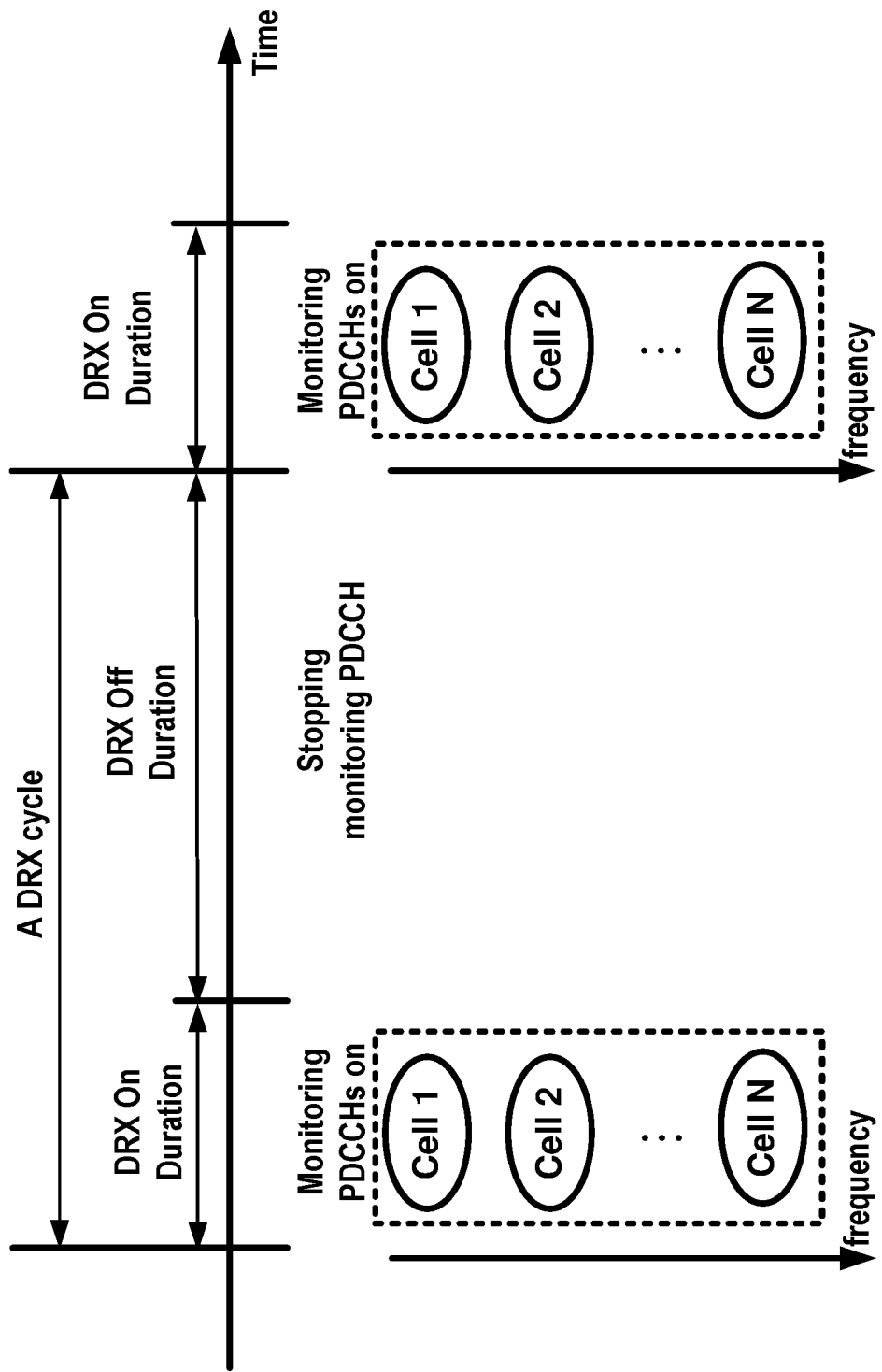
FIG. 27 is an example of discontinuous reception (DRX) operation as per an aspect of an embodiment of the present disclosure.

In an example, during a DRX mode, the UE may power down most of its circuitry when there are no packets to be received. During this time the UE listens to the downlink (DL) (or monitors PDCCHs) which is called DRX Active state. In a DRX mode, a time during which UE doesn't listen/monitor PDCCH is called DRX Sleep state. FIG. 27 shows an example of the embodiment. A gNB may transmit an RRC message comprising one or more DRX parameters of a DRX cycle. The one or more parameters may comprise a first parameter and/or a second parameter. The first parameter may indicate a first time value of the DRX Active state (e.g., DRX On duration) of the DRX cycle. The second parameter may indicate a second time of the DRX Sleep state (e.g., DRX Off duration) of the DRX cycle. The one or more parameters may further comprise a time duration of the DRX cycle. During the DRX Active state, the UE may monitor PDCCHs for detecting one or more DCIs on a serving cell. During the DRX Sleep state, the UE may stop monitoring PDCCHs on the serving cell. When multiple cells are in active state, the UE may monitor all PDCCHs on (or for) the multiple cells during the DRX Active state. During the DRX off duration, the UE may stop monitoring all PDCCH on (or for) the multiple cells. The UE may repeat the DRX operations according to the one or more DRX parameters.

In an example, DRX may be beneficial to the base station. In an example, if DRX is not configured, the wireless device may be transmitting periodic CSI and/or SRS frequently (e.g., based on the configuration). With DRX, during DRX OFF periods, the UE may not transmit periodic CSI and/or SRS. The base station may assign these resources to the other UEs to improve resource utilization efficiency.

In an example, the MAC entity may be configured by RRC with a DRX functionality that controls the UE's downlink control channel (e.g., PDCCH) monitoring activity for a plurality of RNTIs for the MAC entity. The plurality of RNTIs may comprise at least one of: C-RNTI; CS-RNTI; INT-RNTI; SP-CSI-RNTI; SFI-RNTI; TPC-PUCCH-RNTI; TPC-PUSCH-RNTI; Semi-Persistent Scheduling C-RNTI; eIMTA-RNTI; SL-RNTI; SL-V-RNTI; CC-RNTI; or SRS-TPC-RNTI. In an example, in response to being in RRC-_CONNECTED, if DRX is configured, the MAC entity may monitor the PDCCH discontinuously using the DRX operation; otherwise the MAC entity may monitor the PDCCH continuously.

In an example, RRC may control DRX operation by configuring a plurality of timers. The plurality of timers may comprise: a DRX On duration timer (e.g., drx-onDuration-Timer); a DRX inactivity timer (e.g., drx-InactivityTimer); a downlink DRX HARQ RTT timer (e.g., drx-HARQ-RTT-TimerDL); an uplink DRX HARQ RTT Timer (e.g., drx-HARQ-RTT-TimerUL); a downlink retransmission timer (e.g., drx-RetransmissionTimerDL); an uplink retransmission timer (e.g., drx-RetransmissionTimerUL); one or more parameters of a short DRX configuration (e.g., drx-ShortCycle and/or drx-ShortCycleTimer)) and one or more parameters of a long DRX configuration (e.g., drx-LongCycle). In an example, time granularity for DRX timers may be in terms of PDCCH subframes (e.g., indicated as psf in the DRX configurations), or in terms of milliseconds.

In an example, in response to a DRX cycle being configured, the Active Time may include the time while at least one timer is running. The at least one timer may comprise drx-onDurationTimer, drx-InactivityTimer, drx-RetransmissionTimerDL, drx-RetransmissionTimerUL, or mac-ContentionResolutionTimer.

In an example, drx-Inactivity-Timer may specify a time duration for which the UE may be active after successfully decoding a PDCCH indicating a new transmission (UL or DL or SL). In an example, this timer may be restarted upon receiving PDCCH for a new transmission (UL or DL or SL).

In an example, the UE may transition to a DRX mode (e.g., using a short DRX cycle or a long DRX cycle) in response to the expiry of this timer.

In an example, drx-ShortCycle may be a first type of DRX cycle (e.g., if configured) that needs to be followed when UE enters DRX mode. In an example, a DRX-Config 1E indicates the length of the short cycle.

In an example, drx-ShortCycleTimer may be expressed as multiples of shortDRX-Cycle. The timer may indicate the number of initial DRX cycles to follow the short DRX cycle before entering the long DRX cycle.

In an example, drx-onDurationTimer may specify the time duration at the beginning of a DRX Cycle (e.g., DRX ON). In an example, drx-onDurationTimer may indicate the time duration before entering the sleep mode (DRX OFF).

In an example, drx-HARQ-RTT-TimerDL may specify a minimum duration from the time new transmission is received and before the UE may expect a retransmission of a same packet. In an example, this timer may be fixed and may not be configured by RRC.

In an example, drx-RetransmissionTimerDL may indicate a maximum duration for which UE may be monitoring PDCCH when a retransmission from the eNodeB is expected by the UE.

In an example, in response to a DRX cycle being configured, the Active Time may comprise the time while a Scheduling Request is sent on PUCCH and is pending.

In an example, in response to a DRX cycle being configured, the Active Time may comprise the time while an uplink grant for a pending HARQ retransmission can occur and there is data in the corresponding HARQ buffer for synchronous HARQ process.

In an example, in response to a DRX cycle being configured, the Active Time may comprise the time while a PDCCH indicating a new transmission addressed to the C-RNTI of the MAC entity has not been received after successful reception of a Random Access Response for the preamble not selected by the MAC entity.

In an example, DRX may be configured for a wireless device. A DL HARQ RTT Timer may expire in a subframe and the data of the corresponding HARQ process may not be successfully decoded. The MAC entity may start the drx-RetransmissionTimerDL for the corresponding HARQ process.

In an example, DRX may be configured for a wireless device. An UL HARQ RTT Timer may expire in a subframe. The MAC entity may start the drx-RetransmissionTimerUL for the corresponding HARQ process.

In an example, DRX may be configured for a wireless device. A DRX Command MAC control element or a Long DRX Command MAC control element may be received. The MAC entity may stop drx-onDurationTimer and stop drx-InactivityTimer.

In an example, DRX may be configured for a wireless device. In an example, drx-InactivityTimer may expire or a DRX Command MAC control element may be received in a subframe. In an example, in response to Short DRX cycle being configured, the MAC entity may start or restart drx-ShortCycleTimer and may use Short DRX Cycle. Otherwise, the MAC entity may use the Long DRX cycle.

In an example, DRX may be configured for a wireless device. In an example, drx-ShortCycleTimer may expire in a subframe. The MAC entity may use the Long DRX cycle.

In an example, DRX may be configured for a wireless device. In an example, a Long DRX Command MAC control element may be received. The MAC entity may stop drx-ShortCycleTimer and may use the Long DRX cycle.

In an example, DRX may be configured for a wireless device. In an example, if the Short DRX Cycle is used and [(SFN*10)+subframe number] modulo (drx-ShortCycle)= (drxStartOffset) modulo (drx-ShortCycle), the wireless device may start drx-onDurationTimer.

In an example, DRX may be configured for a wireless device. In an example, if the Long DRX Cycle is used and [(SFN*10)+subframe number] modulo (drx-longCycle)=drxStartOffset, the wireless device may start drx-onDurationTimer.

Figure 28:
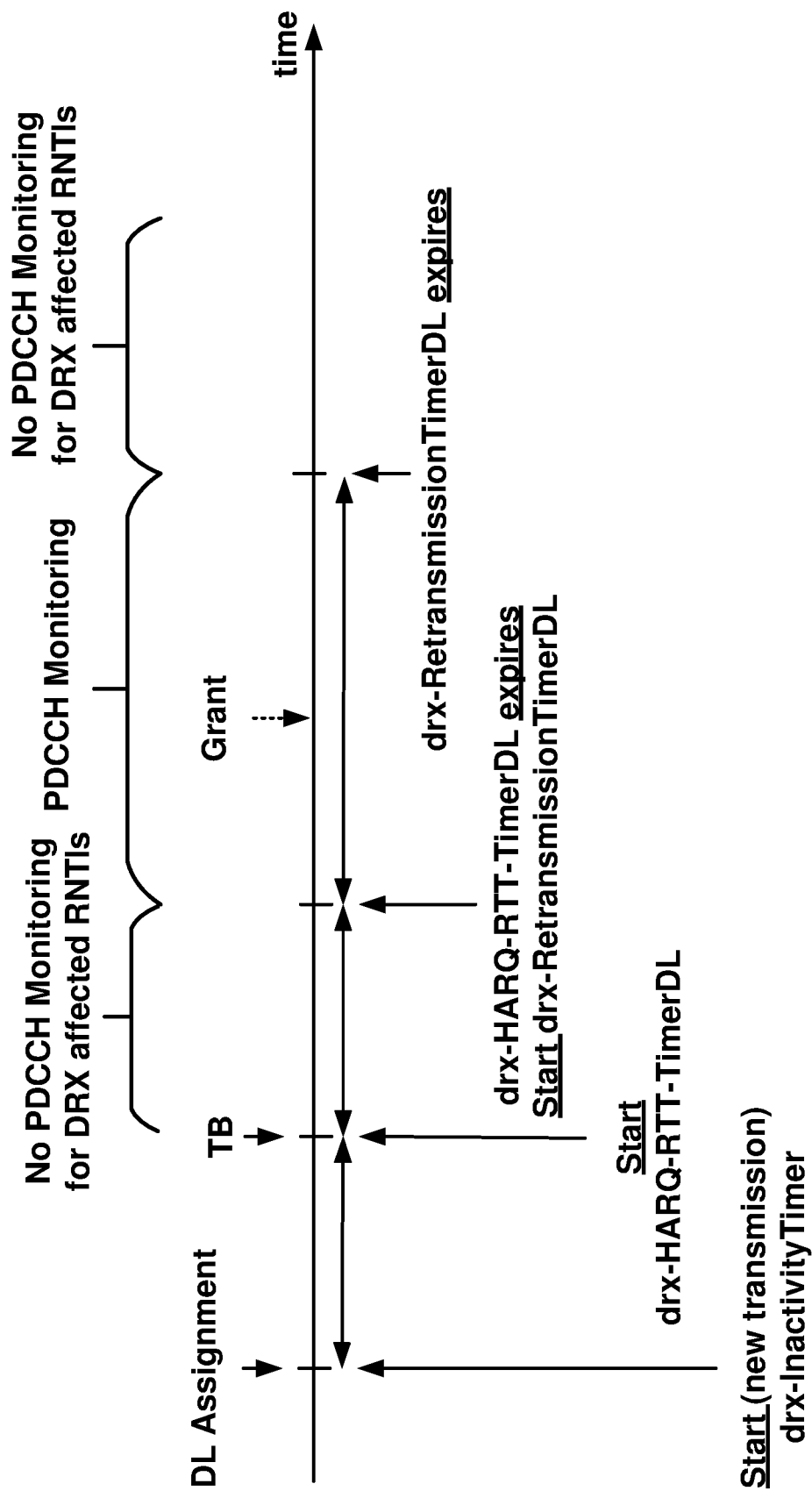
FIG. 28 is an example of DRX operation as per an aspect of an embodiment of the present disclosure.

FIG. 28 shows example of DRX operation in a legacy system. A base station may transmit a RRC message comprising configuration parameters of DRX operation. A base station may transmit a DCI for downlink resource allocation via a PDCCH, to a UE. the UE may start the drx-InactivityTimer during which, the UE may monitor the PDCCH. After receiving a transmission block (TB) when the drx-InactivityTimer is running, the UE may start a HARQ RTT Timer (e.g., drx-HARQ-RTT-TimerDL), during which, the UE may stop monitoring the PDCCH. The UE may transmit a NACK to the base station upon unsuccessful receiving the TB. When the HARQ RTT Timer expires, the UE may monitor the PDCCH and start a HARQ retransmission timer (e.g., drx-RetransmissionTimerDL). When the HARQ retransmission timer is running, the UE may receive a second DCI indicating a DL grant for the retransmission of the TB. If not receiving the second DCI before the HARQ retransmission timer expires, the UE may stop monitoring the PDCCH.

Figure 29A:
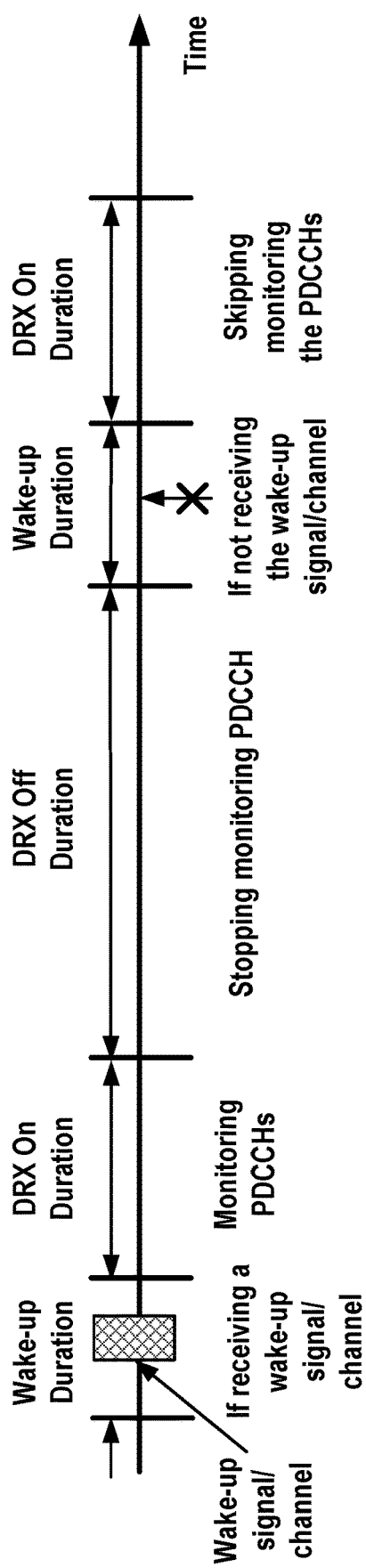
FIG. 29A is an example of a wake-up signal/channel based power saving operation as per an aspect of an embodiment of the present disclosure.
Figure 29B:
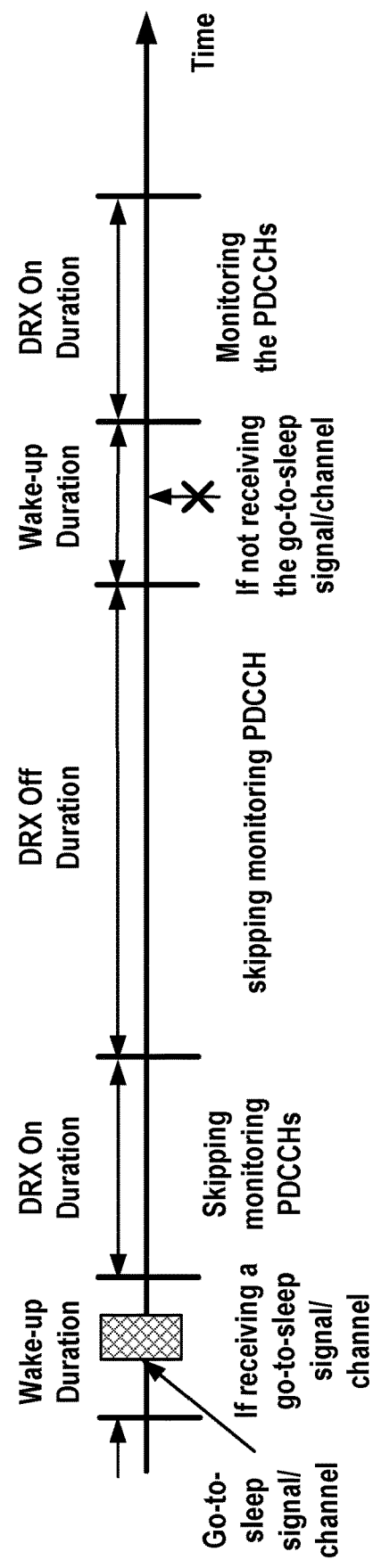
FIG. 29B is an example of a go-to-sleep signal/channel based power saving operation as per an aspect of an embodiment of the present disclosure.

In an LTE/LTE-A or 5G system, when configured with DRX operation, a UE may monitor PDCCH for detecting one or more DCIs during the DRX Active time of a DRX cycle. The UE may stop monitoring PDCCH during the DRX sleep/Off time of the DRX cycle, to save power consumption. In some cases, the UE may fail to detect the one or more DCIs during the DRX Active time, since the one or more DCIs are not addressed to the UE. For example, a UE may be an URLLC UE, or a NB-IoT UE, or an MTC UE. The UE may not always have data to be received from a gNB, in which case, waking up to monitor PDCCH in the DRX active time may result in useless power consumption. A wake-up mechanism combined with DRX operation may be used to further reduce power consumption specifically in a DRX active time. FIG. 29A and FIG. 29B show examples of the wake-up mechanism.

In FIG. 29A, a gNB may transmit one or more messages comprising parameters of a wake-up duration (or a power saving duration), to a UE. The wake-up duration may be located a number of slots (or symbols) before a DRX On duration of a DRX cycle. The number of slots (or symbols), or, referred to as a gap between a wakeup duration and a DRX on duration, may be configured in the one or more RRC messages or predefined as a fixed value. The gap may be used for at least one of: synchronization with the gNB; measuring reference signals; and/or retuning RF parameters. The gap may be determined based on a capability of the UE and/or the gNB. In an example, the wake-up mechanism may be based on a wake-up signal. The parameters of the wake-up duration may comprise at least one of: a wake-up signal format (e.g., numerology, sequence length, sequence code, etc.); a periodicity of the wake-up signal; a time duration value of the wake-up duration; a frequency location of the wake-up signal. In LTE Re.15 specification, the wake-up signal for paging may comprise a signal sequence (e.g., Zadoff-Chu sequence) generated based on a cell identification (e.g., cell ID) as:

$$w(m) = \theta_{n_f,n_s}(m) \cdot e^{-\frac{j\pi un(n+1)}{131}}.$$

In the example, m=0, 1, . . . , 132M−1, and n=m mod 132. In an example, $$\theta_{n_f,n_s}(m) = \begin{cases} 1, & \text{if } c_{n_f,n_s}(2m) = 0 \text{ and } c_{n_f,n_s}(2m+1) = 0 \\ -1, & \text{if } c_{n_f,n_s}(2m) = 0 \text{ and } c_{n_f,n_s}(2m+1) = 1 \\ j, & \text{if } c_{n_f,n_s}(2m) = 1 \text{ and } c_{n_f,n_s}(2m+1) = 0 \\ -j, & \text{if } c_{n_f,n_s}(2m) = 1 \text{ and } c_{n_f,n_s}(2m+1) = 1 \end{cases},$$

where $u=(N_{ID}^{cell} \bmod 126)+3$. $N_{ID}^{cell}$ may be a cell ID of the serving cell. M may be a number of subframes in which the WUS may be transmitted, $1 \leq M \leq M_{WUSmax}$, where $M_{WUSmax}$ is the maximum number of subframes in which the WUS may be transmitted. $c_{n_f,n_s}(i)$, i=0, 1, . . . , 2·132M−1 may be a scrambling sequence (e.g., a length-31 Gold sequence), which may be initialized at start of transmission of the WUS with:

$$c_{init\_WUS} = (N_{ID}^{cell} + 1)\left(\left(10 n_{f\_start\_PO} + \left\lfloor\frac{n_{s\_start\_PO}}{2}\right\rfloor\right) \bmod 2048 + 1\right) 2^9 + N_{ID}^{cell},$$

where $n_{f\_start\_PO}$ is the first frame of a first paging occasion to which the WUS is associated, and $n_{s\_start\_PO}$ is a first slot of the first paging occasion to which the WUS is associated.

In an example, the parameters of the wake-up duration may be pre-defined without RRC configuration. In an example, the wake-up mechanism may be based on a wake-up channel (e.g., a PDCCH, or a DCI). The parameters of the wake-up duration may comprise at least one of: a wake-up channel format (e.g., numerology, DCI format, PDCCH format); a periodicity of the wake-up channel; a control resource set and/or a search space of the wake-up channel. When configured with the parameters of the wake-up duration, the UE may monitor the wake-up signal or the wake-up channel during the wake-up duration. In response to receiving the wake-up signal/channel, the UE may wake-up to monitor PDCCHs as expected according to the DRX configuration. In an example, in response to receiving the wake-up signal/channel, the UE may monitor PDCCHs in the DRX active time (e.g., when drx-onDurationTimer is running). The UE may go back to sleep if not receiving PDCCHs in the DRX active time. The UE may keep in sleep during the DRX off duration of the DRX cycle. In an example, if the UE doesn't receive the wake-up signal/channel during the wake-up duration, the UE may skip monitoring PDCCHs during the DRX active time. This mechanism may reduce power consumption for PDCCH monitoring during the DRX active time. In the example, during the wake-up duration, a UE may monitor the wake-up signal/channel only. During the DRX off duration, the UE may stop monitoring PDCCHs and the wake-up signal/channel. During the DRX active duration, the UE may monitor PDCCHs except of the wake-up signal/channel, if receiving the wake-up signal/channel in the wake-up duration. In an example, the gNB and/or the UE may apply the wake-up mechanism in paging operation when the UE is in an RRC_idle state or an RRC_inactive state, or in a connected DRX operation (C-DRX) when the UE is in an RRC_CONNECTED state.

In an example, a wake-up mechanism may be based on a go-to-sleep signal/channel. FIG. 29B shows an example. A gNB may transmit one or more messages comprising parameters of a wake-up duration (or a power saving duration), to a UE. The wake-up duration may be located a number of slots (or symbols) before a DRX On duration of a DRX cycle. The number of slots (or symbols) may be configured in the one or more RRC messages or predefined as a fixed value. In an example, the wake-up mechanism may be based on a go-to-sleep signal. The parameters of the wake-up duration may comprise at least one of: a go-to-sleep signal format (e.g., numerology, sequence length, sequence code, etc.); a periodicity of the go-to-sleep signal; a time duration value of the wake-up duration; a frequency location of the go-to-sleep signal. In an example, the wake-up mechanism may be based on a go-to-sleep channel (e.g., a PDCCH, or a DCI). The parameters of the wake-up duration may comprise at least one of: a go-to-sleep channel format (e.g., numerology, DCI format, PDCCH format); a periodicity of the go-to-sleep channel; a control resource set and/or a search space of the go-to-sleep channel. When configured with the parameters of the wake-up duration, the UE may monitor the go-to-sleep signal or the go-to-sleep channel during the wake-up duration. In response to receiving the go-to-sleep signal/channel, the UE may go back to sleep and skip monitoring PDCCHs during the DRX active time. In an example, if the UE doesn't receive the go-to-sleep signal/channel during the wake-up duration, the UE may monitor PDCCHs during the DRX active time. This mechanism may reduce power consumption for PDCCH monitoring during the DRX active time. In an example, compared with a wake-up signal based wake-up mechanism, a go-to-sleep signal based mechanism may be more robust to detection error. If the UE miss detects the go-to-sleep signal, the consequence is that the UE may wrongly start monitoring PDCCH, which may result in extra power consumption. However, if the UE miss detects the wake-up signal, the consequence is that the UE may miss a DCI which may be addressed to the UE. In the case, missing the DCI may result in communication interruption. In some cases (e.g., URLLC service or V2X service), the UE and/or the gNB may not allow communication interruption compared with extra power consumption.

In an example, a NR wireless device when configured with multiple cells may spend more power than an LTE-A wireless device, for communication with a base station. The NR wireless device may communicate with a NR base station on cells operating in high frequency (e.g., 6 GHz, 30 GHz, or 70 GHz), with more power consumption than the LTE-A wireless device operating in low frequency (e.g., <=6 GHz). In the example, it's beneficial for the NR wireless device to implement a wake-up operation for power saving.

Figure 30:
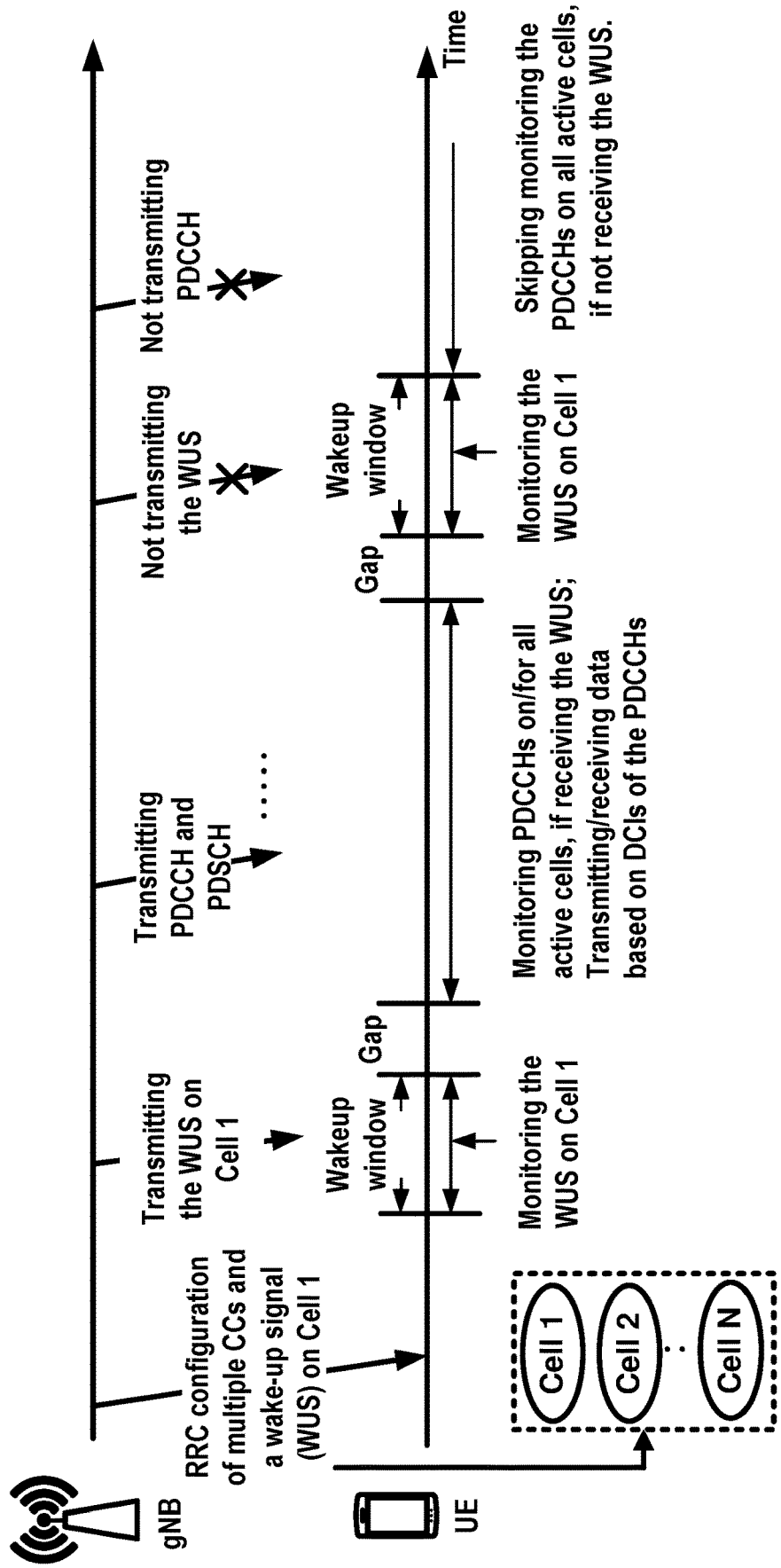
FIG. 30 is an example of a wake-up signal based power saving operation for carrier aggregation as per an aspect of an embodiment of the present disclosure.

FIG. 30 shows an example embodiment of a wake-up operation based on a wake-up signal. A base station (e.g., a gNB) may transmit to a wireless device (e.g., a UE), one or more RRC messages comprising configuration parameters of a first cell of a plurality of cells. The one or more RRC messages may comprise one or more cell-specific or cell-common RRC messages (e.g., ServingCellConfig IE, ServingCellConfigCommon IE). In an example, the first cell may be a primary cell (e.g., PCell), a PUCCH secondary cell if secondary PUCCH group is configured, or a primary secondary cell (e.g., PSCell) if dual connectivity is configured.

The plurality of cells may further comprise at least a second cell. The at least second cell may be a secondary cell (e.g., SCell). Each cell of the plurality of cells may be associated with a cell specific identity (e.g., cell ID). The configuration parameters may comprise first parameters of a wake-up signal (WUS) on the first cell. The first parameters may comprise at least one of: an indicator indicating whether a transmission of the WUS is enabled/supported or disabled/not supported; a signal format (e.g., numerology); a sequence generation parameter (e.g., a cell id, a virtual cell id, SS block index, or an orthogonal code index) for generating the WUS; a window size of a time window indicating a duration when the WUS may be transmitted; a value of a periodicity of the transmission of the WUS; a time resource on which the WUS may be transmitted; a frequency resource on which the WUS may be transmitted via the first cell. In an example, the WUS may comprise at least one of: a SS block; a CSI-RS; a DMRS; a PDCCH; and/or a signal sequence.

As shown in FIG. 30, in response to receiving the one or more RRC messages, the wireless device may monitor the WUS on the first cell based on the first parameters. The wireless device may, in the time resource and/or the time window, attempt to detect the WUS with the signal format. The wireless device may, in the time resource and/or the time window, attempt to detect the WUS with the signal sequence generated based on the sequence generation parameter, if the WUS is the signal sequence. The wireless device may repeat the monitoring (or the attempting to detect the WUS) by the periodicity indicated by the first parameters. The wireless device may monitor the WUS on the frequency resource of the first cell. A gNB may transmit the WUS on the first cell in the time window, to the wireless device. In an example, the wireless device may receive (or successfully detect) the WUS in the time window. In response to receiving the WUS on the first cell, the wireless device may stop monitoring the WUS. In response to receiving the WUS on the first cell, the wireless device may monitor first PDCCH on the first cell. In response to receiving the WUS on the first cell, the wireless may monitor second PDCCH on (or for, if cross carrier scheduling is configured) the at least second cell, if the at least second cell is in active state. In an example, the wireless device may not monitor the first PDCCH on the first cell and/or the second PDCCH on the at least second cell during a time before the time window. In an example, the wireless device may receive one or more DCIs via the first PDCCH and/or the second PDCCH during the monitoring the first PDCCH and/or the second PDCCH. The wireless device may transmit and/or receive data packets based on the one or more DCIs.

As shown in FIG. 30, the wireless device may repeat the wake-up operation with the periodicity indicated by the first parameters. In an example, the wireless device may, in the time resource and/or the time window, attempt to detect the WUS with the signal format. In an example, the gNB may not transmit the WUS in the time window, to the wireless device. In an example, the gNB may transmit the WUS in the time window. The wireless device may not receive (or successfully detect) the WUS in the time window. In response to not receiving the WUS on the first cell, the wireless device may skip monitoring first PDCCH on the first cell. In response to not receiving the WUS on the first cell, the wireless device may skip monitoring second PDCCH on the at least second cell, if the at least second cell is in active state. In an example, a gNB may not transmit the WUS in the time window, e.g., when there is no data packet to be transmitted to the wireless device. The gNB may skip transmitting DCI on the first PDCCH and/or the second PDCCH in response to not transmitting the WUS.

In an example, the configuration parameters may further comprise a value of gap indicating a duration between a first time for monitoring the WUS and a starting time for monitoring PDCCHs. The gap may allow a wireless device, after receiving the WUS, to re-synchronize with the gNB and/or retune RF chains (e.g., for BWP switching) for monitoring the PDCCHs. The wireless device may, at a first slot, start monitoring PDCCHs on the first cell and/or the at least second cell after the wireless device receives the WUS at a second slot, where the first slot occurs a number of slots after the second slot, the number being indicated by the value of the gap. The wireless device may, at a first slot, start monitoring PDCCHs on the first cell and/or the at least second cell after the wireless device receives the WUS at a second slot, where the first slot occurs a number of slots after the time window, the number being indicated by the value of the gap.

In an example, the wireless device may disable the wake-up operation in response to the indicator of the first parameters indicating that the transmission of the WUS is disabled (or not supported). In an example, the wireless device may disable the wake-up operation in response to at least one of: the time window being set to a first value (e.g., zero); the frequency resource being set to a second value (e.g., zero); and/or the value of the periodicity of the transmission of the WUS being set to a third value (e.g., infinite). In response to disabling the wake-up operation, the wireless device may not monitor the WUS in the time window on the first cell. In response to disabling the wake-up operation, the wireless device may, if not monitoring, start monitoring first PDCCH on the first cell and/or second PDCCH on (or for) the at least second cell, e.g., as required or expected in the time window.

In an example, a wireless system (e.g., a gNB and a wireless device) may predefine (e.g., without RRC message indication) one or more configuration parameters of a WUS, the one or more configuration parameters comprising at least one of: a signal type (e.g., a SS block, a CSI-RS, or a DRMR, or a signal sequence); a signal format (e.g., numerology); a sequence generation parameter (e.g., a cell id, a virtual cell id, a SS block index, or an orthogonal code index) for generating the WUS; a window size of a time window indicating a duration when the WUS may be transmitted; a value of a periodicity of the transmission of the WUS; a time resource on which the WUS may be transmitted; a frequency resource on which the WUS may be transmitted via the first cell. The wireless device may monitor the WUS according to the one or more predefined configuration parameters. In an example, the wireless device may monitor the WUS on a PCell (or a PSCell if dual connectivity is configured). The wireless device may not monitor the WUS on other cells (e.g., a secondary cell), to save the power consumption. The wireless device may monitor the WUS with a signal sequence (e.g., Zadoff-Chu sequence, or a M sequence) generated based on a cell identity (e.g., a physical cell identity) of the PCell. The wireless device may monitor the WUS with a signal format determined based on a numerology of a downlink signal/channel (e.g., control channel, data channel, SS blocks) of the PCell. In an example, a wireless device may determine one or more configuration parameters of a WUS based on one or more system information (e.g., MIB, SIB1, and/or other SIBs). The one or more configuration parameters may comprise at least one of: a signal type (e.g., a SS block, a CSI-RS, or a DRMR, or a signal sequence); a signal format (e.g., numerology); a sequence generation parameter (e.g., a cell id, a virtual cell id, a SS block index, or an orthogonal code index) for generating the WUS; a window size of a time window indicating a duration when the WUS may be transmitted; a value of a periodicity of the transmission of the WUS; a time resource on which the WUS may be transmitted; a frequency resource on which the WUS may be transmitted via the first cell.

In an example, when multiple BWPs on a first cell of a plurality of cells are configured, a wireless device may monitor a WUS on a first BWP of the multiple BWPs of the first cell in a time window. The first BWP may comprise one of: an initial active BWP; a first active BWP; a default BWP. The initial active BWP, the first active BWP, and/or the default BWP may be indicated in one or more RRC messages. The first BWP may be a BWP which is active, upon RRC (re)-configuration, on the first cell. The first BWP may be an active BWP on the first cell before the wireless device monitor the WUS. In response to detecting the WUS on the first BWP of the first cell, the wireless device may monitor PDCCHs of one or more cells of the plurality of cells, if the one or more cells are in active state. In response to not detecting the WUS on the first BWP, the wireless device may skip monitoring the PDCCHs of the one or more cells.

In an example, when multiple active BWPs of a plurality of BWPs on a first cell are supported, the wireless device may monitor a WUS on a first BWP of the first cell. The first BWP may be an active BWP of the multiple active BWPs, where the active BWP may be an active BWP with lowest BWP ID among the multiple active BWPs, or the active BWP may be an active BWP with lowest numerology index (e.g., subcarrier spacing), or an active BWP with a next lowest BWP ID among the multiple active BWPs, if a first active BWP of the multiple active BWPs with the lowest BWP is not configured with control resource set and/or search space. In response to detecting the WUS on the first BWP of the first cell, the wireless device may monitor first PDCCHs of the multiple active BWPs of the first cell. In response to detecting the WUS on the first BWP of the first cell, the wireless device may monitor second PDCCHs of at least a second cell of the plurality of cells, if the at least second cell is in active state. In response to not detecting the WUS on the first BWP of the first cell, the wireless device may not monitor the first PDCCHs of the multiple active BWPs of the first cell. In response to not detecting the WUS on the first BWP of the first cell, the wireless device may not monitor the second PDCCHs of the at least second cell, if the at least second cell is in active state.

In an example, when a BWP operation and a wake-up operation are supported, configuration parameters of the wake-up operation may be configured per BWP. A gNB may transmit one or more RRC messages comprising configuration parameters of a plurality of BWPs of a first cell. Each BWP of the plurality of BWPs may be identified by a BWP identifier (e.g., BWP ID). The configuration parameters of each of the plurality of BWP may comprise at least one of: a transmission numerology; downlink BWP configuration parameters (e.g., PDCCH configuration parameters); uplink BWP configuration parameters (e.g., PUCCH configuration parameters); and/or wake-up configuration parameters. The wake-up configuration parameters may comprise at least one of: a signal format (e.g., numerology); sequence generation parameters for generating the WUS; a window size of a time window indicating a duration when the WUS may be transmitted; a value of a periodicity of the transmission of the WUS; a time resource on which the WUS may be transmitted; a frequency resource on which the WUS may be transmitted. The sequence generation parameters may comprise at least one of: a cell id, a virtual cell id, a BWP ID, or an orthogonal code index. In an example, in response to receiving the one or more RRC messages, a wireless device may monitor, on a first BWP of a first cell of a plurality of cells, a WUS based on the wake-up configuration parameters associated with the first BWP. The first BWP may be an active BWP of the first cell when the wireless device receives the one or more RRC messages. The first BWP may be an active BWP of the first cell before the wireless device monitors the WUS. The first cell may be a PCell or a PSCell. In an example, the wireless device may monitor the WUS comprising a signal sequence generated based on the sequence generation parameters (e.g., a BWP ID of the first BWP; a cell ID of the first cell; and/or the orthogonal code index indicated).

In an example, when a BWP operation and a wake-up operation are supported, configuration parameters of the wake-up operation may be configured per cell. A gNB may transmit one or more RRC messages comprising first configuration parameters of a plurality of BWPs of a first cell and second configuration parameters of a wake-up operation. Each BWP of the plurality of BWPs may be identified by a BWP identifier (e.g., BWP ID). The first configuration parameters of each of the plurality of BWP may comprise at least one of: a transmission numerology; downlink BWP configuration parameters (e.g., PDCCH configuration parameters); and/or uplink BWP configuration parameters (e.g., PUCCH configuration parameters). The second configuration parameters may comprise at least one of: a signal format (e.g., numerology); sequence generation parameters for generating the WUS; a window size of a time window indicating a duration when the WUS may be transmitted; a value of a periodicity of the transmission of the WUS; a time resource on which the WUS may be transmitted; a frequency resource on which the WUS may be transmitted. The sequence generation parameters may comprise at least one of: a cell id; a virtual cell id; a BWP ID; and/or an orthogonal code index. In an example, in response to receiving the one or more RRC messages, a wireless device may monitor, on a first BWP of a first cell of a plurality of cells, a WUS based on the wake-up configuration parameters associated with the first cell. In an example, the wireless device may monitor the WUS comprising a signal sequence generated based on a cell ID of the first cell.

Figure 31:
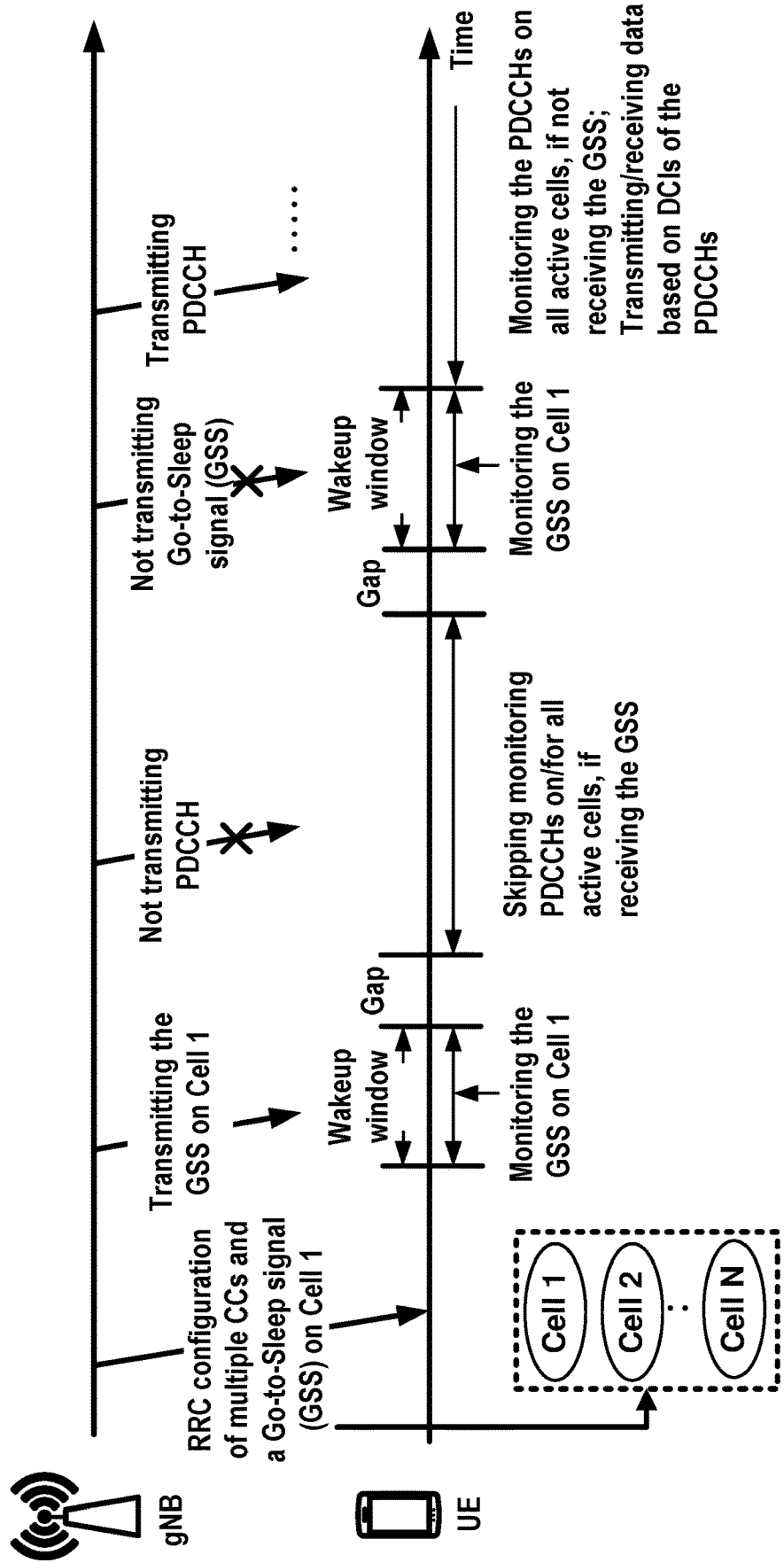
FIG. 31 is an example of a go-to-sleep signal based power saving operation for carrier aggregation as per an aspect of an embodiment of the present disclosure.

FIG. 31 shows an example embodiment of a wake-up operation based on a go-to-sleep signal (GSS). A base station (e.g., a gNB) may transmit to a wireless device (e.g., a UE), one or more RRC messages comprising configuration parameters of a first cell of a plurality of cells. In an example, the first cell may be a primary cell (e.g., PCell), a PUCCH secondary cell, or a primary secondary cell (e.g., PSCell). The plurality of cells may further comprise at least a second cell. Each cell of the plurality of cells may be associated with a cell specific identity (e.g., cell ID). The configuration parameters may comprise first parameters of a GSS on the first cell. The first parameters may comprise at least one of: an indicator indicating whether a transmission of the GSS is enabled/supported or disabled/not supported; a signal format (e.g., numerology); sequence generation parameters (e.g., a cell id, a virtual cell id, and/or an orthogonal code index) for generating the GSS; a window size of a time window indicating a duration when the GSS may be transmitted; a value of a periodicity of the transmission of the GSS; a time resource on which the GSS may be transmitted; a frequency resource on which the GSS may be transmitted via the first cell. In an example, the GSS may comprise at least one of: a SS block; a CSI-RS; a DMRS; a PDCCH; and/or a signal sequence. In an example, in response to receiving the one or more RRC messages, the wireless device may monitor the GSS on the first cell based on the first parameters. The wireless device may, in the time resource and/or the time window, attempt to detect the GSS with the signal format. The wireless device may repeat the monitoring (or the attempting to detect the GSS) by the periodicity indicated by the first parameters. The wireless device may monitor the GSS on the frequency resource of the first cell. In an example, the wireless device may receive (or successfully detect) the GSS in the time window. In response to receiving the GSS on the first cell, the wireless device may stop monitoring the GSS. In response to receiving the GSS on the first cell, the wireless device may skip monitoring first PDCCH on the first cell. In response to receiving the GSS on the first cell, the wireless may skip monitoring second PDCCH on (or for, if cross carrier scheduling is configured) the at least second cell, if the at least second cell is in active state. In an example, the wireless device may not receive (or successfully detect) the GSS in the time window. In response to not receiving the GSS on the first cell, the wireless device may monitor the first PDCCH on the first cell. In response to not receiving the GSS on the first cell, the wireless may monitor the second PDCCH on (or for, if cross carrier scheduling is configured) the at least second cell, if the at least second cell is in active state. In an example, a wireless device may disable the wake-up operation in response to at least one of: the indicator indicating the transmission of the GSS is disabled (or not supported); the time window being set to a first value (e.g., zero); the frequency resource being set to a second value (e.g., zero); and/or the value of the periodicity of the transmission of the GSS being set to a third value (e.g., infinite). In an example, one or more configuration parameters of a GSS may be predefined or be determined based on one or more system information, in a similar/same way illustrated above for the wake-up operation based on the WSS. In an example, when configured with multiple BWPs or multiple active BWPs, configuration parameters of a GSS may be configured per BWP, or per cell, in a similar/same way illustrated above for the wake-up operation based on the WSS.

Figure 32:
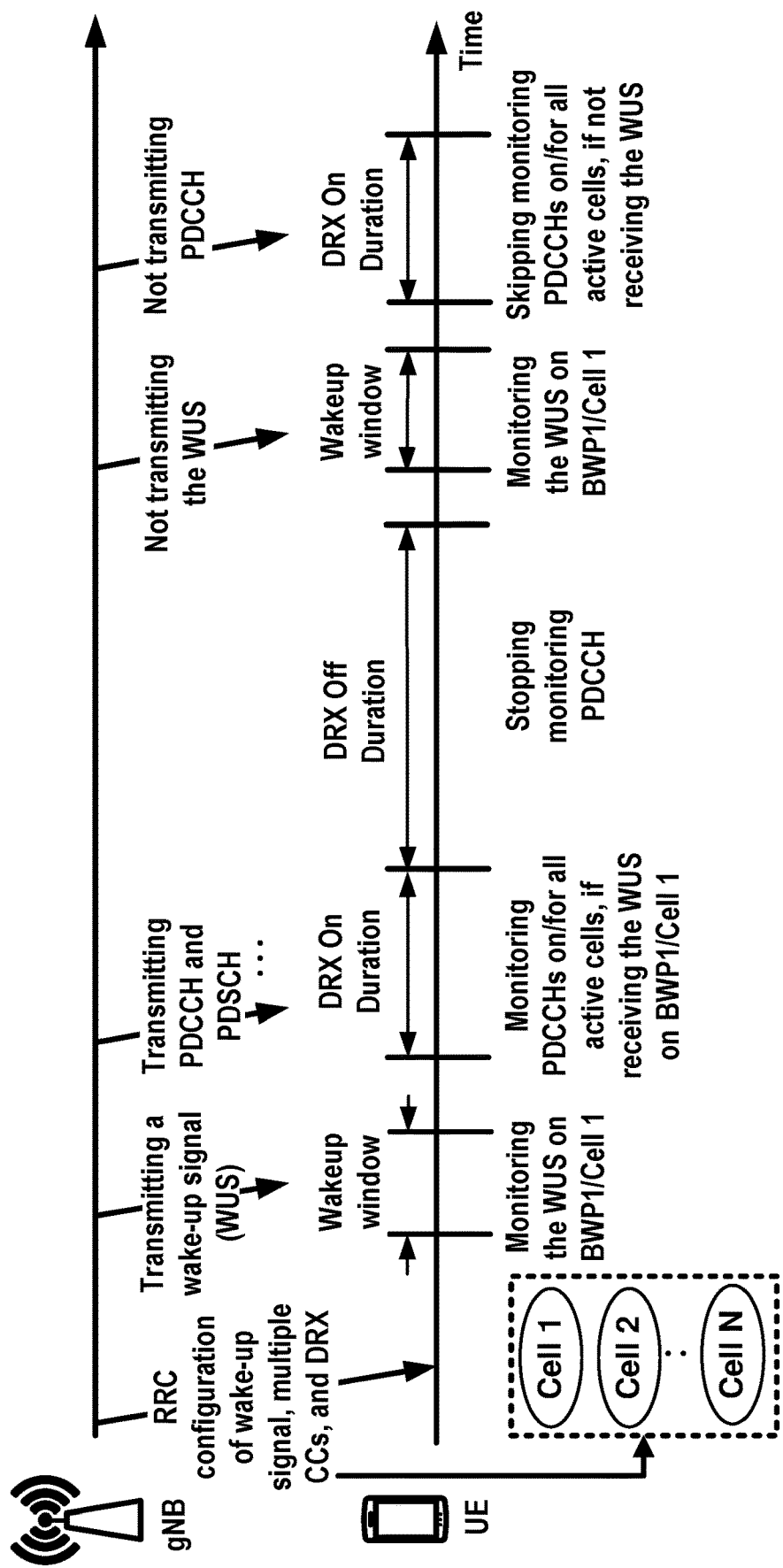
FIG. 32 is an example of combined a wake-up signal based power saving operation and DRX operation for carrier aggregation as per an aspect of an embodiment of the present disclosure.

FIG. 32 shows an example of a DRX operation and a WUS-based wake-up operation. A base station (e.g., a gNB) may transmit to a wireless device (e.g., a UE), one or more RRC messages comprising first configuration parameters of a plurality of cells comprising a first cell and at least a second cell, second configuration parameters of a DRX operation, and third configuration parameters of a WUS. The first configuration parameters of the first cell may comprise at least one of: downlink configuration parameters (e.g., PDCCH configuration parameters); uplink configuration parameters (e.g., PUCCH configuration parameters). The second configuration parameters may comprise at least one of: a first value of a DRX cycle; a second value of a DRX on duration of the DRX cycle; one or more DRX timers. The third configuration parameters may comprise at least one of: a signal format (e.g., numerology); sequence generation parameters (e.g., a cell id, a virtual cell id, a SS block index, and/or an orthogonal code index) for generating the WUS; a window size of a time window indicating a duration when the WUS may be transmitted; a value of a periodicity of the transmission of the WUS; a time resource on which the WUS may be transmitted; a frequency resource on which the WUS may be transmitted. In an example, in response to receiving the one or more RRC messages, the wireless device may monitor, based on the third configuration parameters, the WUS in the time window on the first cell. The wireless device may receive (or successfully detect) the WUS on the first cell. The wireless device may determine that a MAC entity of the wireless device is in a DRX active time (or a DRX On duration as shown in FIG. 32) based on the second configuration parameters of the DRX operation. In response to detecting the WUS and determining the MAC entity being in the DRX active time, the wireless device may stop monitoring, at least during the DRX active time, the WUS on the first cell. In response to detecting the WUS and determining the MAC entity is in the DRX active time, the wireless device may monitor, at least during the DRX active time, a first PDCCH of the first cell. In response to detecting the WUS on the first cell and determining the MAC entity is in the DRX active time, the wireless device may monitor, at least during the DRX active time, at least a second PDCCH of the at least second cell, if the at least second cell is in active state. In an example, the wireless device may transmit and/or receive data packets based on one or more DCIs received on the first PDCCH and/or the at least second PDCCH, during the monitoring the first PDCCH and/or the at least second PDCCH. In an example, the wireless device may determine that the MAC entity of the wireless device is not in a DRX active time or is in a DRX off duration (as shown in FIG. 32), the wireless device may, at least during the DRX off duration, stop monitoring the first PDCCH and/or the at least second PDCCH in response to being in the DRX off duration (or not being in the DRX active time). In an example, a base station may transmit the one or more DCIs on the first PDCH and/or the at least second PDCCH in the DRX on duration in response to transmitting the WUS on the first cell in the time window.

As shown in FIG. 32, a wireless device may repeat the wake-up operation and the DRX operation according to the second configuration parameters of the DRX operation and the third configuration parameters of the wake-up operation. In an example, the wireless device may not receive the WUS in the time window on the first cell. The wireless device may determine a MAC entity of the wireless device being in a DRX active time (or a DRX On duration as shown in FIG. 32) based on the second configuration parameters of the DRX operation. In response to not receiving the WUS and determining that the MAC entity is in the DRX active time, the wireless device may, at least during the DRX active time, skip monitoring the WUS on the first cell. In response to not receiving the WUS and determining that the MAC entity is in the DRX active time, the wireless device may, at least during the DRX active time, skip monitoring a first PDCCH of the first cell and at least a second PDCCH of the at least second cell, if the at least second cell is in active state. In an example, a base station may not transmit one or more DCIs on the first PDCH and/or the at least second PDCCH in the DRX on duration in response to not transmitting the WUS on the first cell in the time window.

In an example, when multiple BWPs are configured and a DRX operation is configured, a wireless device may monitor a WUS on a first BWP of the multiple BWPs on a first cell of a plurality of cells. The wireless device may determine the wireless device is in a DRX active time based on configuration parameters of the DRX operation. In response to detecting the WUS on the first BWP and the wireless device being in the DRX active time, the wireless device may stop monitoring the WUS on the first BWP at least during the DRX active time. In response to detecting the WUS on the first BWP and the wireless device being in the DRX active time, the wireless device may monitor multiple PDCCHs of the plurality of cells, at least during the DRX active time. In response to not detecting the WUS on the first BWP and the wireless device being in the DRX active time, the wireless device may skip monitoring the WUS at least during the DRX active time. In response to not detecting the WUS on the first BWP and the wireless device being in the DRX active time, the wireless device may skip monitoring the multiple PDCCHs of the plurality of cells, at least during the DRX active time. The first BWP may be an active BWP of the first cell. The first cell may be a PCell, or a PSCell.

In an example, a wireless device monitors all SCells in response to receiving a WUS on a PCell. The monitoring all SCells based on the single WUS may increase power consumption of the wireless device. There is a need to improve power saving for a plurality of SCells.

Figure 33:
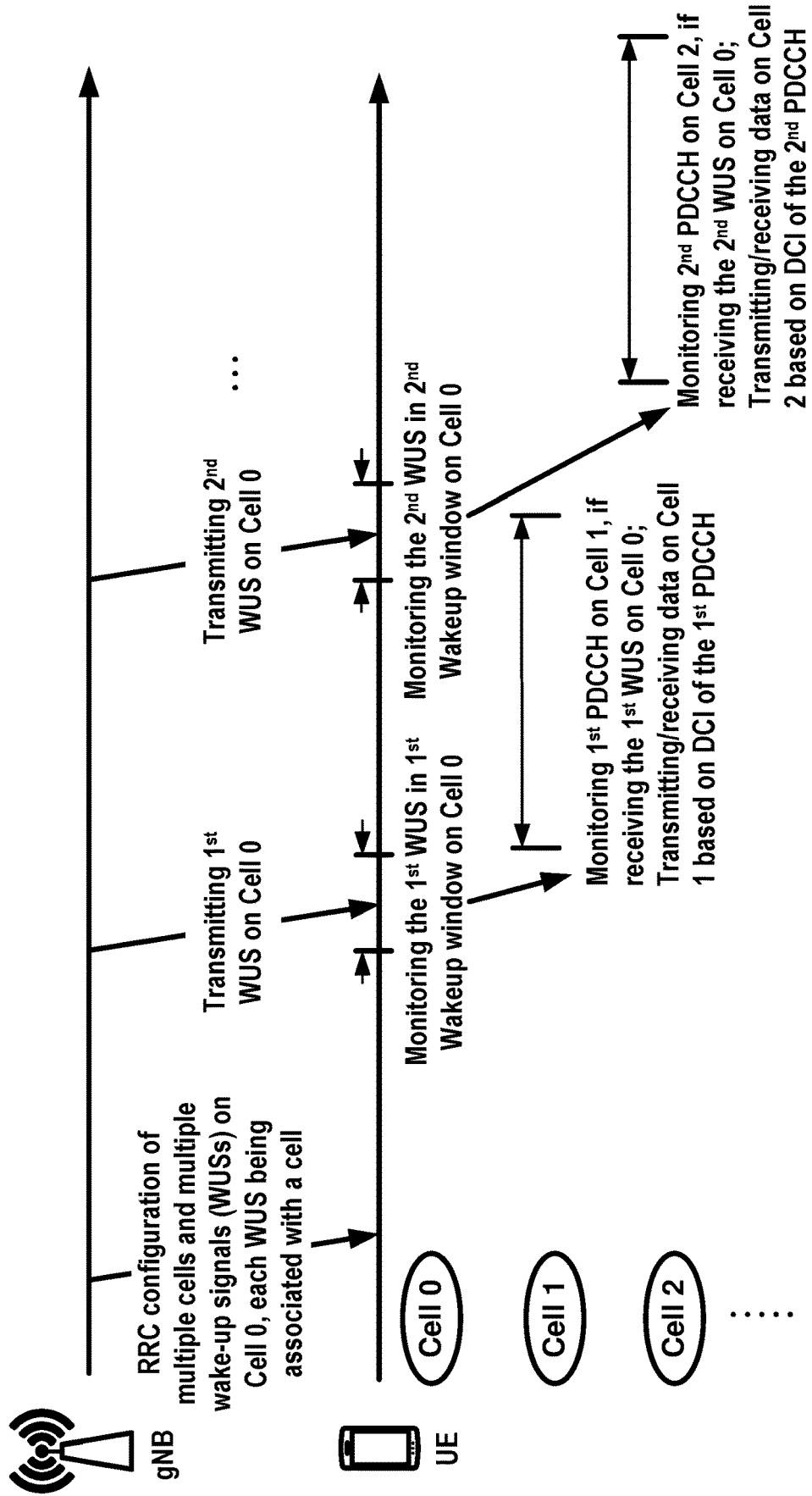
FIG. 33 is an example of flowchart of combined a wake-up signal based power saving operation and DRX operation for carrier aggregation as per an aspect of an embodiment of the present disclosure.

FIG. 33 shows an example of a WUS-based wake-up operation for power saving, when multiple cells in active state. The WUS-based wake-operation for power saving may be performed per cell. A base station (e.g. a gNB) may transmit to a wireless device (e.g., a UE), one or more RRC messages comprising first parameters of a plurality of cells and second parameters of a plurality of WUSs. Each of the plurality of cells may be associated with a respective one of the plurality of WUSs. The first parameters of each of the plurality of cells may comprise at least one of: downlink configuration parameters (e.g., PDCCH configuration parameters); uplink configuration parameters (e.g., PUCCH configuration parameters); one or more radio resource configuration parameters. The second parameters of each of the plurality of WUSs may comprise at least one of: a time radio resource; a frequency radio resource; a transmission periodicity; a signal format; sequence generation parameters (e.g., cell id, virtual cell id, SS block index, and/or an orthogonal code index). In an example, the base station may transmit, via a first cell (e.g., Cell 0), a first WUS (e.g., $1^{st}$ WUS) associated with a second cell (e.g., Cell 1) to a wireless device, according to the second parameters of the first WUS. The base station may transmit, via the first cell (e.g., Cell 0), a second WUS (e.g., $2^{nd}$ WUS) associated with a third cell (e.g., Cell 2) to the wireless device, according to the second parameters of the second WUS. The $1^{st}$ WUS and the $2^{nd}$ WUS may be transmitted on different time and/or frequency resources on Cell 0. The $1^{st}$ WUS and the $2^{nd}$ WUS may be orthogonal-multiplexed in at least one of: time domain; frequency domain; spatial domain; and/or code domain on Cell 0. In an example, the $1^{st}$ WUS may be transmitted in a time resource same as the $2^{nd}$ WUS, when the $1^{st}$ WUS and the $2^{nd}$ WUS are multiplexed in frequency domain; spatial domain; and/or code domain on Cell 0. In an example, the $1^{st}$ WUS and the $2^{nd}$ WUS may be generated based on a same signal sequence with different orthogonal cover codes (e.g., identified by different orthogonal code indexes). In an example, the first cell may be a PCell, or a PSCell.

As shown in FIG. 33, a wireless device may monitor $1^{st}$ WUS in a first time window (e.g., $1^{st}$ wakeup window) on Cell 0 to determine whether the wireless device monitors a first PDCCH on Cell 1. The first time window may be determined based the second parameters of the $1^{st}$ WUS associated with Cell 1. The wireless device may receive the $1^{st}$ WUS in the first time window. In response to receiving the $1^{st}$ WUS in the first time window on Cell 0, the wireless device may monitor the first PDCCH on Cell 1. The wireless device may transmit and/or receive data packets based one or more DCIs received on the first PDCCH of Cell 1. The wireless device may not receive the $1^{st}$ WUS in the first time window. In response to not receiving the $1^{st}$ WUS in the first time window on Cell 0, the wireless device may skip monitoring the first PDCCH on Cell 1. In an example, the wireless device may monitor $2^{nd}$ WUS in a second time window (e.g., $2^{nd}$ wakeup window) on Cell 0 to determine whether the wireless device monitors a second PDCCH on Cell 2. The second time window may be determined based the second parameters of the $2^{nd}$ WUS associated with Cell 2. The wireless device may receive the $2^{nd}$ WUS in the second time window. In response to receiving the $2^{nd}$ WUS in the second time window on Cell 0, the wireless device may monitor the second PDCCH on Cell 2. The wireless device may transmit and/or receive data packets based one or more DCIs received on the second PDCCH of Cell 2. The wireless device may not receive the $2^{nd}$ WUS in the second time window. In response to not receiving the $2^{nd}$ WUS in the second time window on Cell 0, the wireless device may skip monitoring the second PDCCH on Cell 2.

In an example, when configured with multiple BWPs, a wireless device may monitor on a first BWP of a first cell, a first WUS for the first BWP of the first cell in a first time window associated with the first BWP of the first cell. The wireless device may monitor on the first BWP of the first cell, a second WUS for a second BWP of a second cell in a second time window associated with the second BWP of the second cell. The wireless device may receive the first WUS in the first time window. In response to receiving the first WUS in the first time window, the wireless device may monitor a first PDCCH on the first BWP of the first cell. In response to not receiving the first WUS in the first time window, the wireless device may not monitor the first PDCCH on the first BWP of the first cell. The wireless device may receive the second WUS in the second time window on the first BWP of the first cell. In response to receiving via the first BWP of the first cell the second WUS in the second time window, the wireless device may monitor a second PDCCH on the second BWP of the second cell. In response to not receiving via the first BWP of the first cell the second WUS in the second time window, the wireless device may not monitor the second PDCCH on the second BWP of the second cell.

In an example, by the embodiments (as shown in FIG. 33), a wireless device may improve power consumption, when a per-cell wake-up operation is supported. Based on a per-cell wake-up signal monitoring, the wireless device may determine whether to monitor a cell associated with the per-cell wake-up signal. A first cell may be associated with a first WUS different from a second WUS for a second cell.

In an example, a wireless device may start monitoring one or more SCells in response to receiving one or more wakeup indications based on one or more example embodiments of FIG. 30-33. In existing technologies, a base station may transmit a DCI comprising a bitmap of power saving indications. Each bit of the bitmap corresponds to a configured SCell. The wireless device shall start monitoring PDCCH based on a bit, of the bitmap, corresponding to a configured cell, indicating monitoring PDCCH. In existing technologies, a wireless device may be configured with a first number of SCells, the first number being less than a configured or predefined value (e.g., 32). By implementing existing technologies, the base station may allocate a number of bits for the bitmap, the number being equal to the first number (e.g., 32), for power saving indications, each bit corresponding to a configured SCell. However, the base station may actually activate a second number (e.g., 8 or 16) of SCells from the first number of configured SCells based on SCell activation/ deactivation mechanism as shown in FIG. 22A, FIG. 22B and/or FIG. 26, when the data traffic can be accommodated on the second number of activated SCells. The second number may be less than or equal to the first number, e.g., based on a frequency band the wireless device is working. In an example, the second number may be 1, when the wireless device can only support at most 1 active SCell. In an example, using 32 bits for power saving indication for a number (e.g., 8, or 16) of activated SCells is not spectrum efficient for DCI transmission. In an example, the wireless device may increase power consumption when trying to detect a DCI comprising a 32-bit power saving indication and other DCI fields. There is a need to improve power saving mechanism when configured with multiple cells.

Figure 34:
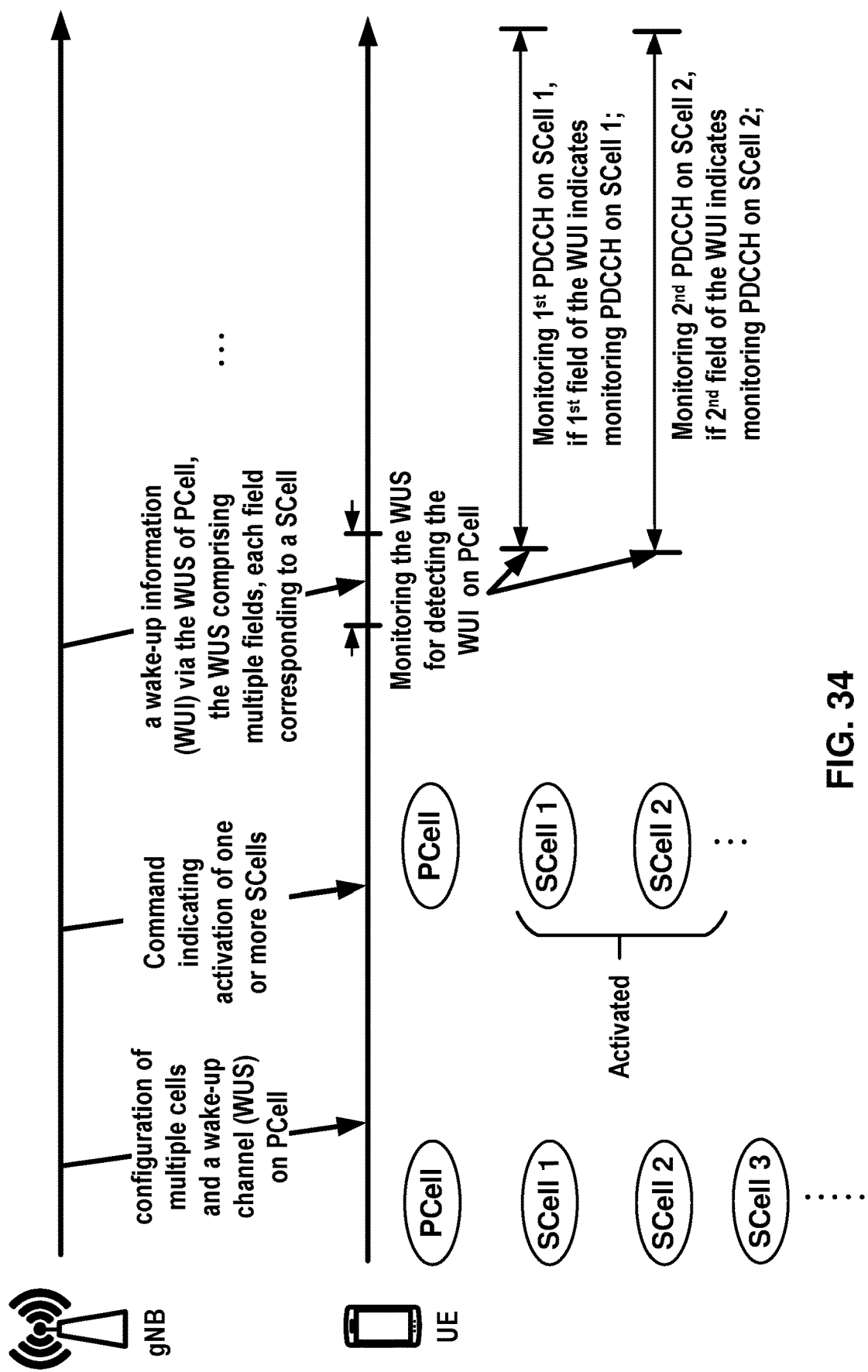
FIG. 34 is an example of a wake-up signal based power saving operation for carrier aggregation as per an aspect of an embodiment of the present disclosure.

FIG. 34 shows an example of a wake-up operation based on a wake-up channel, when multiple cells are configured. A base station (e.g., a gNB) may transmit to a wireless device (e.g., a UE), one or more RRC messages comprising first parameters of a plurality of cells and second parameters of a wake-up channel. The first parameters of each of the plurality of cells may comprise at least one of: downlink configuration parameters (e.g., PDCCH configuration parameters); uplink configuration parameters (e.g., PUCCH configuration parameters); one or more radio resource configuration parameters. The wake-up channel may comprise a downlink control channel (e.g., a PDCCH) dedicated for the wake-up operation. The second parameters of the wake-up channel may comprise at least one of: a time window indicating a duration when the base station may transmit a wake-up information via the wake-up channel; parameters of a control resource set (e.g., time and/or frequency resource of the wake-up channel); a periodicity of the transmission of the wake-up channel; a DCI format; a cell index indicating a cell of the wake-up channel.

In an example, the base station may transmit one or more commands (e.g., SCell activation/deactivation MAC CE as shown in FIG. 22A or FIG. 22B) indicating activation of a number of SCells (e.g., SCell 1, SCell 2, and etc.) of the plurality of cells. In response to receiving the one or more commands, the wireless device may activate the number of SCells.

In an example, the base station may transmit the wake-up channel on a first cell of the plurality of cells. The first cell may be predefined as a PCell, or a PSCell. The first cell may be indicated by the cell index of the one or more RRC messages. In an example, the base station may transmit, via the wake-up channel of the first cell (e.g., PCell), a wake-up information to a wireless device. The wake-up information may be contained in a bitmap with a number of bits, the number being equal to a number of activated SCells. The wake-up information may comprise one or more fields, each of the one or more fields corresponding to a respective one cell of the number of activated SCells (e.g., SCell 1, SCell 2, and etc.) of the plurality of cells. One of the one or more fields may comprise at least one bit indicating whether or not the wireless device monitor an activated SCell associated with the one field. In an example, a first field of the one or more fields may indicate whether or not monitoring for a first active SCell of the number of activated SCells, the first active SCell having a lowest cell index among one or more cell indexes of the number of activated SCells. In an example, a second field of the one or more fields may indicate whether or not monitoring for a second active SCell of the number of activated SCells, the second active cell having a second lowest cell index among the one or more cell indexes of the number of activated SCells. In an example, the at least one bit of the one field being set to a first value (e.g., "1") may indicate the wireless device may monitor the active SCell associated with the one field. The at least one bit of the one field being set to a second value (e.g., "0") may indicate that the wireless device may not monitor the active SCell associated with the one field. In an example, the wake-up information may be contained in a DCI with a DCI format. The DCI format may be indicated in the one or more RRC messages. The DCI format may be predefined in the gNB and the wireless device.

In an example, the wake-up information may be addressed to a group of wireless devices. The wake-up information may be contained in a DCI addressed to a group of wireless devices, e.g., by a group control signaling. The group control signaling may be identified by a DCI format and/or a group RNTI. The group RNTI may be indicated in the one or more RRC messages. The DCI format for the wake-up operation may be different from one or more DCI formats (e.g., DCI format 0-0/0-1/1-0/1-1/2-0/2-1/2-2/2-3) in existing NR technologies. The group RNTI for the wake-up operation may be different from RNTIs (e.g., C-RNTI, SFI-RNTI, INT-RNTI, TPC-PUCCH-RNTI, TPC-PUSCH-RNTI, or TPC-SRS-RNTI). The base station may transmit the wake-up information via the wake-up channel on the first cell. The wake-up channel may be transmitted on a dedicated control resource set indicated by the one or more RRC messages. The dedicated control resource set for the wake-up channel may be different from one or more control resource sets of PDCCHs for at least one of: DL resource assignment; UL grant; paging; system information; and/or RAR transmission.

As shown in FIG. 34, a wireless device may monitor, in the time window, the wake-up channel on the first cell (e.g., PCell) for receiving the wake-up information. The wireless device may receive the wake-up information via the wake-up channel on the first cell in the time window. In response to receiving the wake-up information, the wireless device may determine whether to monitor PDCCHs of the number of activated SCells of the plurality of cells based on one or more fields of the wake-up information. In an example, the wireless device may monitor a first PDCCH of a first active SCell (e.g., SCell 1) of the number of activated SCells, in response to a first field of the wake-up information indicating a monitoring of the first active SCell associated with the first field. The wireless device may not monitor the first PDCCH of the first active SCell, in response to the first field not indicating the monitoring of the first active SCell. In an example, the wireless device may monitor a second PDCCH of a second active SCell (e.g., SCell 2) of the number of activated SCells, in response to a second field of the wake-up information indicating a monitoring of the second active SCell associated with the second field. The wireless device may not monitor the second PDCCH of the second active SCell, in response to the second field not indicating the monitoring of the second active SCell. In an example, the wireless device may not receive the wake-up information via the wake-up channel on the first cell in the time window. The wireless device may skip monitoring PDCCHs of the one or more active SCells in response to not receiving the wake-up information.

In an example, by the embodiments (as shown in FIG. 34), a wireless device may improve power consumption by detecting a wake-up information via a wake-up channel of a first cell to determine which cell the wireless device may monitor PDCCH. The wake-up information may comprise multiple parameters indicating whether to monitor PDCCHs of multiple active cells.

In an example, FIG. 34 may be applied for SCell dormancy transitions. A base station may transmit one or more commands (e.g., SCell activation/deactivation MAC CE as shown in FIG. 22A or FIG. 22B) indicating activation of a number of SCells (e.g., SCell 1, SCell 2, and etc.) of the plurality of cells. In response to receiving the one or more commands, a wireless device may activate the number of SCells. The base station may transmit one or more DCI indicating transition of the activated SCells into dormant state. The one or more DCI may have a same DCI format as the DCI for wake-up indication. The one or more DCI may be transmitted with a RNTI different from that of the DCI for wake-up indication. The one or more DCI may comprise a bitmap of dormancy/activation indication. Each of the bitmap corresponds to an activated SCell of the number of activated SCells. The corresponding between a bit and an activated SCell may be implemented by example of FIG. 35.

In an example, the wireless device may transition a first active SCell (e.g., SCell 1) of the number of activated SCells to a dormant state, in response to a bit of the SCell dormancy/activation indication bitmap of the one or more DCI indicating a dormancy transition of the first active SCell associated with the bit. The wireless device may perform actions for the activated SCell in the dormant state, the actions comprising at least one of: stopping transmitting SRS on the SCell; reporting CQI/PMI/RI/PTI/CRI for the SCell according to a periodicity configured for the SCell in a dormant state; not transmitting on UL-SCH on the SCell; not transmitting on RACH on the SCell; not monitoring the PDCCH on the SCell; not monitoring the PDCCH for the SCell; and/or not transmitting PUCCH on the SCell.

In an example, the wireless device may transition a second SCell (e.g., SCell 2) from a dormant state to an active state, in response to a bit of the SCell dormancy/activation indication bitmap of the one or more DCI indicating a transition of the second SCell, associated with the bit, from the dormant state to the active state. The wireless device may perform actions for the activated SCell, the actions comprising at least one of: transmitting SRS on the SCell; reporting CQI/PMI/RI/PTI/CRI for the SCell; transmitting on UL-SCH on the SCell; transmitting on RACH on the SCell; monitoring the PDCCH on the SCell; monitoring the PDCCH for the SCell; and/or transmitting PUCCH on the SCell.

Figure 35:
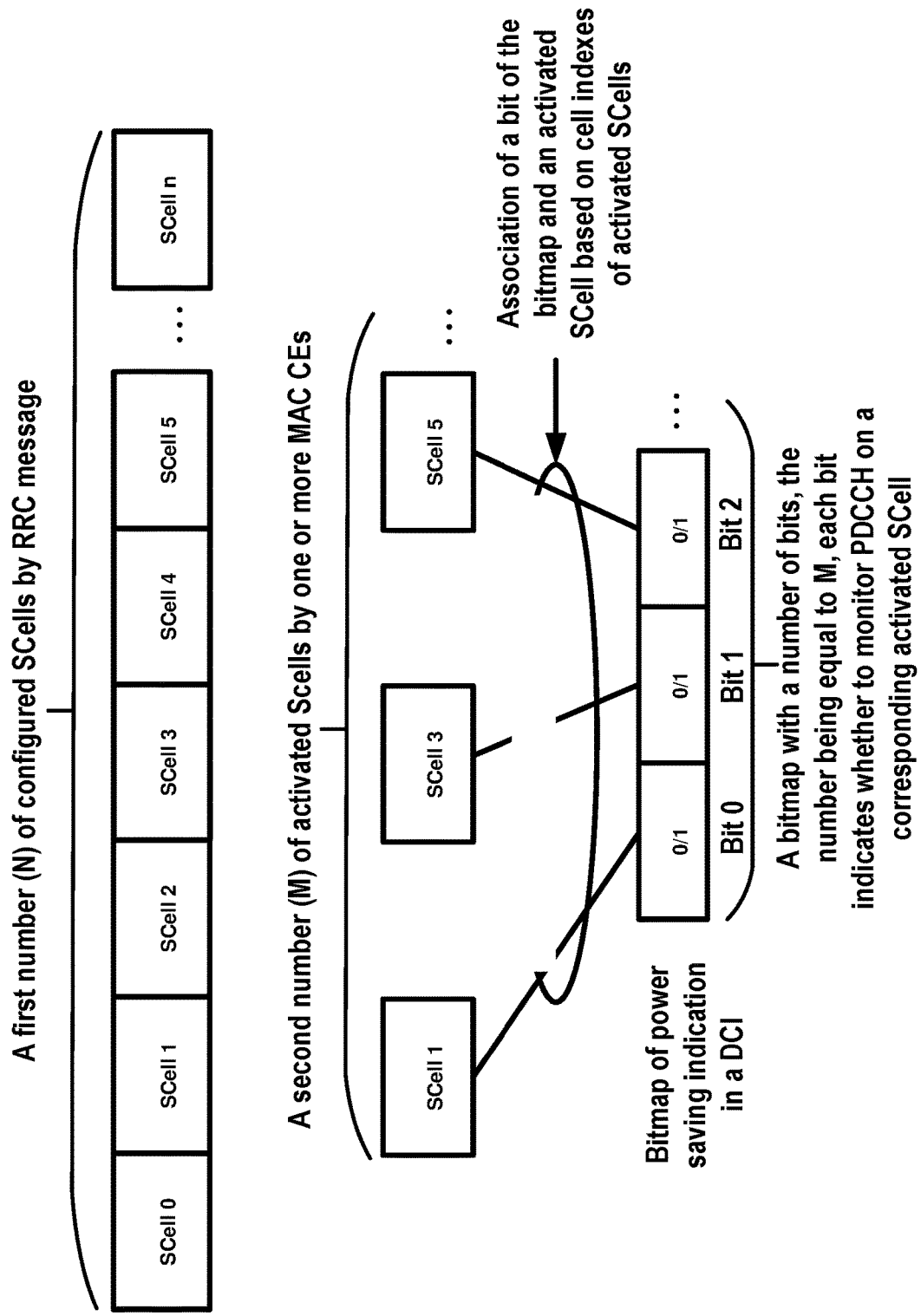
FIG. 35 is an example of a bitmap of wake-up indication of a DCI as per an aspect of an embodiment of the present disclosure.

FIG. 35 shows an example of bitmap of a wake-up information (or a power saving indication) for a plurality of active SCells. In an example, a base station may configure a first number (e.g., N) of SCells (e.g., SCell 0, SCell 1, . . . SCell n) for a wireless device by transmitting one or more RRC messages (as shown in FIG. 34), each SCell being identified with a SCell index or a SCell identifier. The base station may activate a second number (e.g., M) of SCells (e.g., SCell 1, SCell 3, SCell 5, and etc.) from the first number of SCells, based on example embodiments of FIG. 22A and/or FIG. 22B. In an example, M is smaller than or equal to N. The base station may transmit the DCI comprising a bitmap of wake-up indication, the bitmap having bit length equal to M, each bit of the bitmap corresponding to an activated SCell of the second number of activated SCells.

In an example, association between a bit of the bitmap and an activated SCell is based on a SCell index of the activated SCell. A first bit (e.g., bit 0) of the bitmap may correspond to a first activated SCell (e.g., SCell 1) having a lowest SCell index, among the second number of activated SCells. A second bit (e.g., bit 1), next to the first bit, of the bitmap may correspond to a second activated SCell (e.g., SCell 3) having a second lowest SCell index, among the second number of activated SCells, and so on. Each bit of the bitmap may indicate whether the wireless device monitors PDCCH on a corresponding activated SCell of the second number of activated SCells. In an example, the bitmap may further comprise a bit corresponding to the PCell, indicating whether the wireless device monitors PDCH on the PCell. By example of FIG. 35, the bit length used for indicating wake-up command for activated SCells may be reduced from N (e.g., 32) to M (e.g., 8, 16, or a number less than 32), therefor resulting in reduced power consumption for receiving the DCI by the wireless device, and/or improved spectrum efficiency of transmitting the DCI by the base station.

In an example, when configured with multiple BWPs, a wireless device may monitor a wake-up channel on a first BWP of a plurality of BWPs of a first cell, for detecting a wake-up information. The first BWP may be an active BWP of the plurality of BWPs. The configuration of the wake-up channel may be configured per BWP. In an example, a gNB may transmit one or more RRC messages comprising configuration parameters of a BWP of a plurality of BWPs on a cell. The configuration parameters of the BWP may comprise at least one of: DL radio resource configuration parameters; UL radio resource configuration parameters; and/or configuration parameters of a wake-up channel on the BWP. The configuration parameters of the wake-up channel on the BWP may comprise at least one of: a control resource set; a time duration for the wake-up channel; a periodicity of the transmission of the wake-up channel. In an example, in response to receiving the one or more RRC messages, the wireless device may monitor the wake-up channel associated with a first BWP of a first cell, the first BWP being an active BWP. In response to receiving a wake-up information via the wake-up channel, the wireless device may determine whether to monitor PDCCHs of one or more active BWPs of one or more active cells based on one or more fields of the wake-up information.

Figure 36:
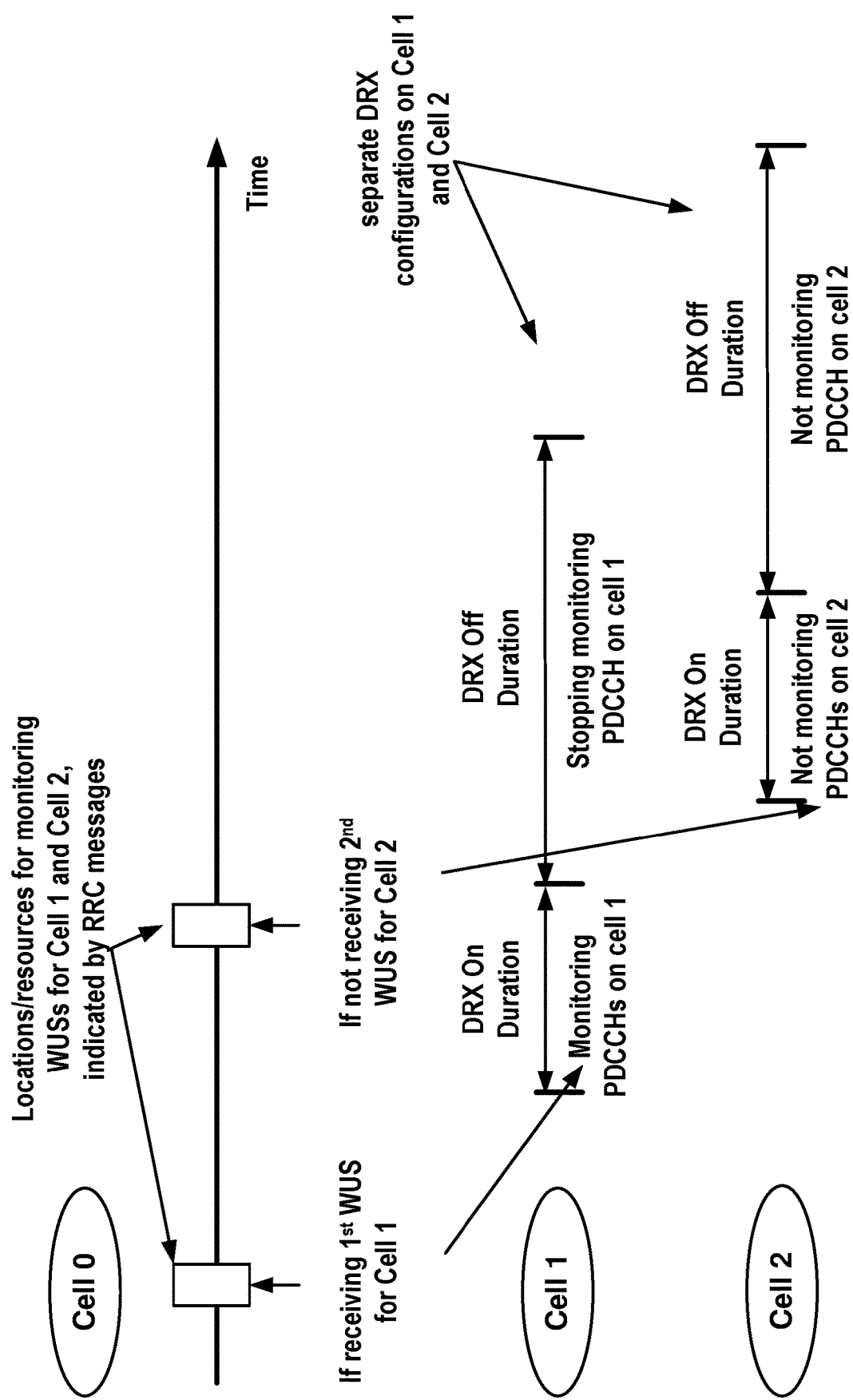
FIG. 36 is an example of a wake-up signal based power saving operation and DRX operation for carrier aggregation as per an aspect of an embodiment of the present disclosure.

FIG. 36 shows an example of a per-cell DRX operation and a per-cell wake-up operation based on multiple WUSs. In an example, a base station (e.g., a gNB) may transmit to a wireless device (e.g., a UE), one or more RRC messages comprising first configuration parameters of a plurality of cells, second configuration parameters of multiple DRX parameters of a plurality of DRX operations, and third configuration parameters of multiple WUSs. Each of the plurality of DRX operations may be applied on a respective one of the plurality of cells. A wireless device may perform separate DRX operation for different cells. As shown in FIG. 36, a wireless device may perform a first DRX operation on a first cell (e.g., Cell 1) and a second DRX operation on a second cell (e.g., Cell 2). The first DRX operation and the second DRX operation may have different and/or separate DRX parameters (e.g., DRX cycle and/or timer values of multiple DRX timers). Each cell may be associated with a respective one of the multiple WUSs. As shown in FIG. 36, Cell 1 may be associated with $1^{st}$ WUS of the multiple WUSs on Cell 0, and Cell 2 may be associated with $2^{nd}$ WUS of the multiple WUSs on Cell 0. The $1^{st}$ WUS and the $2^{nd}$ WUS may be transmitted on different time and/or frequency resources on Cell 0. The $1^{st}$ WUS and the $2^{nd}$ WUS may be orthogonal-multiplexed in at least one of: time domain; frequency domain; spatial domain; and/or code domain on Cell 0. In an example, the $1^{st}$ WUS may be transmitted in a time resource same as the $2^{nd}$ WUS, when the $1^{st}$ WUS and the $2^{nd}$ WUS are multiplexed in frequency domain; spatial domain; and/or code domain on Cell 0. Cell 0 may be a PCell, or a PSCell. As shown in FIG. 36, in response to receiving the one or more RRC messages, the wireless device may monitor on Cell 0, a first radio resource (time/frequency/code/spatial domain) in a first time window for detecting a first WUS. In an example, the wireless device may receive the first WUS (e.g., $1^{st}$ WUS) in the first time window. The wireless device may determine, based on DRX parameters associated with a second cell, a MAC entity of the wireless device is in a first DRX active time on the second cell (e.g., Cell 1), the second cell being associated with the first WUS. In response to detecting the first WUS and determining the MAC entity is in the first DRX active time, the wireless device may monitor a first PDCCH of the second cell at least during the first DRX active time. In an example, the wireless device may not receive the first WUS (e.g., $1^{st}$ WUS) in the first time window. In response to not detecting the first WUS and determining the MAC entity is in the first DRX active time, the wireless device may not monitor the first PDCCH at least during the first DRX active time. In an example, the wireless device may monitor on Cell 0, a second radio resource (time/frequency/code/spatial domain) in a second time window for detecting a second WUS (e.g., $2^{nd}$ WUS). The wireless device may receive the second WUS. The wireless device may determine, based on DRX parameters associated with a third cell, the MAC entity is in a first DRX active time on the third cell (e.g., Cell 2), the third cell being associated with the second WUS. In response to detecting the second WUS and determining the wireless device is in the second DRX active time, the wireless device may monitor a second PDCCH of the third cell at least during the second DRX active time. The wireless device may receive the second WUS. In response to not detecting the second WUS and determining the wireless device is in the second DRX active time, the wireless device may not monitor the second PDCCH at least during the second DRX active time.

Figure 37:
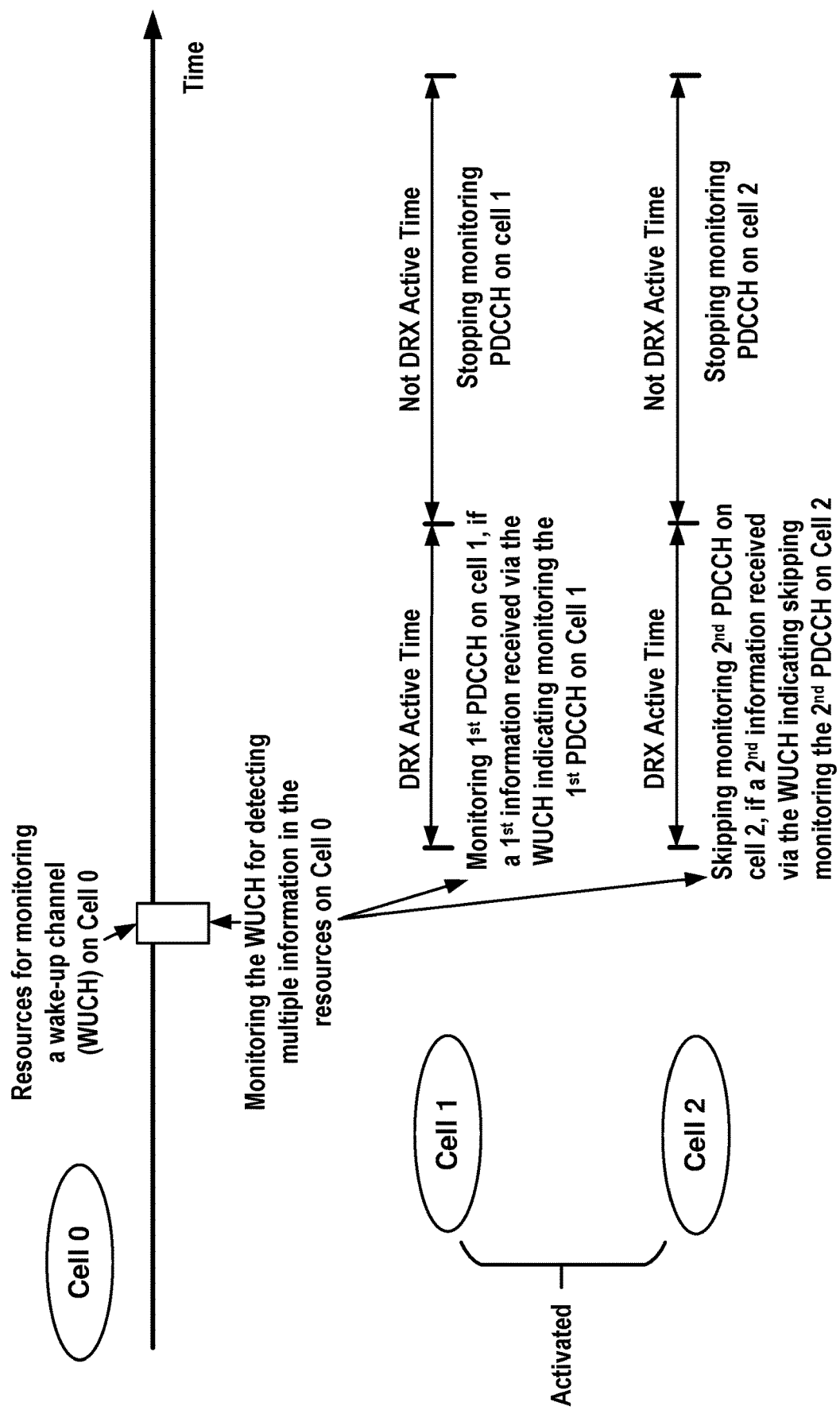
FIG. 37 is an example of a wake-up channel based power saving operation and DRX operation for carrier aggregation as per an aspect of an embodiment of the present disclosure.

FIG. 37 shows an example of a DRX operation and a wake-up operation based on a wake-up channel. A base station (e.g. a gNB) may transmit to a wireless device (e.g., a UE), one or more RRC messages comprising first parameters of a plurality of cells, second parameters of a DRX operation, and third parameters of a wake-up channel. The first parameters of each of the plurality of cells may comprise at least one of: downlink configuration parameters (e.g., PDCCH configuration parameters); uplink configuration parameters (e.g., PUCCH configuration parameters); one or more radio resource configuration parameters. The DRX operation may be performed per cell. In an example, configuration parameters of a per-cell DRX operation may be configured per cell (e.g., each cell of a plurality of cells of a base station may be configured with a dedicated set of configuration parameters). When a per-cell DRX operation is supported (e.g., as shown in FIG. 36), a first cell (e.g., Cell 1) may be configured with a separate DRX parameters of a first DRX operation from a second DRX operation on a second cell (e.g., Cell 2). In an example, configuration parameters of a per-cell DRX operation may be configured per base station (or for a plurality of cells of a base station). DRX parameters configured in the one or more RRC messages may apply on the one or more active cells comprising a first cell (e.g., Cell 1) and a second cell (e.g., Cell 2). In an example, the wake-up channel may comprise a downlink control channel (e.g., a PDCCH) dedicated for the wake-up operation. The third parameters of the wake-up channel may comprise at least one of: a time window indicating a duration when the base station may transmit a wake-up information via the wake-up channel; parameters of a control resource set (e.g., time and/or frequency resource of the wake-up channel; a periodicity of the transmission the wake-up channel; a DCI format; a cell index indicating a cell of the wake-up channel.

In an example, the base station may transmit one or more commands (e.g., SCell activation/deactivation MAC CE as shown in FIG. 22A or FIG. 22B) indicating activation of a number of SCells (e.g., SCell 1, SCell 2, and etc.) of the plurality of cells. In response to receiving the one or more commands, the wireless device may activate the number of SCells.

In an example, the base station may transmit the wake-up channel on a first cell (e.g., Cell 0) of the plurality of cells. The first cell may be predefined as a PCell, or a PSCell. The first cell may be indicated by the cell index of the one or more RRC messages.

In an example, the base station may transmit, via the wake-up channel of the first cell (e.g., Cell 0), multiple wake-up information to a wireless device. The multiple wake-up information may be contained in a bitmap of a DCI, by implementing examples of FIG. 35. Each of the multiple wake-up information may comprise at least one bit corresponding to a respective one cell of the number of SCells of the plurality of cells. In an example, a first bit (e.g., bit 0) of the bitmap may correspond to a first active cell (e.g., Cell 1) having a lowest SCell index, among the number of SCells. A second bit (e.g., bit 1), next to the first bit, of the bitmap may correspond to a second activated cell (e.g., Cell 2) having a second lowest SCell index, among the number of SCells, and so on.

In an example, at least one bit of the bitmap may indicate whether or not the wireless device monitors a cell associated with the at least one bit. In an example, the at least one bit being set to a first value (e.g., "1") may indicate that the wireless device may monitor the cell associated with the at least one bit. The at least one bit being set to a second value (e.g., "0") may indicate that the wireless device may not monitor the cell associated with the at least one bit. The base station may transmit the multiple wake-up information via the wake-up channel on the first cell (e.g., Cell 0). In an example, a wireless device may monitor the wake-up channel on the first cell for detecting the multiple wake-up information. In an example, the wireless device may receive (or successfully detect) the multiple wake-up information via the wake-up channel on the first cell. The wireless device may determine a MAC entity of the wireless device is in a DRX active time based on the second parameters of the DRX operation. In response to receiving the multiple wake-up information and determining the MAC entity is in the DRX active time, the wireless device may determine on which cell(s) the wireless device may monitor one or more PDCCHs. In an example, if a first information (e.g., $1^{st}$ information) of the multiple information associated with a first cell (e.g., Cell 1) indicates a monitoring of a first PDCCH (e.g., $1^{st}$ PDCCH) of the first cell, the wireless device may monitor the first PDCCH of the first cell at least in the DRX active time. If the first information does not indicate the monitoring of the first PDCCH, the wireless device may not monitor the first PDCCH at least in the DRX active time. In an example, if a second information (e.g., $2^{nd}$ information) of the multiple information associated with a second cell (e.g., Cell 2) indicates a monitoring of a second PDCCH (e.g., 2nd PDCCH) of the second cell, the wireless device may monitor the second PDCCH of the second cell at least in the DRX active time. If the second information does not indicate the monitoring of the second PDCCH, the wireless device may not monitor the second PDCCH at least in the DRX active time.

In an example, when configured with multiple BWPs on a first cell of a plurality of cells, a wireless device may monitor a wake-up channel on a first BWP of the multiple BWPs of the first cell for detecting multiple wake-up information. In an example, the wireless device may receive (or successfully detect) the multiple wake-up information via the wake-up channel on the first BWP. The wireless device may determine a MAC entity of the wireless device is in a DRX active time based on parameters of a DRX operation. In response to receiving the multiple wake-up information and determining the MAC entity of the wireless device is in the DRX active time, the wireless device may determine on which cell(s) the wireless device may monitor one or more PDCCHs. The first BWP may be an active BWP. The first cell may be a PCell or a PSCell.

In an example, a NR wireless device when configured with multiple cells may spend more power than an LTE-A wireless device, for communication with a base station. The NR wireless device may communicate with a NR base station via cells operating in high frequency (e.g., 6 GHz, 30 GHz, or 70 GHz), with more power consumption than the LTE-A wireless device operating in low frequency (e.g., <=6 GHz). Performing beamforming with multiple beams may be convenient and/or power-efficient for a base station operating on high frequency. A base station operating on high frequency may perform beamforming with multiple beams to communicate with a wireless device. In the example, it's beneficial for the NR wireless device to implement a wake-up operation for power saving, when communicating with the base station on multiple beams.

Figure 38:
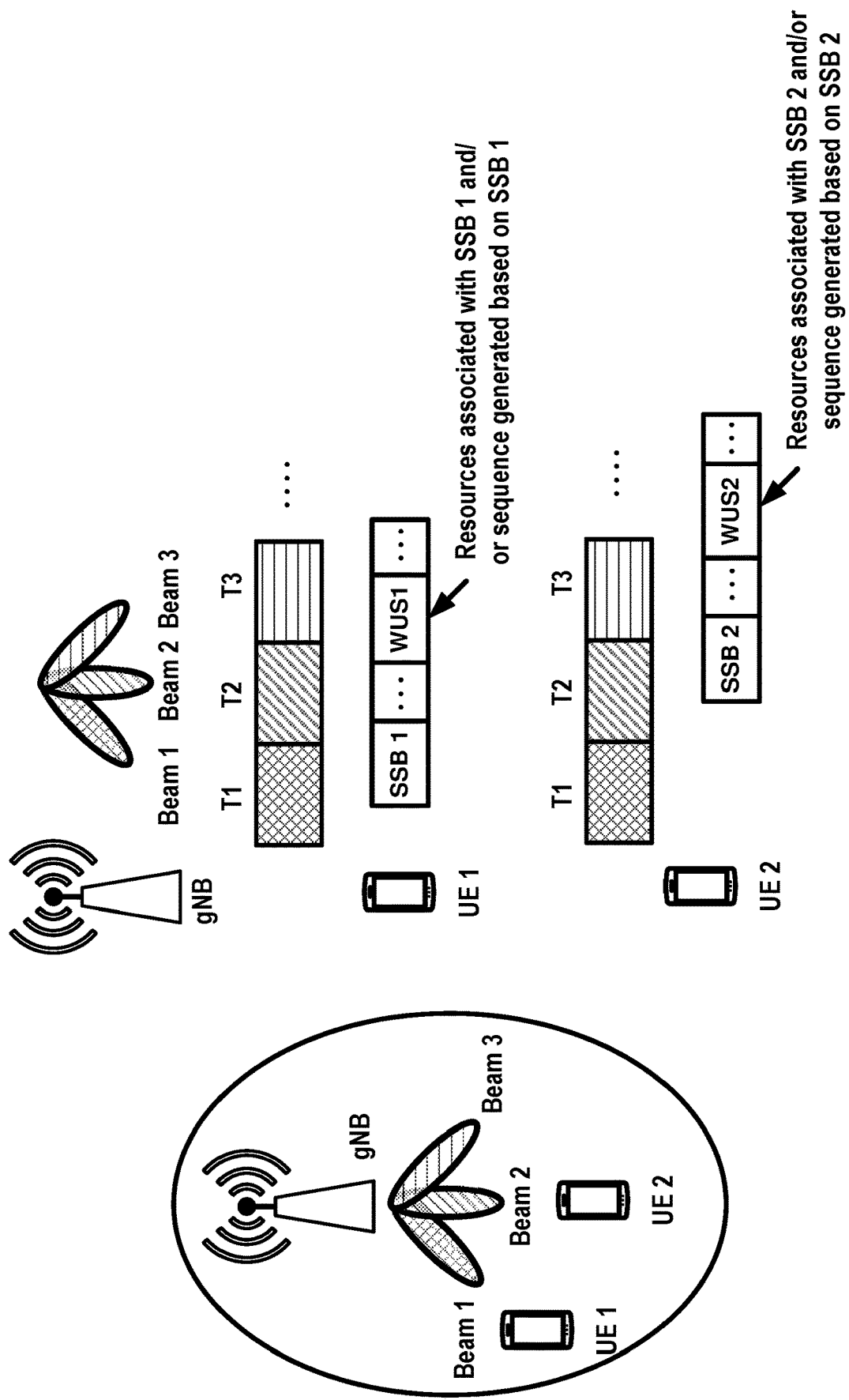
FIG. 38 is an example of a wake-up channel of multiple beams as per an aspect of an embodiment of the present disclosure.

FIG. 38 shows an example embodiment of a wake-up operation based on a wake-up signal with multiple beams. A base station (e.g., a gNB) may communicate with a first wireless device (e.g., UE 1) via a first beam (e.g., Beam 1), and communicate with a second wireless device (e.g., UE 2) via a second beam (e.g., Beam 2). The first beam may be identified by one or more first reference signals (e.g., SS blocks, or CSI-RSs). The second beam may be identified by one or more second reference signals (e.g., SS blocks, or CSI-RS s). As shown in FIG. 38, Beam 1 may be identified by SSB 1, and Beam 2 may be identified by SSB 2. In an example, a beam may be identified with a CSI-RS (e.g., associated with a CSI-RS resource index) as shown in FIG. 17.

As shown in FIG. 38, the base station may transmit a first wake-up signal (e.g., WUS 1) on a first resource (e.g., time/frequency radio resource), to the first wireless device (e.g., UE 1). The first resource may be determined based on Beam 1 (identified by SSB 1), on a cell. In an example, the first resource may be one or more resources determined based on a first time duration (e.g., T1) associated with SSB 1. In an example, the first resource may be one or more resources in the first time duration associated with SSB 1. The first duration may be a time duration when SSB 1 is transmitted. The base station may transmit a second wake-up signal (e.g., WUS 2) on a second resource (e.g., time/frequency radio resource), to the second wireless device (e.g., UE 2). The second resource may be determined based on Beam 2 (identified by SSB 2). In an example, the second resource may be one or more resources determined based on a second time duration (e.g., T2) associated with SSB 2. The second resource may be one or more resources in the second time duration. The second time duration may be a time duration when SSB 2 is transmitted.

As shown in FIG. 38, the first wireless device (e.g., UE 1) may determine, among Beam 1, 2 and 3, that Beam 1 is a serving beam (or a reference beam). In response to determining Beam 1 being the serving beam, the first wireless device may determine a receiving beam corresponding to the serving beam for detecting the first WUS. The first wireless device may determine, among SSB 1, 2, and 3, that SSB 1 is a reference SSB (or a serving SSB), based on one or more criteria. The one or more criteria may be based on least one of: a L1-RSRP value; a L3-RSRP value; a SINR value; a CQI value. The first wireless device may determine, among SSB 1, 2, and 3, that SSB 1 is a reference SSB (or a serving SSB) in response to SSB1 having a largest L1-RSRP value among L1-RSRP values of SSB 1, 2 and 3. The first wireless device may determine SSB 2 is not the reference SSB (or the serving SSB). In response to determining SSB 1 being the reference SSB, the first wireless device may determine that the first resource (e.g., time/frequency radio resource) is in a first time duration (e.g., T1) associated with SSB 1. In response to determining SSB 1 being the reference SSB, the first wireless device may generate the first WUS based on at least one of: the cell ID; the SSB index of SSB 1; and/or the first identifier of the first wireless device (e.g., C-RNTI 1). The first wireless device may monitor, in the first resource with the receiving beam, the first WUS with a signal sequence generated based on the cell ID, the first identifier of the first wireless device, and/or the SSB index. The first wireless device may receive (or successfully detect) the first WUS in the first resource. In response to receiving the first WUS, the first wireless device may monitor PDCCHs of the cell. The first wireless device may not receive (or successfully detect) the first WUS in the first resource. In response to not receiving the first WUS, the first wireless device may skip monitoring the PDCCHs of the cell. In an example, a go-to-sleep signal (e.g., as shown in FIG. 29B) based wake-up operation may be applied similarly as the WUS based wake-up operation. In response to receiving a first go-to-sleep signal, the first wireless device may skip monitoring PDCCHs of the cell. The first wireless device may not receive (or successfully detect) the first go-to-sleep signal in the first resource. In response to not receiving the first go-to-sleep signal, the first wireless device may monitor the PDCCHs of the cell.

As shown in FIG. 38, the second wireless device (e.g., UE 2) may determine, among Beam 1, 2 and 3, Beam 2 is a serving beam (or a reference beam). In response to determining Beam 2 being the serving beam, the second wireless device may determine a receiving beam corresponding to the serving beam. The second wireless device may determine, among SSB 1, 2 and 3, that SSB 2 is a reference SSB. In response to determining SSB 2 being the reference SSB, the second wireless device may determine the second resource (e.g., time/frequency radio resource) based on a second time duration (e.g., T2) associated with SSB 2. In response to determining SSB 2 being the reference SSB, the second wireless device may generate the second WUS based on at least one of: the cell ID, a second RNTI of the second wireless device and/or an SSB index of SSB 2. The second wireless device may monitor, in the second resource with the receiving beam, the second WUS with a signal sequence generated based on the cell ID, the SSB index and/or the second RNTI. The second wireless device may receive (or successfully detect) the second WUS in the second resource. In response to receiving the second WUS, the second wireless device may monitor PDCCHs of the cell. The second wireless device may not receive (or successfully detect) the second WUS in the second resource. In response to not receiving the second WUS, the second wireless device may skip monitoring the PDCCHs of the cell. In an example, a go-to-sleep signal (e.g., as shown in FIG. 29B) based wake-up operation may be applied similarly with the WUS based wake-up operation. In response to receiving a second go-to-sleep signal, the second wireless device may skip monitoring PDCCHs of the cell. The second wireless device may not receive (or successfully detect) the second go-to-sleep signal in the second resource. In response to not receiving the second go-to-sleep signal, the second wireless device may monitor the PDCCHs of the cell.

In an example, reference signals for determining a resource and/or a time duration of a WUS may comprise a CSI-RS, and/or a DMRS. Reference signals for generating a WUS may comprise a CSI-RS, and/or a DMRS. In an example, a base station may transmit to a wireless device (e.g., UE1/2), one or more RRC messages comprising configuration parameters of a first cell of a plurality of cells. The one or more RRC messages may comprise one or more cell-specific or cell-common RRC messages (e.g., Serving-CellConfig IE, or ServingCellConfigCommon IE). In an example, the first cell may be a primary cell (e.g., PCell), a PUCCH secondary cell if secondary PUCCH group is configured, or a primary secondary cell (e.g., PSCell) if dual connectivity is configured. The plurality of cells may further comprise at least a second cell. The at least second cell may be a secondary cell (e.g., SCell). Each cell of the plurality of cells may be associated with a cell specific identity (e.g., cell ID). The first cell may comprise a plurality of BWPs, each BWP of the plurality BWPs being identified by a BWP ID. The configuration parameters may comprise first parameters of a WUS on the first cell. The first parameters may comprise at least one of: a signal format (e.g., numerology); at least one RS index; sequence generation parameters (e.g., a cell id, a virtual cell id, SS block index, a BWP ID, a CSI RS ID, a DMRS port number, an orthogonal code index, a UE-specific RNTI, or a group-UE RNTI) for generating the WUS. In an example, the WUS may comprise at least one of: a SS block; a CSI-RS; a DMRS; a PDCCH; and/or a signal sequence. The wireless device may determine a receiving beam based on the first parameters. The wireless device may monitor on the first cell, the WUS with the receiving beam. The wireless device may monitor on a first BWP of the multiple BWPs of the first cell, the WUS with the receiving beam, if the multiple BWPs are configured. In an example, the first BWP may be at least one of: an initial active BWP; a first active BWP; a default BWP. The initial active BWP, the first active BWP, and/or the default BWP may be indicated in one or more RRC messages. The first BWP may be a BWP which is active on the first cell. The receiving beam may be indicated by the at least one RS index. The wireless device may receive (or successfully detect) the WUS on the first cell. In response to receiving the WUS, the wireless device may monitor first PDCCH of the first cell and at least a second PDCCH of the at least second cell if the at least second cell is in active. The wireless device may not receive (or successfully detect) the WUS on the first cell. In response to not receiving the WUS, the wireless device may not monitor the first PDCCH of the first cell and the at least second PDCCH of the at least second cell if the at least second cell is in active.

Figure 39:
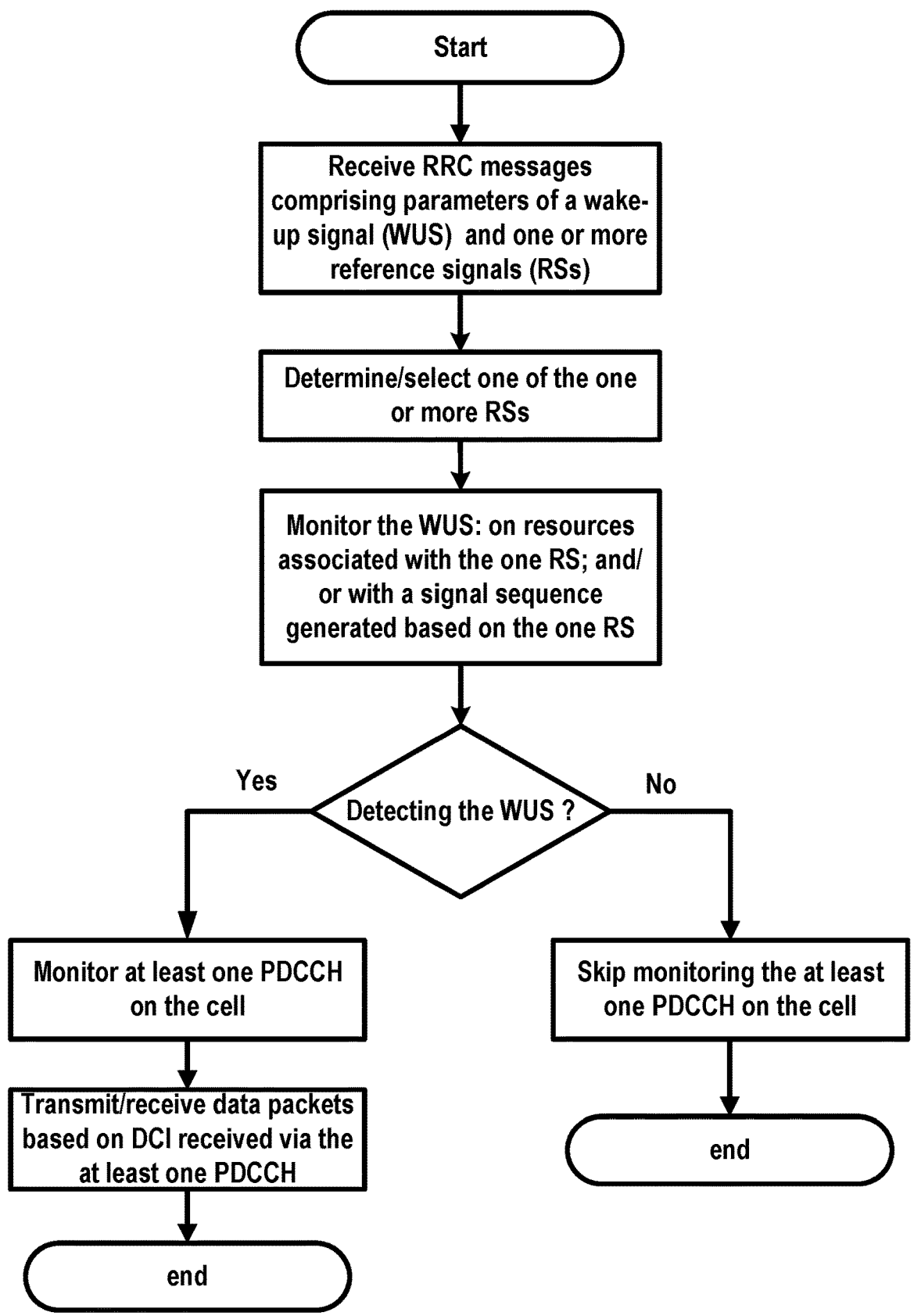
FIG. 39 is an example of flowchart of a wake-up channel of multiple beams as per an aspect of an embodiment of the present disclosure.

FIG. 39 shows an example flowchart of a wake-up operation based on a WUS with multiple beams. A wireless device may receive one or more RRC messages comprising parameters of a WUS on a cell (e.g., PCell) and/or one or more reference signals. The wireless device may determine (or select) one of the one or more reference signals. The wireless device may, based on the one reference signal, determine: time/frequency resources; signal sequence and/or a receiving beam, for detecting the WUS. In response to receiving the one or more RRC messages, the wireless device may monitor the WUS: on the time/frequency resources; with the signal sequence; and/or with the receiving beam. In an example, the wireless device may receive the WUS on the cell. In response to receiving the WUS, the wireless device may monitor a PDCCH on the cell. The wireless device may transmit/receive data packets based on DCI received via the PDCCH. In an example, the wireless device may not receive the WUS on the cell. In response to not receiving the WUS, the wireless device may skip monitoring the PDCCH on the cell.

Figure 40:
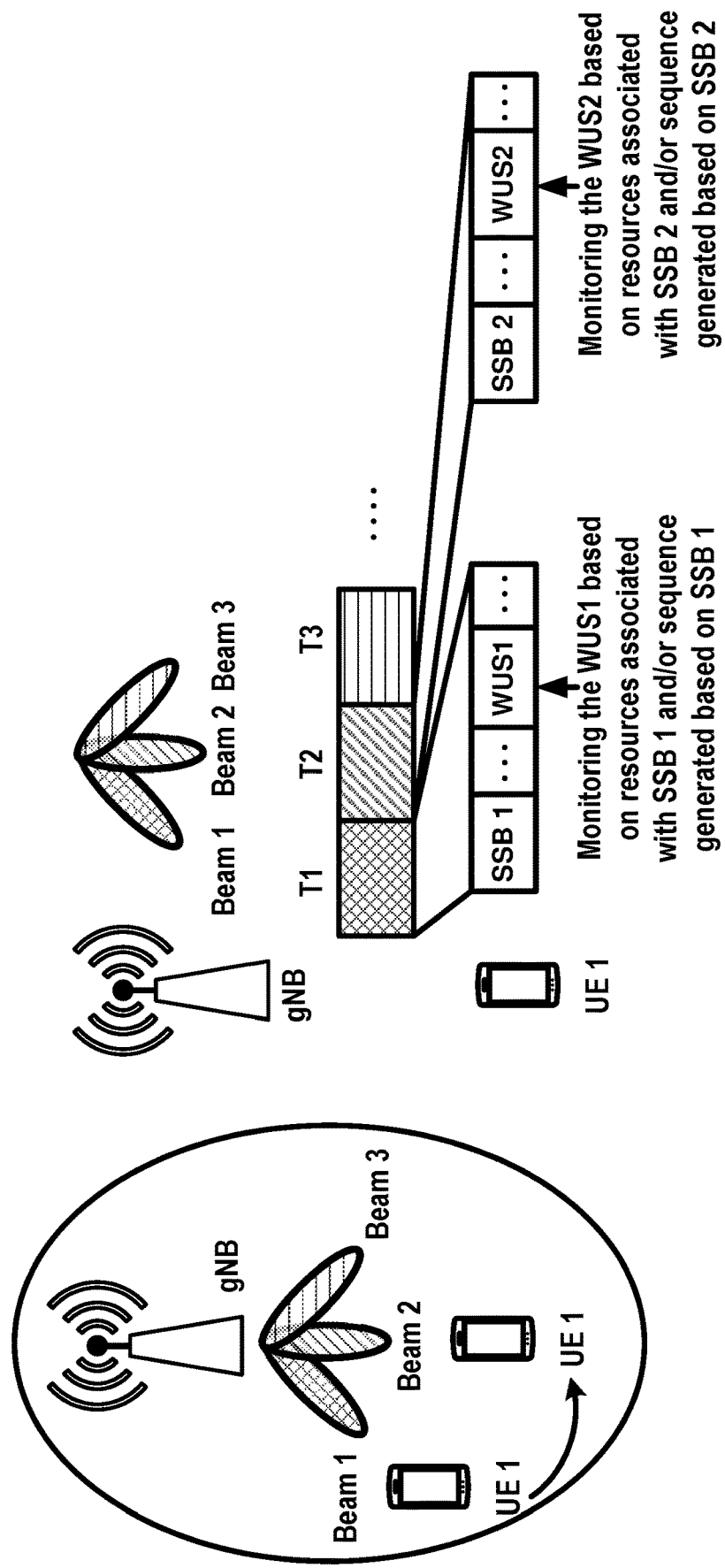
FIG. 40 is an example of a wake-up channel of multiple beams as per an aspect of an embodiment of the present disclosure.

FIG. 40 shows an example of a WUS-based wake-up operation when configured with multiple beams. In an example, a wireless device may move from a first location to a second location, where the first location and the second location may be covered by different beams of a base station. As shown in FIG. 40, a wireless device (e.g., UE 1) may communicate with a base station (e.g., gNB on a first beam (e.g., Beam 1) at a first location. The wireless device may move from the first location to a second location. The wireless device may communicate with the base station via a second beam (e.g., Beam 2) at the second location. The base station may not be aware of the beam the wireless device may receive data and/or control information, when the wireless device is in inactive state. In order to wake up the wireless device, the base station may transmit multiple WUSs (e.g., WUS 1 and WUS 2) on multiple beams (e.g., Beam 1 and Beam 2) identified by multiple RSs (e.g., SSB 1 and SSB 2) to the wireless device, each of the multiple WUSs being transmitted on a respective one of the multiple beams. The base station may transmit the first WUS on first time/frequency resources associated with the first SSB. An association of the first time/frequency resources and the first SSB may be indicated by a RRC message, or predefined. The base station may transmit the first WUS on a first beam (e.g., Beam 1). The base station may generate a second WUS (e.g., WUS 2) with a second signal sequence based on at least one of: a cell ID; a UE-specific RNTI or a group-UE RNTI; a SSB index of a second SSB (e.g., SSB 2). The base station may transmit the second WUS on second time/frequency resources associated with the second SSB. The base station may transmit the second WUS on a second beam (e.g., Beam 2).

As shown in FIG. 40, a wireless device (e.g., UE 1) may determine a first beam (e.g., Beam 1) as a serving beam identified by a first SSB (e.g., SSB 1). The wireless device may determine the first beam as the serving beam based on one or more criteria (e.g., RSRP value, SINR value, and/or CSI value). The wireless device may determine first time/frequency resources based on the first SSB, for detecting the first WUS. The wireless device may determine a first receiving beam based on the first SSB. The wireless device may monitor the first WUS: on the first time/frequency resources; with the first signal sequence; and/or with the first receiving beam. In an example, the wireless device may receive (or successfully detect) the first WUS. In response to receiving the first WUS, the wireless device may monitor PDCCHs. In an example, the wireless device may not receive (or successfully detect) the first WUS. In response to not receiving the first WUS, the wireless device may not monitor PDCCHs.

In an example, when configured with multiple cells, a DCI transmitted via the WUS may comprise a bitmap of wake-up indications for a plurality of activated SCells. The bitmap may be implemented by example embodiments of FIG. 34 and/or FIG. 35.

As shown in FIG. 40, the wireless device (e.g., UE 1) may determine a second beam (e.g., Beam 2) as a serving beam identified by a second SSB (e.g., SSB 2). The wireless device may determine the second beam as the serving beam based on one or more criteria (e.g., RSRP value, SINR value, and/or CSI value). The wireless device may determine second time/frequency resources based on the second SSB, for detecting the second WUS. The wireless device may determine a second receiving beam based on the second SSB. The wireless device may monitor the second WUS: on the second time/frequency resources; with the second signal sequence; and/or with the second receiving beam. In an example, the wireless device may receive (or successfully detect) the second WUS. In response to receiving the second WUS, the wireless device may monitor PDCCHs. In an example, the wireless device may not receive (or successfully detect) the second WUS. In response to not receiving the second WUS, the wireless device may not monitor PDCCHs.

Figure 41:
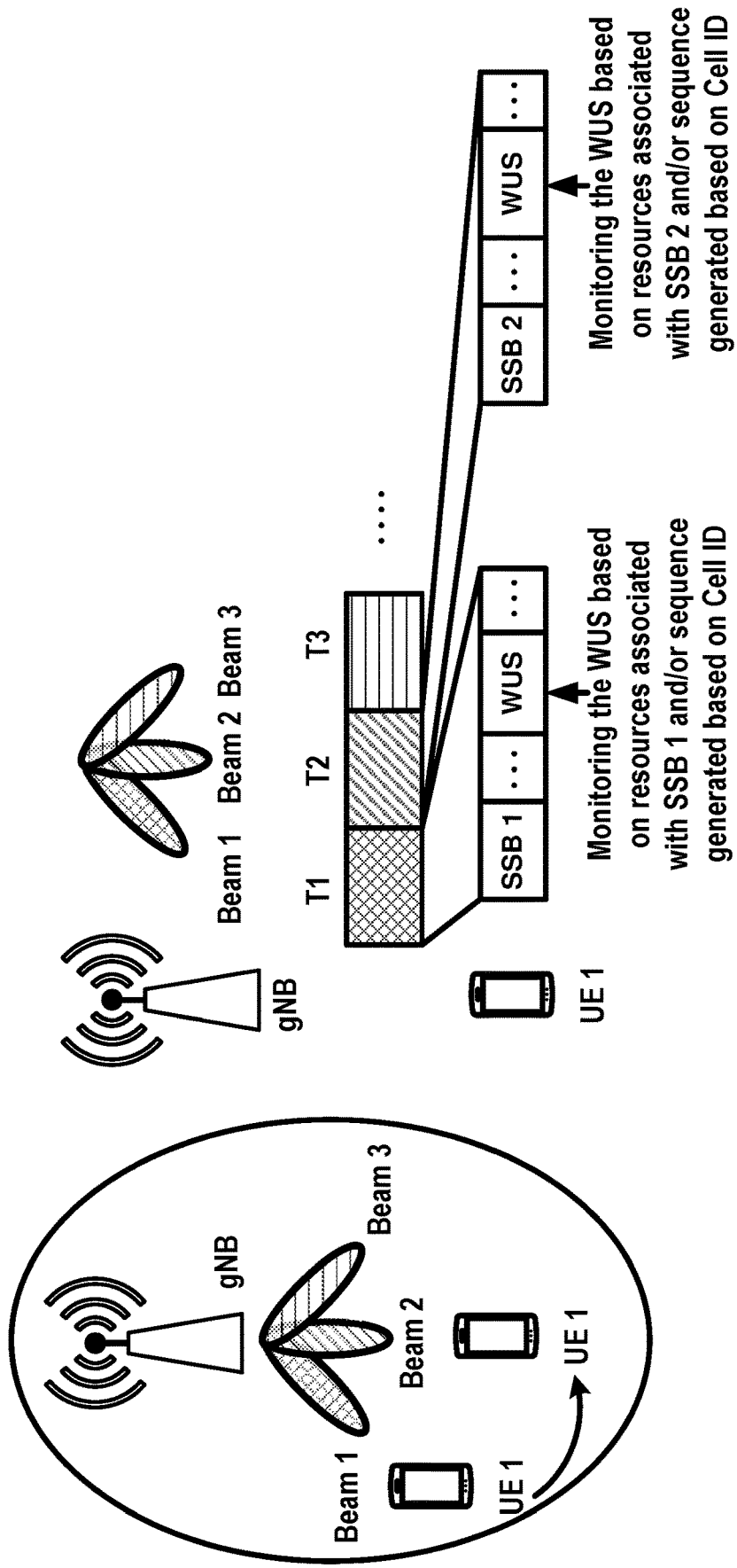
FIG. 41 is an example of a wake-up channel of multiple beams as per an aspect of an embodiment of the present disclosure.

FIG. 41 shows an example of a WUS-based wake-up operation when configured with multiple beams. A wireless device may generate a WUS with a signal sequence based on at least one of: a cell ID; and/or an identifier of the wireless device. The wireless device may monitor the WUS on different beam at different time. As shown in FIG. 41, a base station may transmit a WUS on multiple beams (e.g., Beam 1 and Beam 2) identified by multiple RS s (e.g., SSB 1 and SSB 2), to the wireless device. The base station may generate the WUS with a signal sequence based on at least one of: a cell ID; a UE-specific RNTI or a group-UE RNTI; and/or a parameter indicated by an RRC message. The base station may transmit the WUS on first time/frequency resources associated with the first SSB (e.g., SSB 1). An association of the first time/frequency resources and the first SSB may be configured in an RRC message, or a system information, or be predefined. The base station may transmit the WUS on a first beam (e.g., Beam 1). The base station may transmit the WUS on second time/frequency resources associated with the second SSB (e.g., SSB 2). The base station may transmit the WUS on a second beam (e.g., Beam 2).

In an example, when configured with multiple cells, a DCI transmitted via the WUS may comprise a bitmap of wake-up indications for a plurality of activated SCells. The bitmap may be implemented by example embodiments of FIG. 34 and/or FIG. 35.

As shown in FIG. 41, the wireless device (e.g., UE 1) may determine a first beam (e.g., Beam 1) as a serving beam identified by a first SSB (e.g., SSB 1). The wireless device may determine the first beam as the serving beam based on one or more criteria (e.g., RSRP value, SINR value, and/or CSI value). The wireless device may determine first time/frequency resources based on the first SSB, for detecting the WUS. The wireless device may determine a first receiving beam (e.g., determine spatial domain filter parameters for receiving the WUS) based on the first SSB. The wireless device may monitor the WUS: on the first time/frequency resources; with the signal sequence; and/or with the first receiving beam. In an example, the wireless device may receive (or successfully detect) the WUS. In response to receiving the WUS, the wireless device may monitor PDCCH(s). In an example, the wireless device may not receive (or successfully detect) the WUS. In response to not receiving the WUS, the wireless device may not monitor the PDCCH(s). As shown in FIG. 41, the wireless device may determine a second beam (e.g., Beam 2) as a serving beam identified by a second SSB (e.g., SSB 2). The wireless device may determine the second beam as the serving beam based on one or more criteria (e.g., RSRP value, SINR value, and/or CSI value). The wireless device may determine second time/frequency resources based on the second SSB, for detecting the WUS. The wireless device may determine a second receiving beam based on the second SSB. The wireless device may monitor the WUS: on the second time/frequency resources; with the signal sequence; and/or with the second receiving beam. In an example, the wireless device may receive (or successfully detect) the WUS. In response to receiving the WUS, the wireless device may monitor the PDCCH(s). In an example, the wireless device may not receive (or successfully detect) the WUS. In response to not receiving the WUS, the wireless device may not monitor the PDCCH(s).

Figure 42:
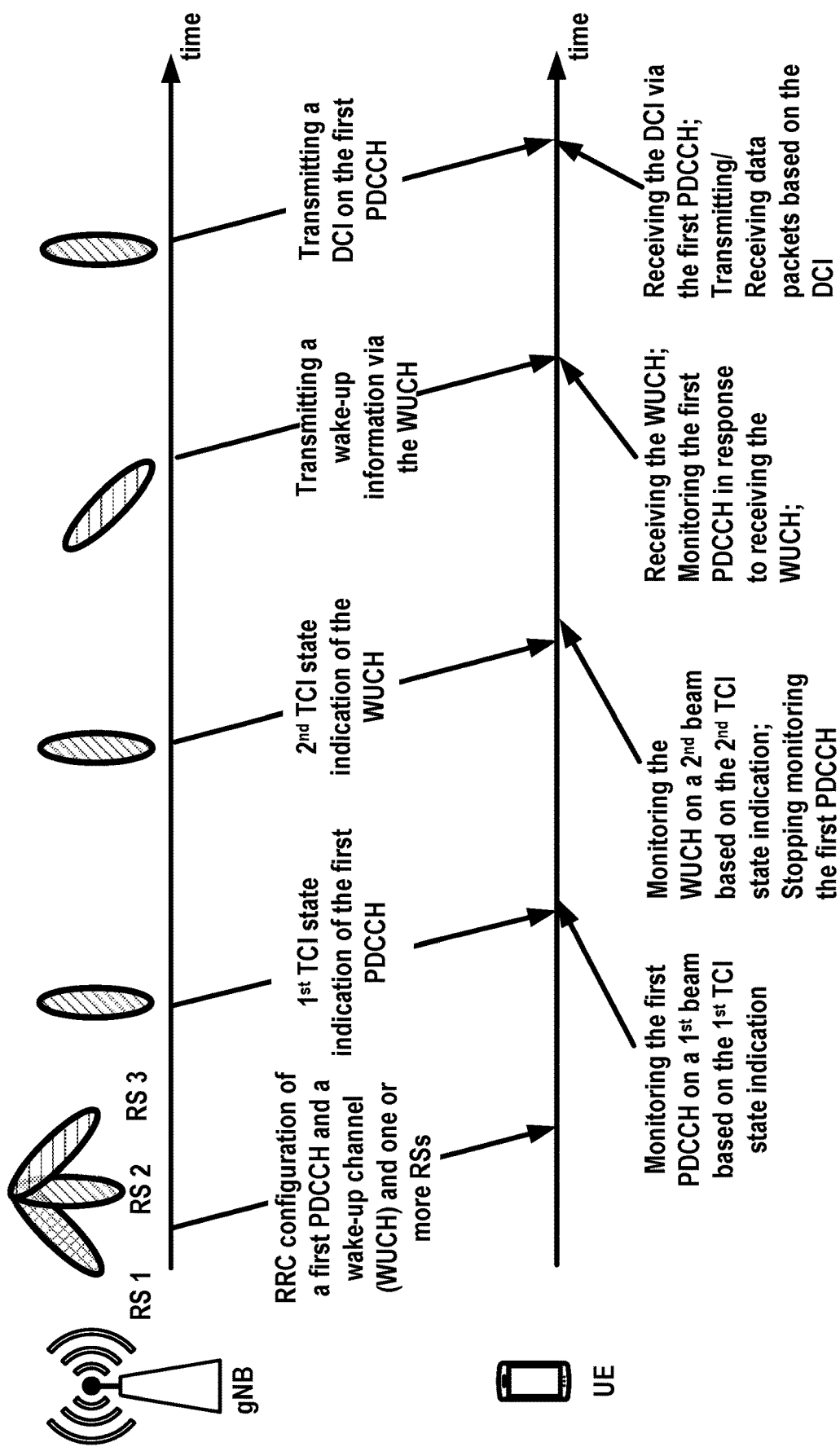
FIG. 42 is an example of a wake-up channel of multiple beams as per an aspect of an embodiment of the present disclosure.

FIG. 42 shows an example of a wake-up channel (e.g., WUCH) based wake-up operation for power saving when configured with multiple beams. A base station (e.g., a gNB) may transmit to a wireless device (e.g., a UE), one or more RRC messages comprising first parameters of a first PDCCH, second parameters of a WUCH, and/or third parameters of a plurality of transmission configuration indication (e.g., TCI) states, on a cell. The first parameters may comprise at least one of: first parameters of one or more control resource sets; second parameters of one or more search spaces; one or more power control parameters.

In an example, a control resource set may be identified by a control resource set id (or identifier). A control resource set may be associated with at least one of: frequency resources; time resources; a control channel element-resource element group (CCE-REG) mapping type; a list of one or more TCI states; and/or a DMRS scrambling identifier.

In an example, a search space may be identified by a search space id (or identifier). A search space may be associated with at least one of: a control resource set; a periodicity of PDCCH monitoring; a duration of consecutive slots that the search space may last in an occasion; a number of PDCCH candidates per aggregation level; and/or a search space type (e.g., common, or UE-specific).

In an example, a TCI state may be identified by a TCI state id. A TCI state may be associated with at least one of: a cell index; a BWP index; a reference signal index/id (e.g., a CSI-RS resource id, or a SSB index); and/or a quasi-collocation (e.g., QCL) type indicator indicating a QCL type (e.g., type A, type B, type C, or type D).

In an example, the second parameters of the WUCH may comprise at least one of: at least a control resource set id; at least a search space id. In an example, the second parameters of the WUCH may be different from the first parameters of the first PDCCH. In an example, the WUCH may be transmitted on a same control resource set as the first PDCCH is transmitted. The WUCH may be transmitted on a same search space same as the first PDCCH is transmitted. In an example, a dedicated control resource set for monitoring the WUCH may be configured in the one or more RRC messages. In an example, a dedicated search space for monitoring the WUCH may be configured in the one or more RRC messages. The one or more RRC messages may further comprise parameters of a plurality of reference signals (e.g., RS 1, 2, and 3). The plurality of reference signals may comprise at least one of: first plurality of SS blocks; second plurality of CSI-RSs. The parameters of a CSI-RS (e.g., non-zero-power CSI-RS) may comprise at least one of: a CSI RS resource id; time/frequency mapping indication; power control parameters; a scrambling id; a periodicity of CSI-RS transmission; and/or a TCI state id.

As shown in FIG. 42, the base station may transmit a first TCI state indication of the first PDCCH to the wireless device. The first TCI state indication may be contained in a MAC CE identified by a MAC PDU subheader with a first LCID value (e.g., "110100" as shown in FIG. 20). The MAC CE for the first TCI state indication may comprise at least one of: a cell id indicating an identity of a cell for which the MAC CE applies; a BWP ID containing a BWP identifier of a downlink BWP for which the MAC CE applies; a control resource set id indicating a control resource set for which the TCI state is indicated; a TCI state id indicating a TCI state applicable to the control resource set indicated by the control resource set id. In response to receiving the one or more RRC messages, the wireless device may monitor PDCCHs based on the first parameters (e.g., control resource sets, search spaces). In response to receiving the MAC CE, the wireless device may monitor at least one PDCCH: on a control resource set indicated by the MAC CE; with a receiving beam determined based on a TCI state by the MAC CE; and/or on a BWP of a cell indicated by the MAC CE.

As shown in FIG. 42, the base station may transmit a second TCI state indication of the WUCH to the wireless device. The second TCI state indication may be contained in the MAC CE identified by the MAC PDU subheader with the first LCID value (e.g., "110100" as shown in FIG. 20), as same as the MAC CE for the TCI state indication of the first PDCCH. The second TCI state indication may be contained in a second MAC CE identified by a MAC PDU subheader with a second LCID value, different from the MAC CE for the TCI state indication of the first PDCCH. The MAC CE for the second TCI state indication may comprise at least one of: a cell id; a BWP ID; a control resource set id; a TCI state id; and/or an activation/deactivation indicator. In response to receiving the second TCI state indication, the wireless device may stop monitoring the first PDCCH on at least one of the one or more control resource sets and/or at least one of the one or more search spaces. In response to receiving the second TCI state indication, the wireless device may monitor the WUCH: on a control resource set identified by the control resource set id in the second MAC CE; on a search space associated with the control resource set; with a receiving beam determined based on a TCI state identified by the TCI state id. In response to receiving the second MAC CE, the wireless device may monitor the WUCH, if the activation/deactivation indicator in the second MAC CE indicates an activation of the TCI state. In response to receiving the second MAC CE, the wireless device may stop monitoring the WUCH, if the activation/deactivation indicator in the second MAC CE indicates a deactivation of the TCI state.

As shown in FIG. 42, the wireless device may receive a wake-up information (e.g., a DCI with a DCI format) via the WUCH during the monitoring the WUCH. In response to receiving the wake-up information, the wireless device may monitor PDCCHs based on the wake-up information. The wake-up information may comprise a plurality of wake-up indicators. The wake-up information may be contained in a DCI addressed to a group of wireless devices (e.g., by a group RNTI). The DCI addressed to the group of wireless devices may be identified by a DCI format and/or a group RNTI. The group RNTI may be indicated in the one or more RRC messages. The DCI format for the wake-up operation may be different from one or more DCI formats (e.g., DCI format 0-0/0-1/1-0/1-1/2-0/2-1/2-2/2-3) in existing NR technologies. The group RNTI for the wake-up operation may be different from RNTIs (e.g., C-RNTI, SFI-RNTI, INT-RNTI, TPC-PUCCH-RNTI, TPC-PUSCH-RNTI, or TPC-SRS-RNTI). Each of the plurality of wake-up indicators may correspond to a respective one wireless device of the group of wireless devices. One or more RRC messages may comprise parameters indicating a first wake-up indicator of the plurality of wake-up indicators being associated with (or corresponds to) the wireless device. In an example, the first wake-up indicator being set to a first value (e.g., 1) may indicate that the wireless device may monitor the PDCCHs. In response to the first wake-up indicator associated with the wireless device indicating monitoring the PDCCHs, the wireless device may monitor the PDCCHs on at least one cell. The wireless device may transmit/receive data packets based on a DCI received via the PDCCHs. In an example, the first wake-up indicator being set to a second value (e.g., 0) may indicate that the wireless device may not monitor the PDCCHs. In an example, in response to the first wake-up indicator associated with the wireless device indicating not monitoring the PDCCHs, the wireless device may not monitor the PDCCHs on at least one cell.

Figure 43:
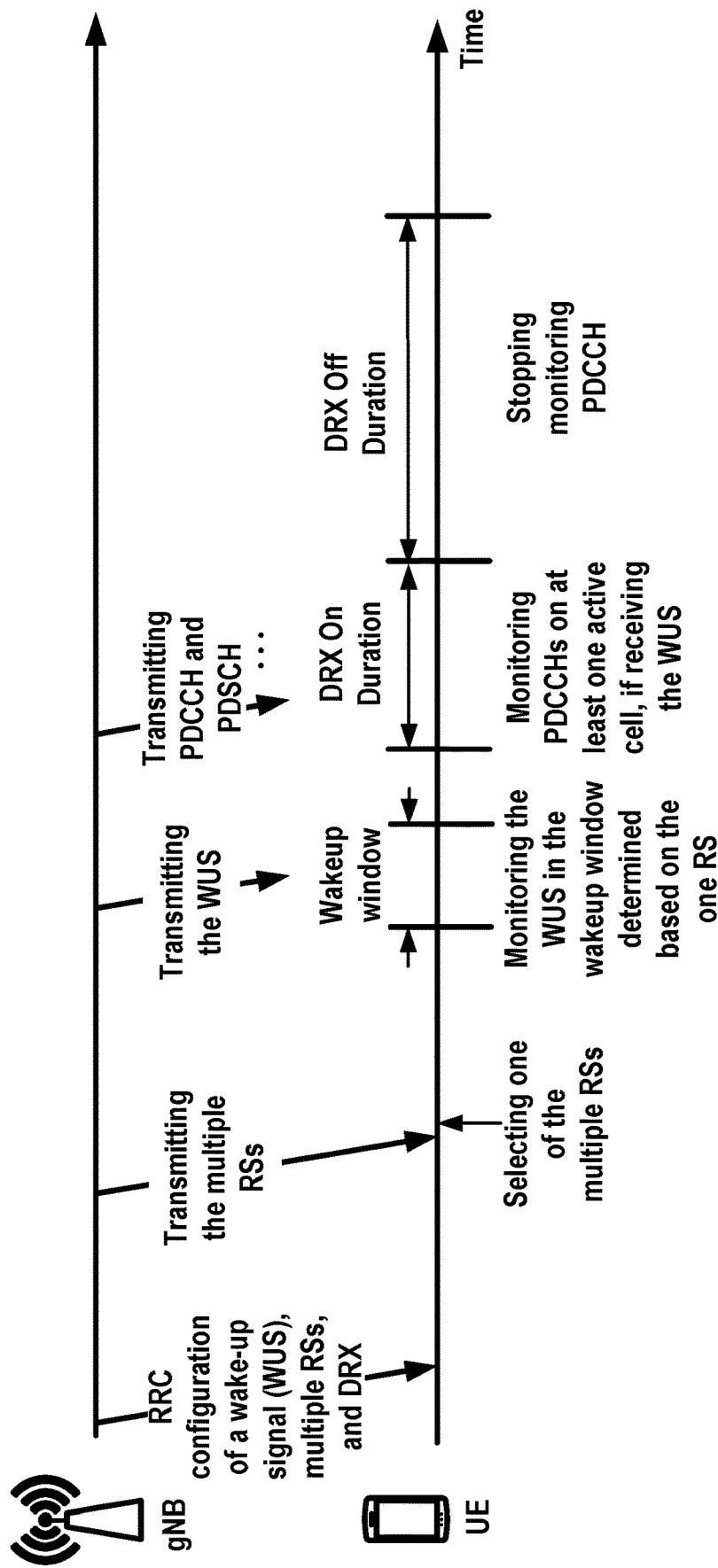
FIG. 43 is an example of a wake-up channel of multiple beams as per an aspect of an embodiment of the present disclosure.

FIG. 43 shows an example of a WUS-based wake-up operation and a DRX operation when configured with multiple beams. A base station (e.g., gNB) may transmit to a wireless device (e.g., UE), one or more RRC messages comprising first configuration parameters of a WUS, second configuration parameters of a DRX operation, and third configuration parameters of a plurality of RSs of a cell. The first configuration parameters may comprise at least one of: a signal format (e.g., numerology); at least one RS index; sequence generation parameters (e.g., a cell id, a virtual cell id, SS block index, a BWP ID, a CSI RS ID, a DMRS port number, an orthogonal code index, a UE-specific RNTI, or a group-UE RNTI) for generating the WUS. The second configuration parameters may comprise at least one of: a first value of a DRX cycle; a second value of a DRX on duration of the DRX cycle; one or more DRX timers. The plurality of reference signals may comprise at least one of: first plurality of SS blocks; second plurality of CSI-RSs. The third configuration parameters of a CSI-RS (e.g., non-zero-power CSI-RS) may comprise at least one of: a CSI RS resource id; time/frequency mapping indication; power control parameters; a scrambling id; a periodicity of CSI-RS transmission; and/or a TCI state id.

As shown in FIG. 43, the wireless device (e.g., UE) may determine that a first beam (identified by a first reference signal) among multiple beams (identified by the plurality of reference signals) is a serving beam (or a reference beam). In response to determining the first beam being the serving beam, the wireless device may determine a receiving beam corresponding the serving beam for detecting the WUS. The wireless device may determine that the first reference signal among the plurality of reference signals is a serving reference signal (or a best reference signal), based on one or more criteria. The one or more criteria may be based on least one of: a L1-RSRP value; a L3-RSRP value; a SINR value; a CQI value. In response to determining the first reference signal from the plurality of reference signals, the wireless device may: determine the radio resource (e.g., time/frequency) in a time window (e.g., wake-up window) associated with the first reference signal; determine a receiving beam based on the first reference signal; and/or generate the WUS with a signal sequence based on at least one of: a cell ID; a RS index of the first reference signal; a UE-specific RNTI or a group RNTI. The wireless device may monitor, in the radio resource with the receiving beam, during the wake-up window, the WUS with the signal sequence. In an example, the wireless device may receive (or successfully detect) the WUS in the radio resource. The wireless device may determine that a MAC entity of the wireless device is in a DRX active time (e.g., DRX On duration) based on the second configuration parameters of the DRX operation. In response to detecting the WUS and determining the MAC entity being in the DRX active time, the wireless device may stop monitoring, at least during the DRX active time, the WUS on the cell. In response to detecting the WUS and determining the MAC entity being in the DRX active time, the wireless device may monitor, at least during the DRX active time, at least one PDCCH on at least one active cell comprising the cell. In an example, the wireless device may determine that the MAC entity of the wireless device is not in a DRX active time (e.g., DRX off duration), the wireless device may, at least during the DRX off duration, stop monitoring the at least one PDCCH on the at least one active cell in response to being in the DRX off duration. In an example, the wireless device may not receive the WUS in the radio resource. The wireless device may determine that a MAC entity of the wireless device is in a DRX active time (e.g., DRX On duration) based on the second configuration parameters of the DRX operation. In response to not receiving the WUS and determining the MAC entity being in the DRX active time, the wireless device may, at least during the DRX active time, skip monitoring the WUS on the cell. In response to not receiving the WUS and determining the MAC entity being in the DRX active time, the wireless device may, at least during the DRX active time, skip monitoring the at least one PDCCH on the at least one active cell.

In an example, when configured with multiple cells, a DCI transmitted via the WUS may comprise a bitmap of wake-up indications for a plurality of activated SCells. The bitmap may be implemented by example embodiments of FIG. 34 and/or FIG. 35.

Figure 44:
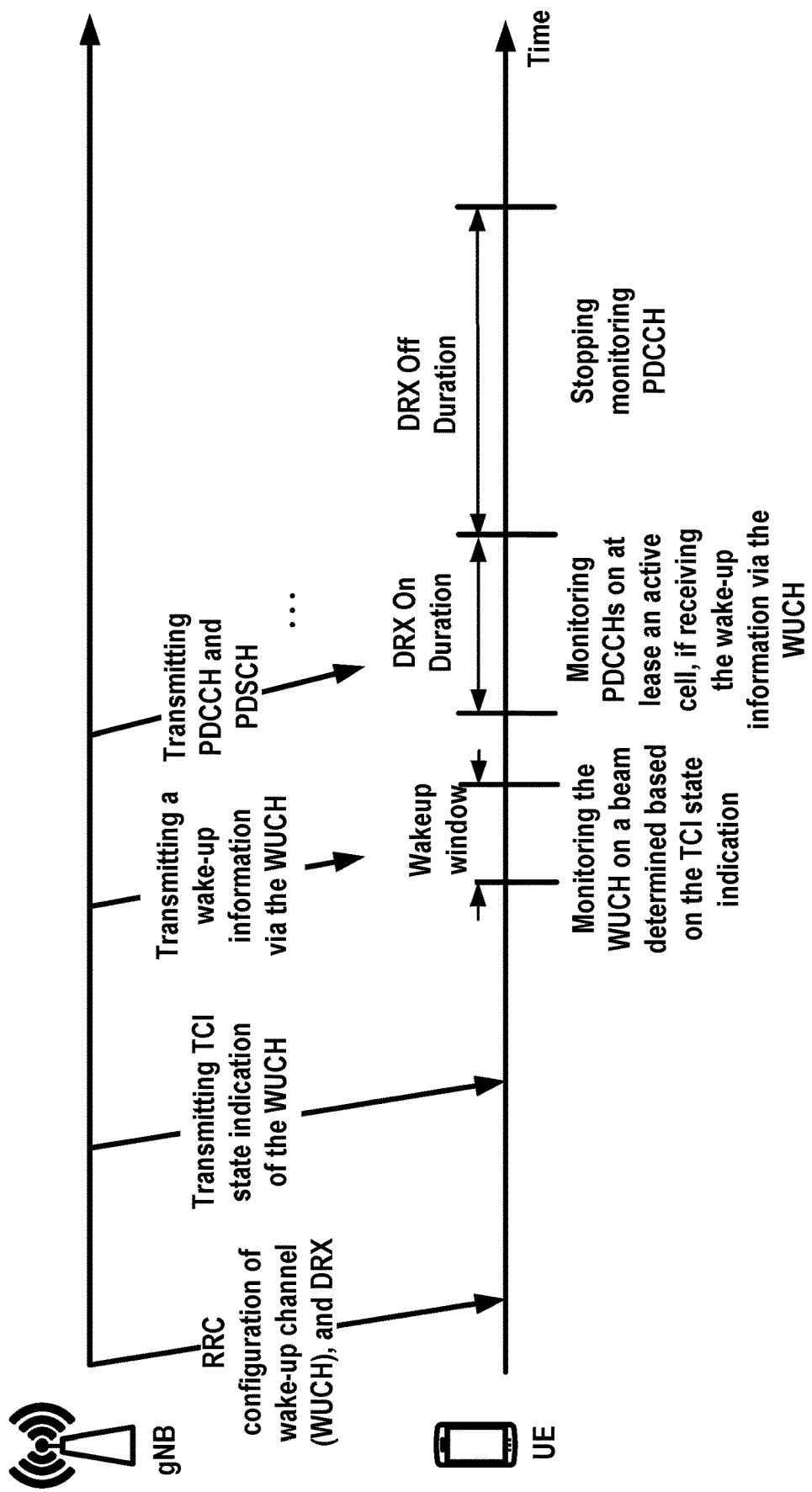
FIG. 44 is an example of a wake-up channel of multiple beams as per an aspect of an embodiment of the present disclosure.

FIG. 44 shows an example of a WUCH-based wake-up operation and a DRX operation when multiple beams are configured. A base station (e.g., gNB) may transmit to a wireless device (e.g., UE), one or more RRC messages comprising first parameters of a WUCH, and/or second parameters of a DRX operation, on a cell. The first parameters may indicate at least one of: one or more control resource sets; one or more search spaces; one or more power control parameters. The second configuration parameters may comprise at least one of: a first value of a DRX cycle; a second value of a DRX on duration of the DRX cycle; one or more DRX timers.

As shown in FIG. 44, the wireless device may receive a TCI state indication of the WUCH. The TCI state indication may be contained in a MAC CE identified by a MAC PDU subheader with a LCID value. The MAC CE for the TCI state indication may comprise at least one of: a cell id; a BWP ID; a control resource set id; a TCI state id; and/or an activation/deactivation indicator. In response to receiving the TCI state indication, the wireless device may monitor the WUCH in a wakeup window (e.g., Wakeup window), based on the MAC CE. In response to receiving the TCI state indication, the wireless device may monitor the WUCH: on a control resource set identified by the control resource set id in the MAC CE; on a search space associated with the control resource set; with a receiving beam determined based on a TCI state identified by the TCI state id. In response to receiving the MAC CE of the TCI state indication, the wireless device may monitor the WUCH, if the activation/deactivation indicator in the MAC CE indicates an activation of the TCI state. In response to receiving the MAC CE, the wireless device may stop monitoring the WUCH, if the activation/deactivation indicator in the MAC CE indicates a deactivation of the TCI state.

As shown in FIG. 44, the wireless device may receive a wake-up information (e.g., a DCI with a DCI format) via the WUCH during the monitoring the WUCH.

In an example, when configured with multiple cells, a DCI transmitted via the WUS may comprise a bitmap of wake-up indications for a plurality of activated SCells. The bitmap may be implemented by example embodiments of FIG. 34 and/or FIG. 35.

In an example, in response to receiving the wake-up information, the wireless device may monitor PDCCHs based on the wake-up information. The wake-up information may comprise a plurality of wake-up indicators. The wake-up information may be contained in a DCI addressed to a group of wireless devices (e.g., by a group RNTI). The DCI addressed to the group of wireless devices may be identified by a DCI format and/or a group RNTI. The group RNTI may be indicated in the one or more RRC messages. In an example, each of the plurality of wake-up indicators may correspond to a respective one wireless device of the group of wireless devices. One or more RRC messages may comprise parameters indicating a first wake-up indicator of the plurality of wake-up indicators being associated with (or corresponds to) the wireless device. In an example, the first wake-up indicator being set to a first value (e.g., 1) may indicate that the wireless device may monitor the PDCCHs. The first wake-up indicator being set to a second value (e.g., 0) may indicate that the wireless device may not monitor the PDCCHs. The wireless device may determine a MAC entity of the wireless device being in a DRX active time (e.g., DRX On duration) based on the second configuration parameters of the DRX operation. The wireless device may monitor, at least during the DRX active time, at least one PDCCH on at least one active cell comprising the cell, in response to: receiving the wake-up information; the first wake-up indicator associated with the wireless device indicating monitoring the PDCCHs; and/or determining the MAC entity being in the DRX active time. The wireless device may not monitor, at least during the DRX active time, the at least one PDCCH on the at least one active cell comprising the cell, in response to: receiving the wake-up information; the first wake-up indicator associated with the wireless device indicating not monitoring the PDCCHs; and/or determining the MAC entity being in the DRX active time.

Figure 45:
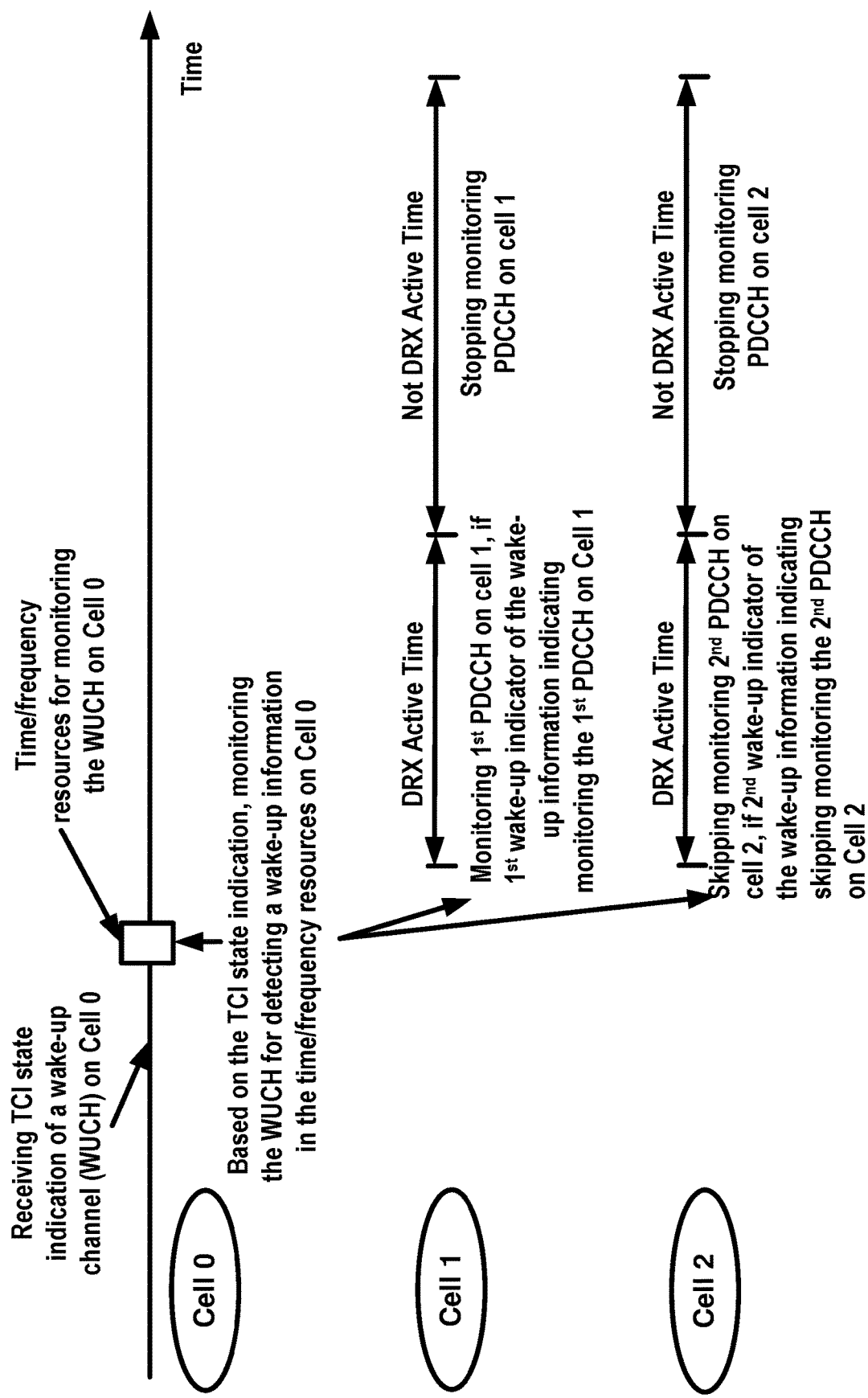
FIG. 45 is an example of a wake-up channel of multiple beams as per an aspect of an embodiment of the present disclosure.

FIG. 45 shows an example of a per-cell DRX operation and a WUCH-based wake-up operation when multiple beams are configured. A base station (e.g. gNB) may transmit to a wireless device (e.g., UE), one or more RRC messages comprising first parameters of a WUCH, and/or second parameters of a DRX operation of a plurality of cells. The first parameters may indicate at least one of: one or more control resource sets; one or more search spaces; one or more power control parameters. The second configuration parameters may comprise at least one of: a first value of a DRX cycle; a second value of a DRX on duration of the DRX cycle; one or more DRX timers.

As shown in FIG. 45, the wireless device may receive on a first cell of the plurality of cells (e.g., Cell 0), a TCI state indication of the WUCH. The TCI state indication may be contained in a MAC CE identified by a MAC PDU subheader with a LCID value. The MAC CE for the TCI state indication may comprise at least one of: a cell id; a BWP ID; a control resource set id; a TCI state id; and/or an activation/ deactivation indicator. In response to receiving the TCI state indication, the wireless device may monitor the WUCH of the first cell: on a control resource set identified by the control resource set id in the MAC CE; on a search space associated with the control resource set; with a receiving beam determined based on a TCI state identified by the TCI state id. In response to receiving the MAC CE of the TCI state indication, the wireless device may monitor the WUCH, if the activation/deactivation indicator in the MAC CE indicates an activation of the TCI state. In response to receiving the MAC CE, the wireless device may stop monitoring the WUCH, if the activation/deactivation indicator in the MAC CE indicates a deactivation of the TCI state.

As shown in FIG. 45, the wireless device may receive a wake-up information (e.g., a DCI with a DCI format) via the WUCH during the monitoring the WUCH. In response to receiving the wake-up information, the wireless device may monitor PDCCHs based on the wake-up information. The wake-up information may comprise a plurality of wake-up indicators. In an example, each of the plurality of wake-up indicators may correspond to a respective one cell of the plurality of cells. In an example, each of the plurality of wake-up indicators may correspond to a respective one cell of one or more active cells of the plurality of cells. One or more RRC messages may comprise parameters indicating a first wake-up indicator of the plurality of wake-up indicator is associated with (or corresponds to) a first cell of the plurality of cells. In an example, the first wake-up indicator being set to a first value (e.g., 1) may indicate that the wireless device may monitor the PDCCHs on the first cell. The first wake-up indicator being set to a second value (e.g., 0) may indicate that the wireless device may not monitor the PDCCHs on the first cell.

As shown in FIG. 45, the wireless device may determine a MAC entity of the wireless device being in a DRX active time (e.g., DRX Active Time) based on the second configuration parameters of the DRX operation. The wireless device may monitor, at least during the DRX active time, a first PDCCH ($1^{st}$ PDCCH) on a first cell (e.g., Cell 1), in response to: receiving the wake-up information via the WUCH; a first wake-up indicator (e.g., $1^{st}$ wake-up indicator) associated with the first cell indicating monitoring the first PDCCH on the first cell; and determining the MAC entity being in the DRX active time. The wireless device may not monitor, at least during the DRX active time, the first PDCCH on the first cell, in response to: receiving the wake-up information via the WUCH; the first wake-up indicator indicating not monitoring the first PDCCH on the first cell; and determining the MAC entity being in the DRX active time.

As shown in FIG. 45, the wireless device may monitor, at least during the DRX active time, a second PDCCH ($2^{nd}$ PDCCH) on a second cell (e.g., Cell 2), in response to: receiving the wake-up information via the WUCH; a second wake-up indicator (e.g., $2^{nd}$ wake-up indicator) associated with the second cell indicating monitoring the second PDCCH on the second cell; and determining the MAC entity being in the DRX active time. The wireless device may not monitor, at least during the DRX active time, the second PDCCH on the second cell, in response to: receiving the wake-up information via the WUCH; the second wake-up indicator indicating not monitoring the second PDCCH on the second cell; and determining the MAC entity being in the DRX active time.

In an example, the wireless device may not receive the wake-up information via the WUCH during the monitoring the WUCH. The wireless device may determine a MAC entity of the wireless device being in a DRX active time based on the second configuration parameters of the DRX operation. The wireless device may skip monitoring the first PDCCH of the first cell and the second PDCCH of the second cell in response to not receiving the wake-up information and determining the MAC entity being in the DRX active time.

As shown in FIG. 45, the wireless device may determine that a MAC entity of the wireless device is not in a DRX active time (e.g., Not DRX Active Time) based on the second configuration parameters of the DRX operation. The wireless device may skip monitoring the first PDCCH of the first cell and the second PDCCH of the second cell in response to determining the MAC entity not being in the DRX active time.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 46:
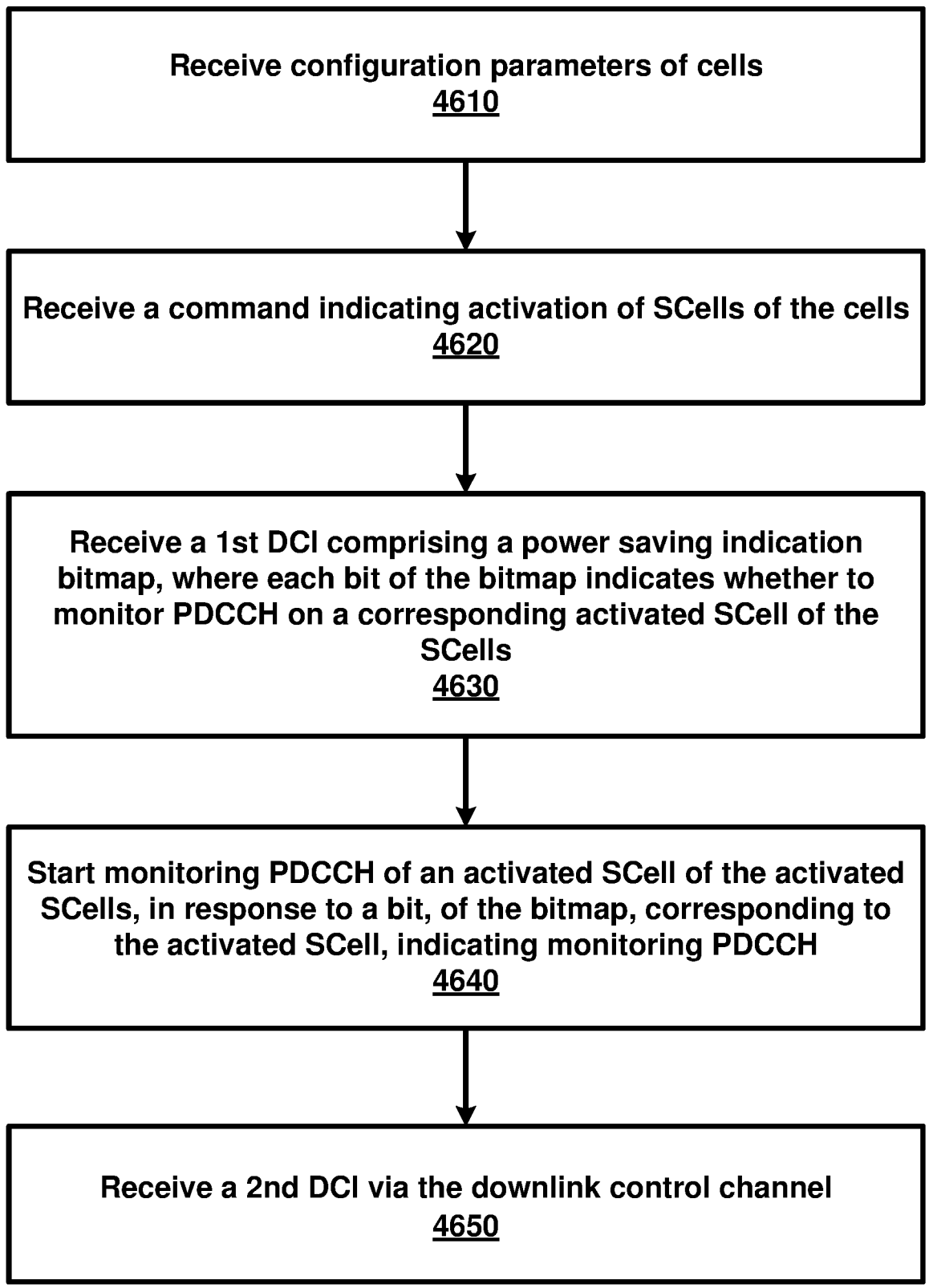
FIG. 46 is a flowchart of an aspect of an example embodiment of the present disclosure.

FIG. 46 is a flow diagram as per an aspect of an example embodiment of the present disclosure. At 4610, a wireless device may receive, from a base station, configuration parameters of a plurality of cells. At 4620, the wireless device may receive a command indicating activation of a plurality of SCells of the plurality of cells. At 4630, the wireless device receives a first DCI comprising a power saving indication bitmap. Each bit of the power saving indication bitmap may indicate whether the wireless device monitors PDCCH on a corresponding activated SCell of the plurality of activated SCells. At 4640, the wireless device may start monitoring PDCCH of an activated SCell of the plurality of activated SCells, in response to a bit, of the power saving indication bitmap, corresponding to the activated SCell, indicating monitoring PDCCH. At 2650, the wireless device may receive a second DCI via the PDCCH.

According to an example embodiment, the wireless device may receive downlink transport block based on the second DCI indicating a downlink assignment. The wireless device may transmit uplink transport block based on the second DCI indicating an uplink grant.

According to an example embodiment, the wireless device may receive the first DCI via a primary cell or the plurality of cells. The configuration parameters may indicate that the activated SCell is self-scheduled. The command may comprise at least one of: an RRC message, a SCell activation/deactivation MAC CE, and/or a DCI.

According to an example embodiment, the wireless device may activate a bandwidth part of the activated SCell before the wireless receives the first DCI. The first DCI may not indicate an active bandwidth part switching on the activated SCell.

According to an example embodiment, the plurality of cells may comprise: a primary cell, the plurality of activated SCells, and a second plurality of deactivated SCells.

According to an example embodiment, a first bit of the power saving indication bitmap may correspond to a first activated SCell with a lowest cell index among cell indexes of the plurality of activated SCells. The first bit may indicate whether the wireless device monitors a first PDCCH on the first activated SCell. The power saving indication bitmap may not comprise one or more bits corresponding to the second plurality of deactivated SCells.

According to an example embodiment, the wireless device may skip monitoring the PDCCH on an active BWP of the activated SCell and may maintain an active state of the active BWP, in response to not receiving the first DCI.

According to an example embodiment, the starting monitoring the PDCCH may comprise monitoring the PDCCH discontinuously in response to a DRX being configured on the activated SCell.

According to an example embodiment, the power saving indication bitmap may comprise a bit indicating whether the wireless device monitors a second PDCCH on the primary cell.

According to an example embodiment, the wireless device may maintain an active state of an active BWP of the activated SCell and may not monitor the PDCCH on the active BWP of the active SCell, in response to the bit, of the power saving indication bitmap, corresponding to the activated SCell, indicating not monitoring the PDCCH on the activated SCell. The maintaining the active state of the active BWP may comprise not switching the active BWP. The maintaining the active state of the active BWP may comprise performing CSI measurement and/or report on the active BWP of the activated SCell.

According to an example embodiment, the wireless device receives the first DCI via a power saving channel on the primary cell. The wireless device does not monitoring a power saving channel on the plurality of activated SCells comprising the activated SCell.

According to an example embodiment, the configuration parameters may comprise one or more configuration parameters of the power saving channel. The one or more configuration parameters may comprise a search space for monitoring the power saving channel. The one or more configuration parameters may comprise a control resource set for monitoring the power saving channel. The one or more configuration parameters may comprise a radio network temporary identifier for monitoring the power saving channel. The one or more configuration parameters may comprise one or more resource configuration parameters of reference signals for monitoring the power saving channel. The reference signals comprise: SSBs, CSI-RSs, and/or a combination thereof.

According to an example embodiment, the wireless device may monitor the power saving channel, for receiving the first DCI, based on the one or more resource configuration parameters of the reference signals. The monitoring the power saving channel may comprise monitoring the power saving channel with spatial domain parameters determined based on reception of the reference signals. The spatial domain parameters may be used for reception of the reference signals.

According to an example embodiment, a wireless device may receive, from a base station, configuration parameters of a plurality of cells. The wireless device may receive a command indicating activation of a plurality of SCells of the plurality of cells. The wireless device may receive a first DCI comprising a power saving indication bitmap. Each bit of the power saving indication bitmap may indicate whether the wireless device monitors PDCCH on a BWP of a corresponding activated SCell of the plurality of activated SCells and the BWP is in an active state before receiving the first DCI. The wireless device may start monitoring PDCCH of an active BWP of an activated SCell of the plurality of activated SCells, in response to a bit, of the power saving indication bitmap, corresponding to the activated SCell, indicating monitoring PDCCH. The wireless device may receive a second DCI via the PDCCH. The wireless device may receive downlink transport block based on the second DCI indicating a downlink assignment. The wireless device may transmit uplink transport block based on the second DCI indicating an uplink grant.

Figure 47:
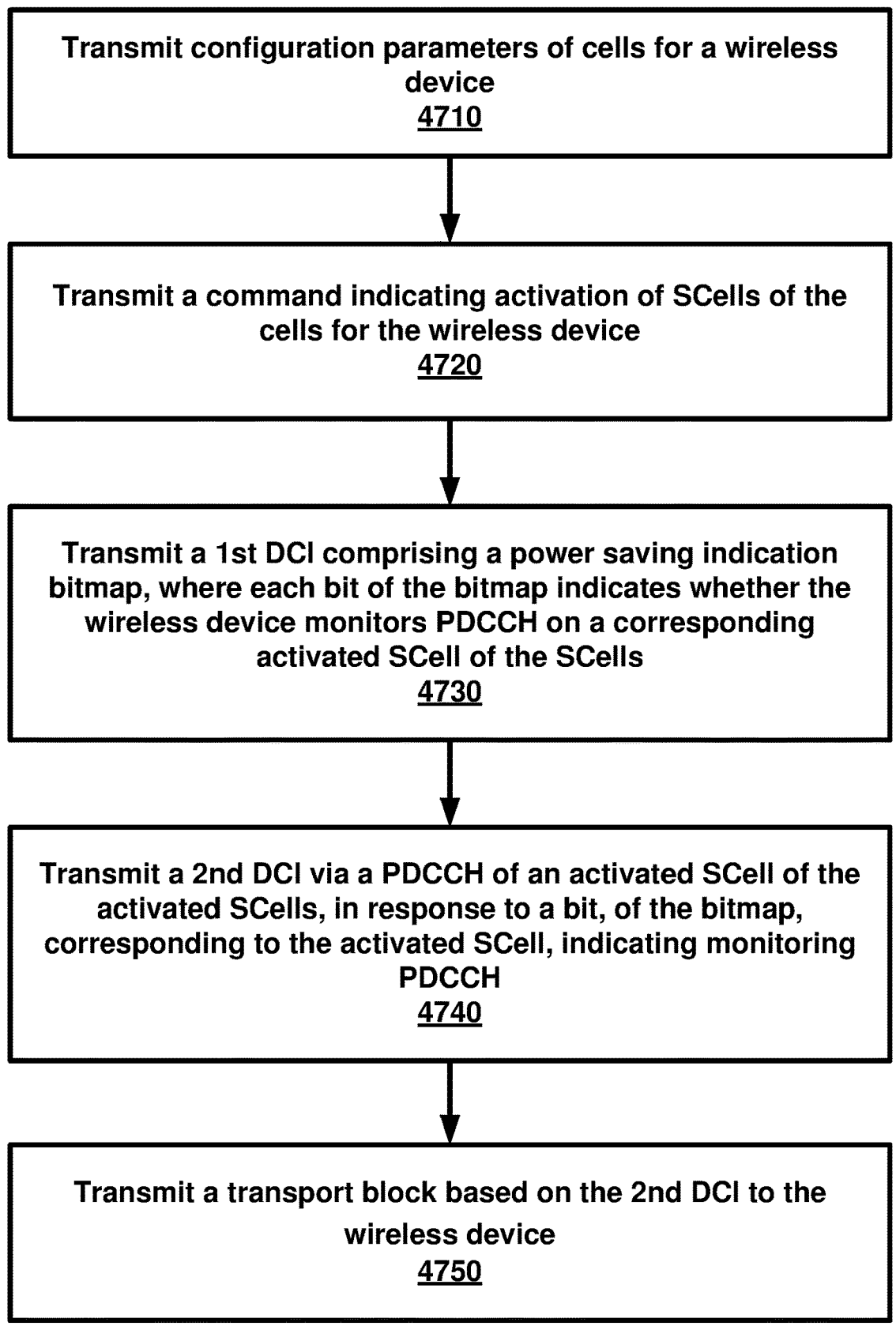
FIG. 47 is a flowchart of an aspect of an example embodiment of the present disclosure.

FIG. 47 is a flow diagram as per an aspect of an example embodiment of the present disclosure. At 4710, a base station may transmit one or more RRC messages comprising configuration parameters of a plurality of cells for a wireless device. At 4720, the base station may transmit one or more commands indicating activation of a plurality of SCells of the plurality of cells for the wireless device. At 4730, the base station may transmit a first DCI comprising a power saving indication bitmap. Each bit of the power saving indication bitmap may indicate whether the wireless device monitors PDCCH on a corresponding activated SCell of the plurality of SCells. At 4740, the base station may transmit a second DCI via a PDCCH of an activated SCell of the plurality of SCells, in response to a bit, of the power saving indication bitmap, corresponding to the activated SCell, indicating monitoring the PDCCH. At 4750, the base station may transmit a transport block based on the second DCI. The base station may receive a transport block based on the second DCI indicating an uplink grant for the wireless device.

Figure 48:
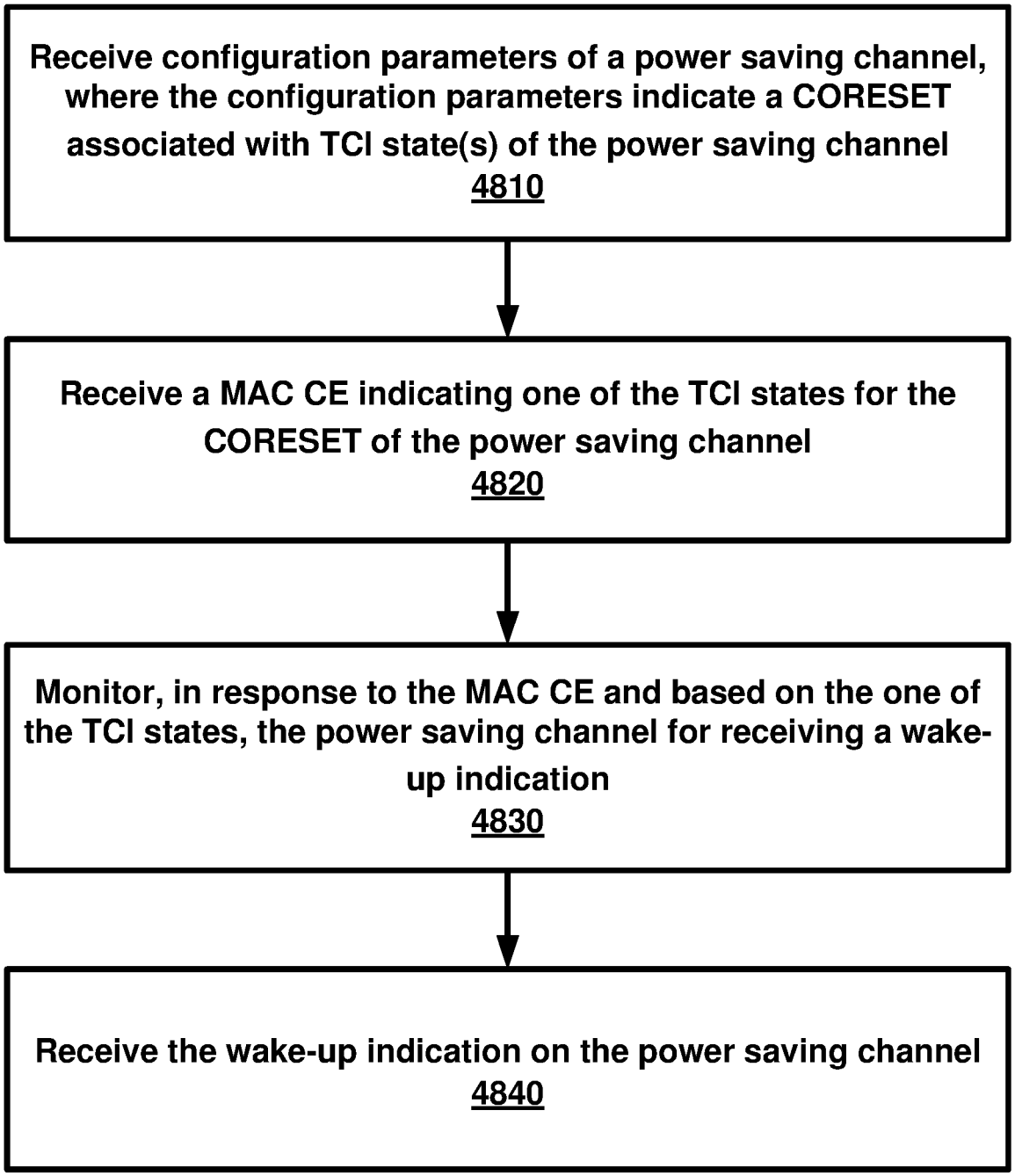
FIG. 48 is a flowchart of an aspect of an example embodiment of the present disclosure.

FIG. 48 is a flow diagram as per an aspect of an example embodiment of the present disclosure. At 4810, a wireless device may receive configuration parameters of a power saving channel. The configuration parameters may indicate a CORESET associated with one or more TCI states of the power saving channel. At 4820, the wireless device may receive a command (e.g., a MAC CE) indicating activation of one of the TCI states of the CORESET for the power saving channel. At 4830, the wireless device may start monitoring, in response to receiving the command and based on the activated one of the TCI states, the power saving channel for receiving a wake-up indication. At 4840, the wireless device may receive the wake-up indication via the power saving channel. According to an example embodiment, the wireless device may not monitor the power saving channel before receiving the command indicating activation of one of the TCI states for the power saving channel.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like.

There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
  receiving, by a wireless device, one or more radio resource control messages comprising configuration parameters of a plurality of secondary cells (SCells);
  receiving an SCell activation medium access control control element (MAC CE) indicating activation of one or more SCells of the plurality of SCells;
  monitoring a first downlink control channel of a first downlink bandwidth part of a first SCell of the one or more SCells;
  receiving a first downlink control information (DCI) comprising a power saving indication bitmap, wherein:
    each bit of the power saving indication bitmap corresponds to an SCell, of the plurality of SCells, in an ascending order of SCell indexes; and
    a value of each bit indicates whether the wireless device monitors a downlink control channel on a downlink bandwidth part of the corresponding SCell; and
  stopping monitoring the first downlink control channel of the first downlink bandwidth part of the first SCell, with the first SCell maintained as activated, in response to:
    the SCell activation MAC CE indicating activation of the first SCell; and
    a first bit, of the power saving indication bitmap received in the first DCI, corresponding to the first SCell and indicating not to monitor the first downlink control channel.

2. The method of claim 1, wherein the first DCI is received via a primary cell.

3. The method of claim 2, wherein the first DCI is received via a power saving channel on the primary cell.

4. The method of claim 3, wherein the configuration parameters indicate one or more configuration parameters of the power saving channel, the one or more configuration parameters comprising:
  a search space for monitoring the power saving channel;
  a control resource set for monitoring the power saving channel; and
  a radio network temporary identifier for monitoring the power saving channel.

5. The method of claim 4, wherein the one or more configuration parameters further comprise one or more resource configuration parameters of reference signals for monitoring the power saving channel.

6. The method of claim 5, further comprising monitoring the power saving channel, for receiving the first DCI, based on the one or more resource configuration parameters of the reference signals.

7. The method of claim 6, wherein the monitoring the power saving channel further comprises monitoring the power saving channel with spatial domain parameters determined based on reception of the reference signals.

8. The method of claim 7, wherein the spatial domain parameters are used for reception of the reference signals in response to the reference signals being configured for the power saving channel.

9. The method of claim 3, further comprising not monitoring the power saving channel on the first SCell.

10. The method of claim 1, wherein the first SCell maintained as activated comprises maintaining an active state of the first downlink bandwidth part comprises by not switching the first downlink bandwidth part.

11. The method of claim 10, wherein the maintaining the active state of the first downlink bandwidth part comprises performing channel state information measurement on the first downlink bandwidth part of the first SCell.

12. The method of claim 1, wherein the configuration parameters indicate that the first SCell, activated by the SCell activation MAC CE, is self-scheduled.

13. The method of claim 1, further comprising activating a bandwidth part of each of the plurality of SCells before the receiving the first DCI.

14. The method of claim 1, wherein the first DCI does not indicate an active bandwidth part switching on the first SCell.

15. The method of claim 1, wherein the plurality of SCells comprise:
  one or more SCells; and
  a plurality of deactivated SCells.

16. The method of claim 1, wherein the first downlink control channel is monitored discontinuously in response to a discontinuous reception operation being configured on the first SCell.

17. The method of claim 1, wherein the power saving indication bitmap further indicates whether the wireless device monitors a second downlink control channel on a primary cell.

* * * * *